United States Patent
Stanley et al.

(10) Patent No.: US 9,469,088 B2
(45) Date of Patent: Oct. 18, 2016

(54) FLEXIBLE MATERIALS FOR FLEXIBLE CONTAINERS

(71) Applicant: The Procter & Gamble Company, Cincinnati, OH (US)

(72) Inventors: Scott Kendyl Stanley, Mason, OH (US); Jun You, West Chester, OH (US); Emily Charlotte Boswell, Cincinnati, OH (US); Lee Mathew Arent, Fairfield, OH (US); Kenneth Stephen McGuire, Montgomery, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 60 days.

(21) Appl. No.: 13/889,090

(22) Filed: May 7, 2013

(65) Prior Publication Data

US 2013/0294711 A1    Nov. 7, 2013

Related U.S. Application Data

(60) Provisional application No. 61/643,813, filed on May 7, 2012, provisional application No. 61/782,219, filed on Mar. 14, 2013, provisional application No. 61/643,823, filed on May 7, 2012, provisional (Continued)

(51) Int. Cl.
*B32B 27/08* (2006.01)
*B65D 85/00* (2006.01)
(Continued)

(52) U.S. Cl.
CPC .............. *B32B 27/08* (2013.01); *B32B 7/12* (2013.01); *B32B 27/30* (2013.01); *B32B 27/306* (2013.01);
(Continued)

(58) Field of Classification Search
CPC .............. Y10T 428/1334; Y10T 428/24942; Y10T 428/31913; Y10T 428/31746; Y10T 428/31797; A61L 2/20; C01B 11/022; C01B 11/024; C02F 1/00; B32B 7/12; B32B 27/306; B32B 27/32; B32B 27/327; B32B 27/34; B32B 27/36; B32B 27/30; B32B 27/08; B32B 2250/24; B32B 2255/10; B32B 2270/00; B32B 2307/31; B32B 2307/7242; B32B 2307/7244; B32B 2307/7246; B32B 2439/40; B32B 2439/70; B65D 85/00; B65D 25/14; B65D 1/42; B65D 21/0201; B65D 35/10; B65D 31/00; B65D 75/008; B65D 75/525; B65D 75/54; B65D 31/16; B65D 33/02; B65D 75/5883; B65D 75/20; B65D 75/566; B65D 75/5866; B65D 75/5877

USPC .................. 383/107, 109, 113, 100, 102
See application file for complete search history.

(56) References Cited

U.S. PATENT DOCUMENTS 3,730,240 A    5/1973 Presnick
3,742,994 A    7/1973 Pensak
(Continued)

FOREIGN PATENT DOCUMENTS

CN         201272533 Y       7/2009
DE      20 2005 016704       7/2006
(Continued)

OTHER PUBLICATIONS

U.S. Appl. No. 13/888,679, filed May 7, 2013, Stanley et al.
(Continued)

*Primary Examiner* — Peter Helvey
(74) *Attorney, Agent, or Firm* — Charles R. Ware

(57) ABSTRACT

A flexible material for a flexible container can include a first laminate and a second laminate joined to at least a portion of the first laminate by at least one seal. The first laminate can include a first gas barrier layer disposed between first and second sealable layers, wherein the first and second sealable layers define opposed exterior layers of the first laminate. The second laminate can include a third sealable layer defining an exterior layer of the second laminate, and a second gas barrier layer. The at least one seal joins a portion of the third sealable layer to at least a portion of the second sealable layer.

19 Claims, 24 Drawing Sheets

Related U.S. Application Data application No. 61/782,757, filed on Mar. 15, 2013, provisional application No. 61/676,042, filed on Jul. 26, 2012, provisional application No. 61/727,961, filed on Nov. 19, 2012, provisional application No. 61/782,859, filed on Mar. 14, 2013, provisional application No. 61/680,045, filed on Aug. 6, 2012, provisional application No. 61/782,951, filed on Mar. 14, 2013, provisional application No. 61/780,039, filed on Mar. 13, 2013, provisional application No. 61/789,135, filed on Mar. 15, 2013.

(51) Int. Cl.
| | |
|---|---|
| B65D 25/14 | (2006.01) |
| B65D 1/42 | (2006.01) |
| B65D 21/02 | (2006.01) |
| B65D 35/10 | (2006.01) |
| B65D 30/00 | (2006.01) |
| B32B 7/12 | (2006.01) |
| B32B 27/30 | (2006.01) |
| B32B 27/32 | (2006.01) |
| B32B 27/34 | (2006.01) |
| B32B 27/36 | (2006.01) |
| B65D 75/00 | (2006.01) |
| B65D 75/52 | (2006.01) |
| B65D 75/54 | (2006.01) |
| B65D 33/00 | (2006.01) |
| B65D 30/10 | (2006.01) |
| B65D 33/02 | (2006.01) |
| B65D 75/58 | (2006.01) |
| B65D 75/20 | (2006.01) |
| B65D 75/56 | (2006.01) |

(52) U.S. Cl.
CPC ............ *B32B 27/32* (2013.01); *B32B 27/327* (2013.01); *B32B 27/34* (2013.01); *B32B 27/36* (2013.01); *B65D 1/42* (2013.01); *B65D 21/0201* (2013.01); *B65D 25/14* (2013.01); *B65D 31/00* (2013.01); *B65D 31/16* (2013.01); *B65D 33/004* (2013.01); *B65D 33/02* (2013.01); *B65D 35/10* (2013.01); *B65D 75/008* (2013.01); *B65D 75/525* (2013.01); *B65D 75/54* (2013.01); *B65D 85/00* (2013.01); *B32B 2250/24* (2013.01); *B32B 2255/10* (2013.01); *B32B 2270/00* (2013.01); *B32B 2307/31* (2013.01); *B32B 2307/7242* (2013.01); *B32B 2307/7244* (2013.01); *B32B 2307/7246* (2013.01); *B32B 2439/40* (2013.01); *B32B 2439/70* (2013.01); *B65D 75/20* (2013.01); *B65D 75/566* (2013.01); *B65D 75/5866* (2013.01); *B65D 75/5877* (2013.01); *B65D 75/5883* (2013.01); *Y10T 428/24942* (2015.01); *Y10T 428/31746* (2015.04); *Y10T 428/31797* (2015.04); *Y10T 428/31913* (2015.04)

(56) References Cited

U.S. PATENT DOCUMENTS

| | | | | |
|---|---|---|---|---|
| 3,930,286 | A | | 1/1976 | McGowen |
| 4,044,867 | A | | 8/1977 | Fisher |
| 4,189,456 | A | | 2/1980 | Rausing |
| 4,224,367 | A | * | 9/1980 | Scholle .......................... 428/76 |
| 4,503,558 | A | | 3/1985 | Lief et al. |
| 4,615,926 | A | | 10/1986 | Hsu et al. |
| 4,700,531 | A | | 10/1987 | Hsu et al. |
| 4,704,314 | A | | 11/1987 | Hsu et al. |
| 4,787,511 | A | * | 11/1988 | McIver ........................ 206/219 |
| 4,931,327 | A | * | 6/1990 | Liu et al. ..................... 428/36.5 |
| 4,978,025 | A | | 12/1990 | Fougeres |
| 5,263,587 | A | | 11/1993 | Elkin et al. |
| 5,469,966 | A | | 11/1995 | Boyer |
| 5,489,464 | A | | 2/1996 | Bjorck |
| 5,692,833 | A | | 12/1997 | DeLuca |
| 5,882,749 | A | | 3/1999 | Jones |
| 5,960,975 | A | | 10/1999 | Lennartsson |
| 6,015,235 | A | | 1/2000 | Kraimer et al. |
| 6,206,569 | B1 | | 3/2001 | Kraimer et al. |
| 6,244,441 | B1 | | 6/2001 | Ahlgren |
| 6,244,466 | B1 | | 6/2001 | Naslund |
| 6,520,332 | B1 | | 2/2003 | Barmore et al. |
| 6,602,466 | B2 | * | 8/2003 | Hamilton et al. ............. 422/37 |
| 6,607,696 | B1 | * | 8/2003 | Hamilton et al. ............. 422/37 |
| 6,682,825 | B1 | | 1/2004 | Kennedy et al. |
| 6,913,803 | B2 | | 7/2005 | Peper |
| 6,978,893 | B2 | | 12/2005 | Peper |
| 6,982,113 | B2 | | 1/2006 | Kannankeril |
| 7,021,505 | B2 | | 4/2006 | Franczyk |
| 7,056,593 | B2 | | 6/2006 | Kennedy et al. |
| 7,168,566 | B2 | | 1/2007 | Anderson et al. |
| 7,168,567 | B2 | | 1/2007 | Peper et al. |
| 7,207,717 | B2 | | 4/2007 | Steele |
| 7,344,038 | B2 | | 3/2008 | Elansary |
| 7,494,279 | B2 | | 2/2009 | Marquet et al. |
| 7,527,839 | B2 | * | 5/2009 | Busche et al. ............... 428/34.9 |
| 7,585,528 | B2 | | 9/2009 | Ferri et al. |
| 7,611,770 | B2 | | 11/2009 | Kennedy |
| 7,687,123 | B2 | | 3/2010 | Broadus |
| 7,722,254 | B2 | | 5/2010 | Murray |
| 7,883,268 | B2 | | 2/2011 | Steele |
| 7,922,984 | B2 | * | 4/2011 | Hamilton et al. ............. 422/305 |
| 7,938,580 | B2 | | 5/2011 | Gaskell |
| 7,939,169 | B2 | | 5/2011 | McGee |
| 8,028,502 | B2 | | 10/2011 | Murray |
| 8,153,243 | B2 | | 4/2012 | Patel |
| 8,206,033 | B2 | | 6/2012 | Sato et al. |
| 8,247,047 | B2 | | 8/2012 | Ishii |
| 8,263,206 | B2 | | 9/2012 | Kronawittleithner |
| 8,377,529 | B2 | | 2/2013 | Bekele |
| 8,394,474 | B2 | | 3/2013 | Bekele |
| 8,500,330 | B2 | | 8/2013 | Nomura et al. |
| 8,551,588 | B2 | | 10/2013 | Daffner |
| 8,551,590 | B2 | | 10/2013 | Nakashima |
| 2002/0015542 | A1 | * | 2/2002 | Bradley ........................ 383/211 |
| 2003/0012900 | A1 | | 1/2003 | Wolf |
| 2003/0094394 | A1 | | 5/2003 | Anderson et al. |
| 2003/0094395 | A1 | | 5/2003 | Peper et al. |
| 2003/0096068 | A1 | | 5/2003 | Peper |
| 2003/0161999 | A1 | | 8/2003 | Kannankeril et al. |
| 2003/0192909 | A1 | | 10/2003 | Maskell |
| 2004/0035865 | A1 | | 2/2004 | Rosen |
| 2005/0263426 | A1 | | 12/2005 | Ho |
| 2006/0210773 | A1 | | 9/2006 | Kannankeril |
| 2007/0082155 | A1 | | 4/2007 | Rehkugler |
| 2007/0084745 | A1 | | 4/2007 | Yoshifusa |
| 2007/0092744 | A1 | | 4/2007 | Di Tella |
| 2008/0056624 | A1 | * | 3/2008 | Chudley ........................ 383/103 |
| 2008/0149666 | A1 | | 6/2008 | LaFlamme et al. |
| 2008/0193055 | A1 | | 8/2008 | Cnen et al. |
| 2008/0245804 | A1 | | 10/2008 | Weinberger |
| 2008/0277310 | A1 | | 11/2008 | Chacon |
| 2009/0123611 | A1 | | 5/2009 | Bekele |
| 2009/0232424 | A1 | * | 9/2009 | Bierschenk et al. .......... 383/104 |
| 2010/0061664 | A1 | | 3/2010 | Gustafsson et al. |
| 2010/0308062 | A1 | | 12/2010 | Helou, Jr. |
| 2011/0039098 | A1 | | 2/2011 | Forloni et al. |
| 2011/0062051 | A1 | | 3/2011 | Miller |
| 2011/0079608 | A1 | | 4/2011 | Mamiye |
| 2011/0091695 | A1 | | 4/2011 | Bevilacqua |
| 2011/0118679 | A1 | | 5/2011 | Bekele |
| 2011/0252746 | A1 | | 10/2011 | Breck |
| 2011/0290798 | A1 | | 12/2011 | Corbett et al. |
| 2012/0085782 | A1 | | 4/2012 | Futuri |
| 2012/0097634 | A1 | | 4/2012 | Riedl |
| 2012/0114269 | A1 | | 5/2012 | Futase |
| 2012/0318698 | A1 | | 12/2012 | Bekele |

(56) References Cited

U.S. PATENT DOCUMENTS

| | | | |
|---|---|---|---|
| 2013/0011491 | A1 | 1/2013 | Toreki |
| 2013/0045353 | A1 | 2/2013 | Menage |
| 2013/0279833 | A1* | 10/2013 | Wallander .................... 383/210 |
| 2013/0292287 | A1 | 11/2013 | Stanley et al. |
| 2013/0292353 | A1 | 11/2013 | Stanley et al. |
| 2013/0292395 | A1 | 11/2013 | Stanley |
| 2013/0292413 | A1 | 11/2013 | Stanley et al. |
| 2013/0292415 | A1 | 11/2013 | Stanley et al. |
| 2013/0294711 | A1 | 11/2013 | Stanley et al. |
| 2013/0337244 | A1 | 12/2013 | Stanley |
| 2014/0033654 | A1 | 2/2014 | Stanley |
| 2014/0033655 | A1 | 2/2014 | Stanley |
| 2015/0045566 | A1 | 2/2015 | Lin |
| 2015/0057316 | A1 | 2/2015 | Meunier |

FOREIGN PATENT DOCUMENTS

| | | |
|---|---|---|
| DE | 102005002301 A1 | 7/2006 |
| EP | 0347221 A1 | 12/1989 |
| EP | 0 654 418 A1 | 5/1995 |
| EP | 1964785 A2 | 9/2008 |
| FR | 2638715 | 10/1990 |
| FR | 2801287 | 4/2002 |
| JP | 2001-270533 A1 | 10/2001 |
| JP | 2008087357 A | 4/2008 |
| JP | 2009-184690 A | 8/2009 |
| WO | 96/01775 A1 | 1/1996 |
| WO | 2005/063589 A1 | 7/2005 |
| WO | 2005/108065 A1 | 11/2005 |
| WO | 2008/064508 A1 | 6/2008 |
| WO | 2012/062806 A1 | 3/2012 |

OTHER PUBLICATIONS

U.S. Appl. No. 13/888,721, filed May 7, 2013, Stanley et al.
U.S. Appl. No. 13/888,963, filed May 7, 2013, Stanley et al.
U.S. Appl. No. 13/888,756, filed May 7, 2013, Stanley et al.
U.S. Appl. No. 13/889,000, filed May 7, 2013, Stanley et al.
U.S. Appl. No. 13/889,061, filed May 7, 2013, Stanley et al.
U.S. Appl. No. 61/680,045, filed Aug. 6, 2012, Stanley et al.
U.S. Appl. No. 61/782,951, filed Mar. 14, 2013, Stanley et al.
PCT International Search Report and Written Opinion for PCT/US2013/039800, dated Aug. 12, 2013.
PCT International Search Report and Written Opinion for PCT/US2013/039801, dated Aug. 12, 2013.
PCT International Search Report and Written Opinion for PCT/US2013/039809, dated Aug. 8, 2013.
PCT International Search Report and Written Opinion for PCT/US2013/039811, dated Aug. 14, 2013.
PCT International Search Report and Written Opinion for PCT/US2013/039807, dated Aug. 12, 2013.
PCT International Search Report and Written Opinion for PCT/US2013/053204, dated Nov. 13, 2013.
PCT International Search Report and Written Opinion for PCT/US2013/053205, dated Nov. 22, 2013.
PCT International Search Report and Written Opinion for PCT/US2013/039804, dated Aug. 12, 2013.
PCT International Search Report and Written Opinion for PCT/US2013/039802, dated Aug. 12, 2013.
All Office Actions, PG Case No. 12786M, U.S. Appl. No. 13/889,061.

* cited by examiner

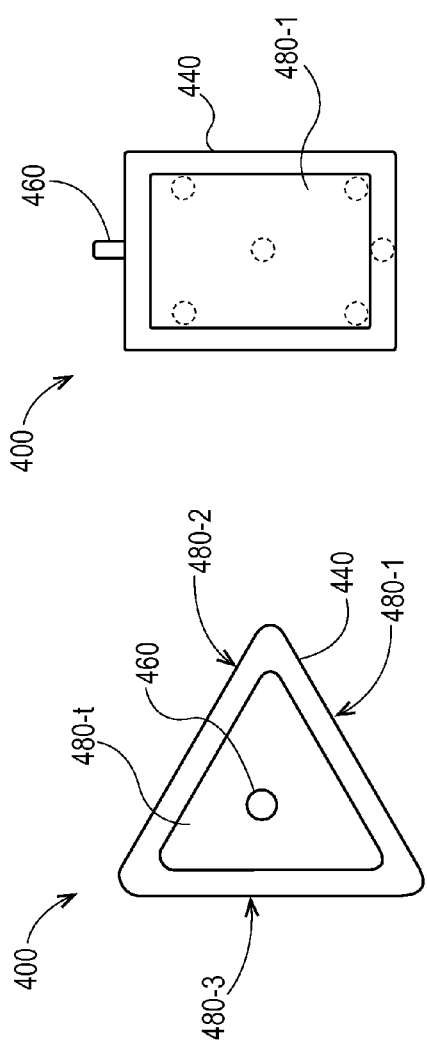
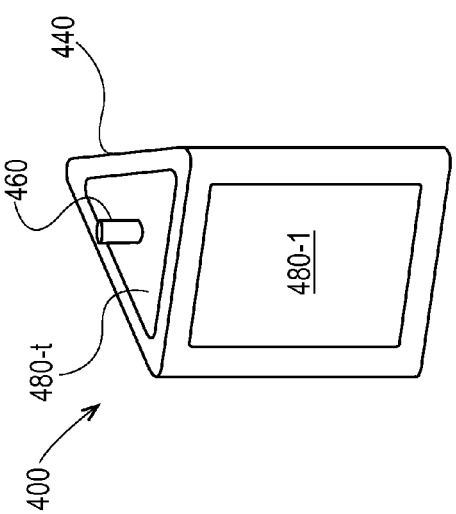
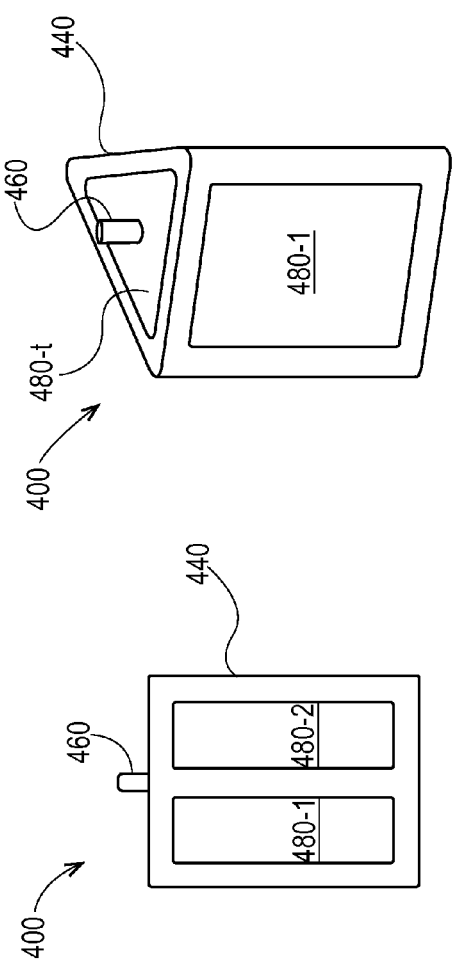

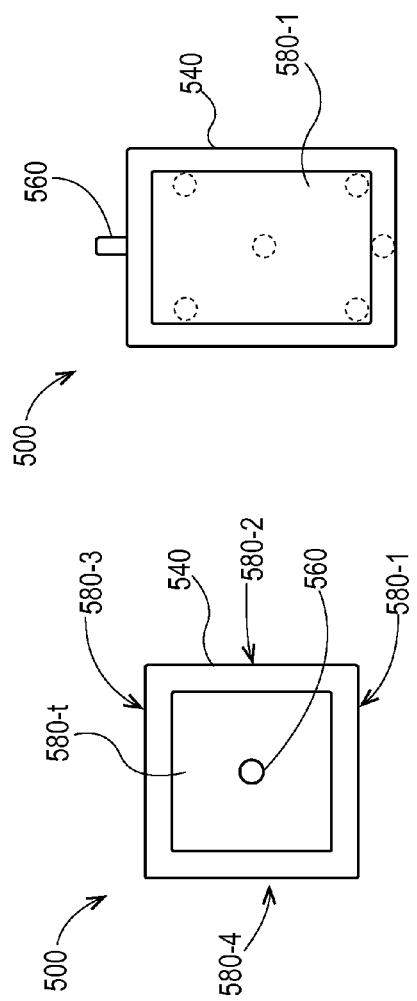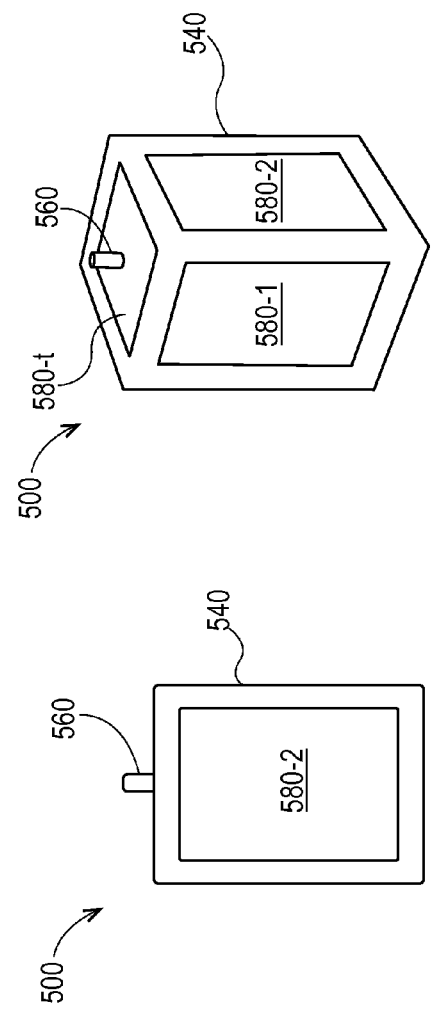

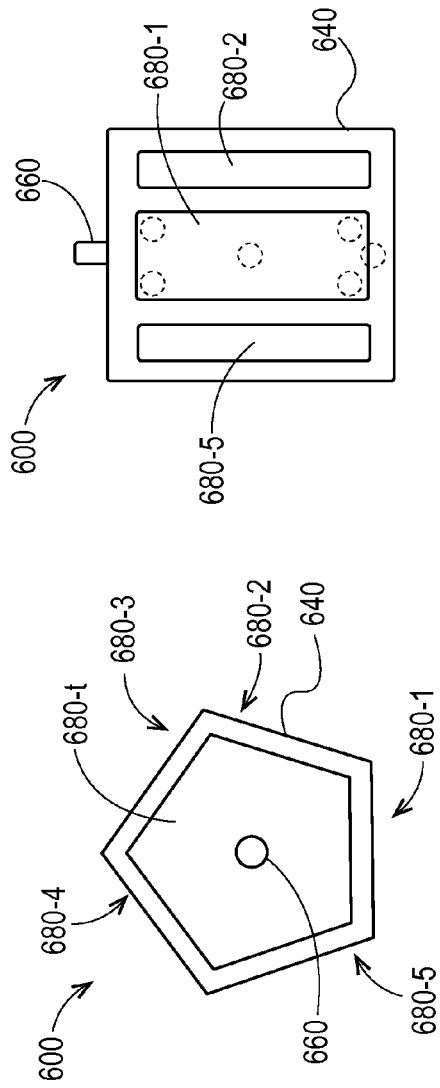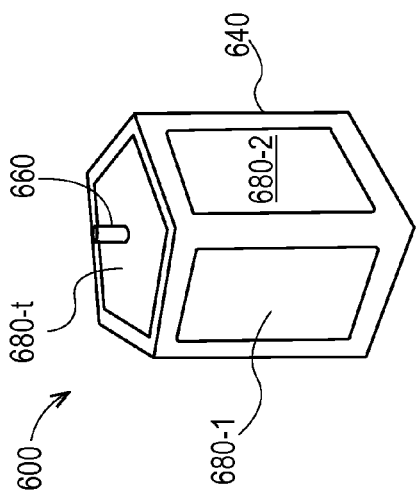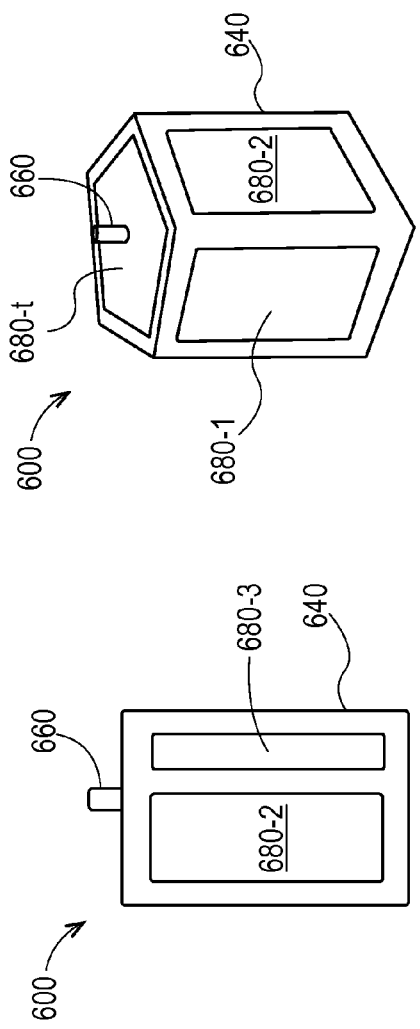

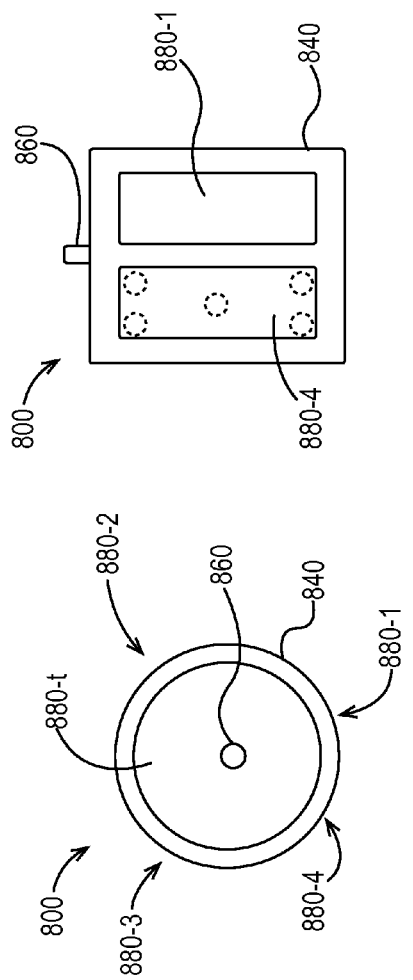
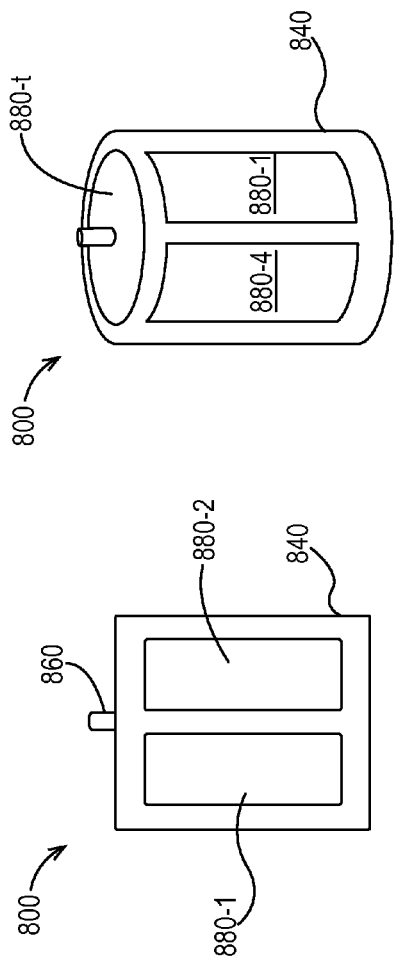
Fig 8A
Fig 8B
Fig 8C
Fig 8D

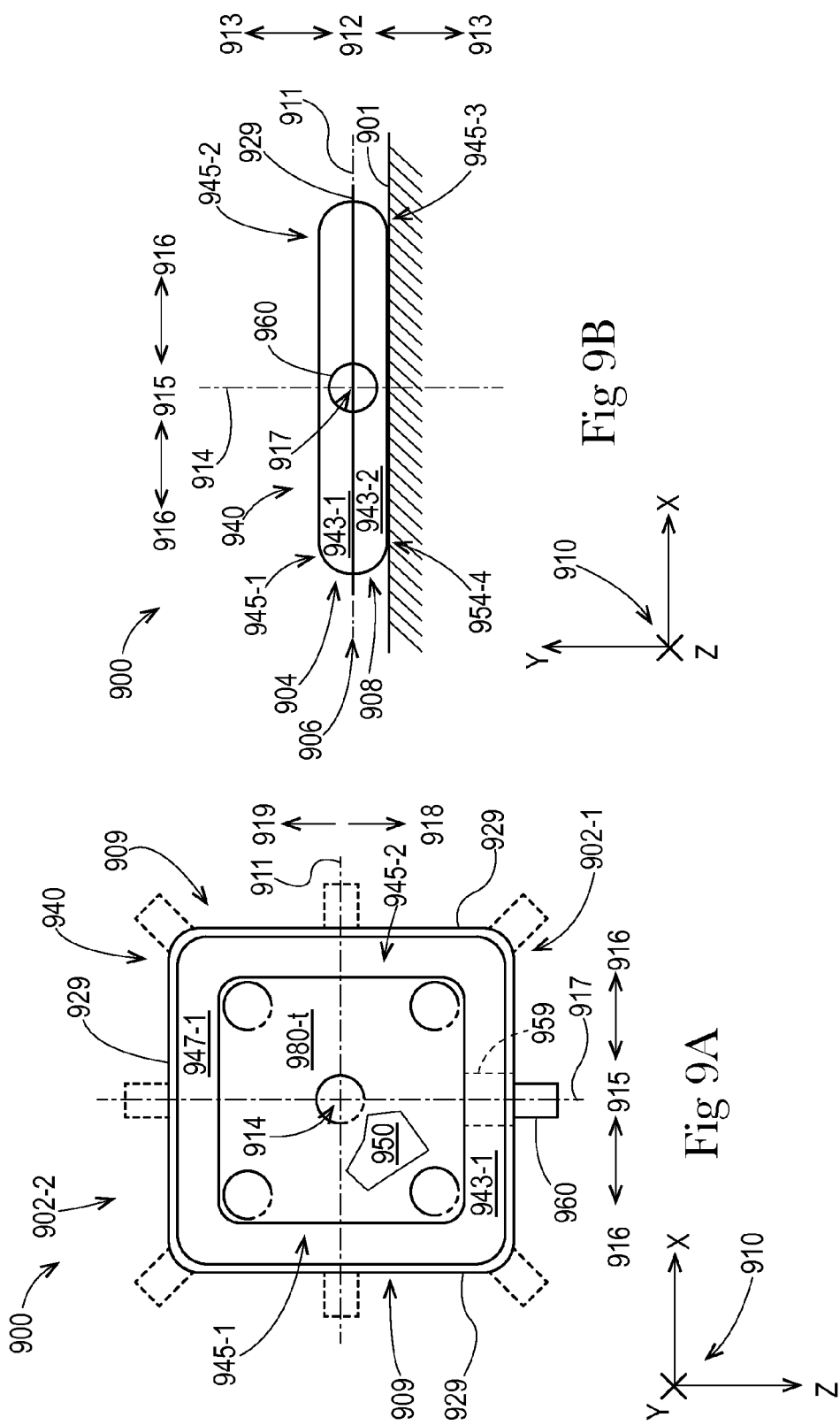

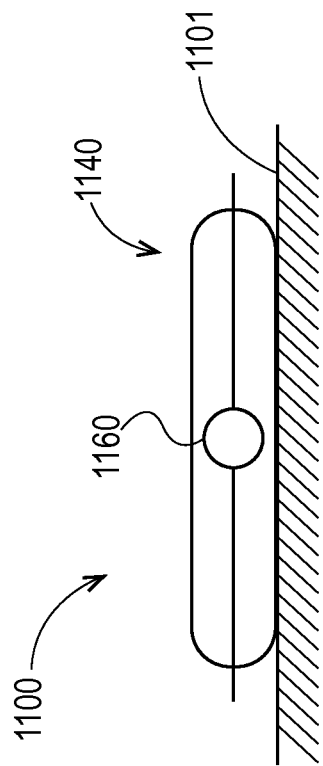
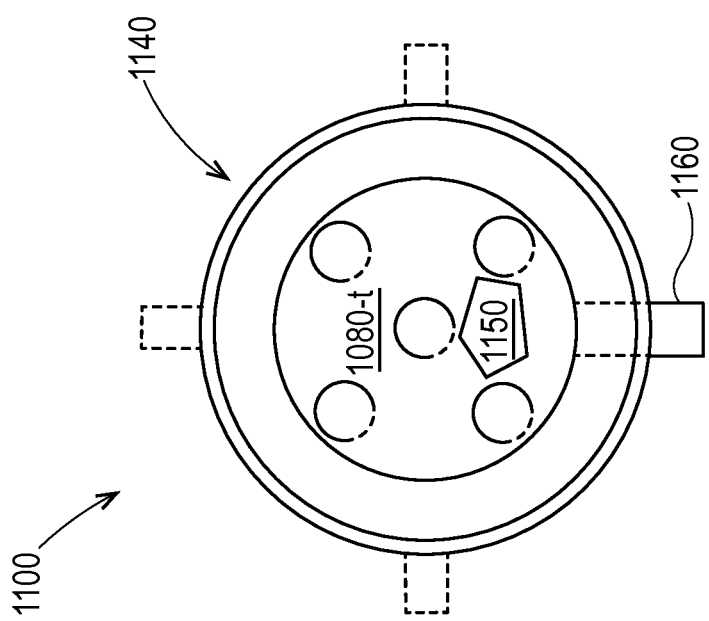
Fig 11B
Fig 11A

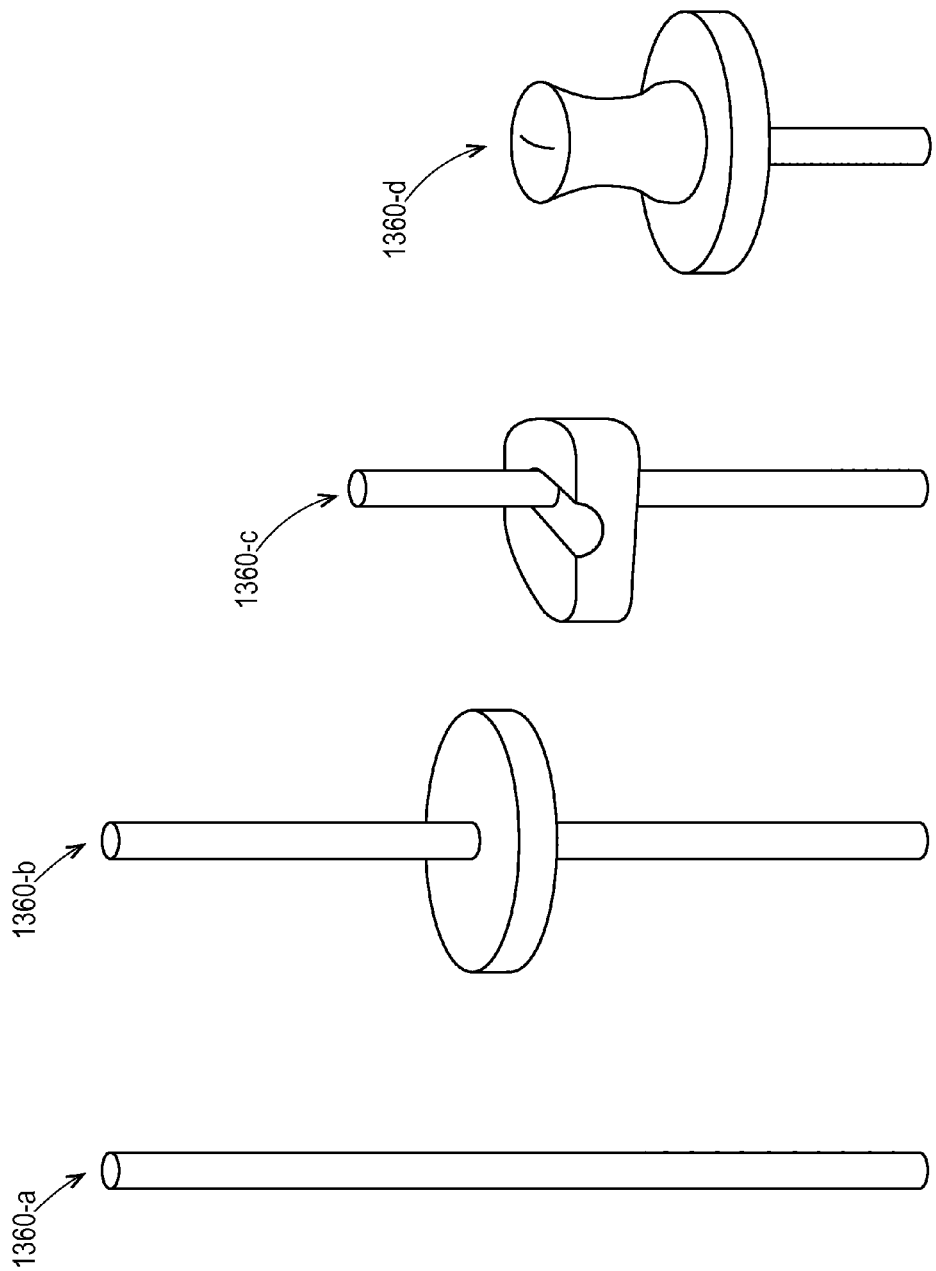

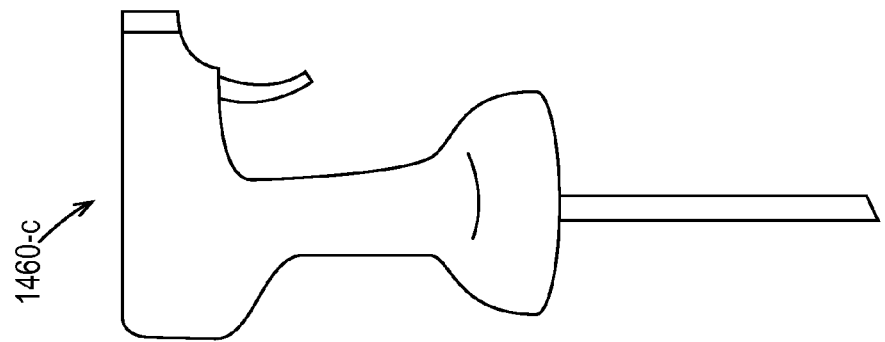
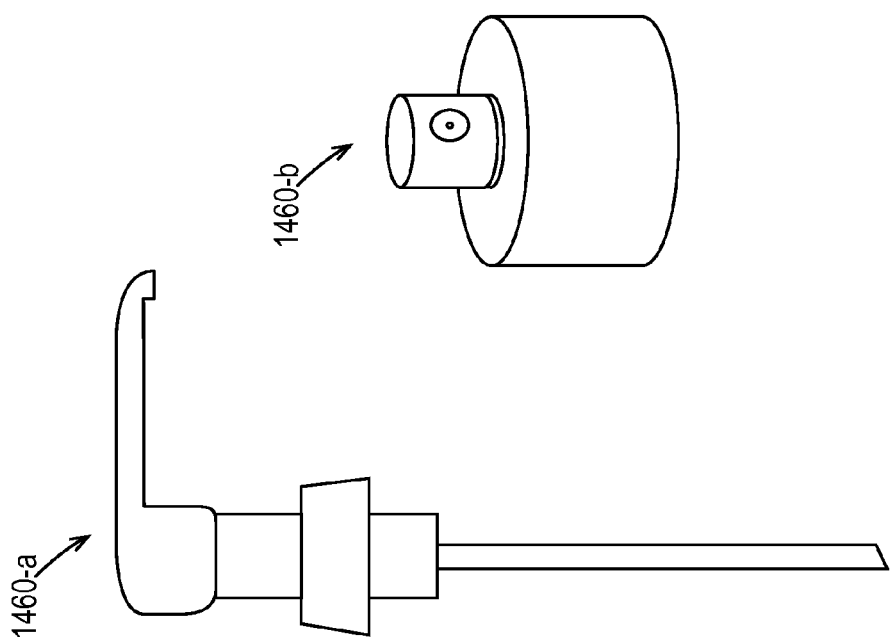
Fig 14A  Fig 14B  Fig 14C

FLEXIBLE MATERIALS FOR FLEXIBLE CONTAINERS

FIELD OF THE INVENTION

The present disclosure relates in general to containers, and in particular, to containers made from flexible material.

BACKGROUND

Fluent products include liquid products and/or pourable solid products. In various embodiments, a container can be used to receive, contain, and dispense one or more fluent products. And, in various embodiments, a container can be used to receive, contain, and/or dispense individual articles or separately packaged portions of a product. A container can include one or more product volumes. A product volume can be configured to be filled with one or more fluent products. A container receives a fluent product when its product volume is filled. Once filled to a desired volume, a container can be configured to contain the fluent product in its product volume, until the fluent product is dispensed. A container contains a fluent product by providing a barrier around the fluent product. The barrier prevents the fluent product from escaping the product volume. The barrier can also protect the fluent product from the environment outside of the container. A filled product volume is typically closed off by a cap or a seal. A container can be configured to dispense one or more fluent products contained in its product volume(s). Once dispensed, an end user can consume, apply, or otherwise use the fluent product(s), as appropriate. In various embodiments, a container may be configured to be refilled and reused or a container may be configured to be disposed of after a single fill or even after a single use. A container should be configured with sufficient structural integrity, such that it can receive, contain, and dispense its fluent product(s), as intended, without failure.

A container for fluent product(s) can be handled, displayed for sale, and put into use. A container can be handled in many different ways as it is made, filled, decorated, packaged, shipped, and unpacked. A container can experience a wide range of external forces and environmental conditions as it is handled by machines and people, moved by equipment and vehicles, and contacted by other containers and various packaging materials. A container for fluent product(s) should be configured with sufficient structural integrity, such that it can be handled in any of these ways, or in any other way known in the art, as intended, without failure.

A container can also be displayed for sale in many different ways as it is offered for purchase. A container can be offered for sale as an individual article of commerce or packaged with one or more other containers or products, which together form an article of commerce. A container can be offered for sale as a primary package with or without a secondary package. A container can be decorated to display characters, graphics, branding, and/or other visual elements when the container is displayed for sale. A container can be configured to be displayed for sale while laying down or standing up on a store shelf, while presented in a merchandising display, while hanging on a display hanger, or while loaded into a display rack or a vending machine. A container for fluent product(s) should be configured with a structure that allows it to be displayed in any of these ways, or in any other way known in the art, as intended, without failure.

A container can also be put into use in many different ways, by its end user. A container can be configured to be held and/or gripped by an end user, so a container should be appropriately sized and shaped for human hands; and for this purpose, a container can include useful structural features such as a handle and/or a gripping surface. A container can be stored while laying down or standing up on a support surface, while hanging on or from a projection such as a hook or a clip, or while supported by a product holder, or (for refillable or rechargeable containers) positioned in a refilling or recharging station. A container can be configured to dispense fluent product(s) while in any of these storage positions or while being held by the user. A container can be configured to dispense fluent product(s) through the use of gravity, and/or pressure, and/or a dispensing mechanism, such as a pump, or a straw, or through the use of other kinds of dispensers known in the art. Some containers can be configured to be filled and/or refilled by a seller (e.g. a merchant or retailer) or by an end user. A container for fluent product(s) should be configured with a structure that allows it to be put to use in any of these ways, or in any other way known in the art, as intended, without failure. A container can also be configured to be disposed of by the end user, as waste and/or recyclable material, in various ways.

One conventional type of container for fluent products is a rigid container made from solid material(s). Examples of conventional rigid containers include molded plastic bottles, glass jars, metal cans, cardboard boxes, etc. These conventional rigid containers are well-known and generally useful; however their designs do present several notable difficulties.

First, some conventional rigid containers for fluent products can be expensive to make. Some rigid containers are made by a process shaping one or more solid materials. Other rigid containers are made with a phase change process, where container materials are heated (to soften/melt), then shaped, then cooled (to harden/solidify). Both kinds of making are energy intensive processes, which can require complex equipment.

Second, some conventional rigid containers for fluent products can require significant amounts of material. Rigid containers that are designed to stand up on a support surface require solid walls that are thick enough to support the containers when they are filled. This can require significant amounts of material, which adds to the cost of the containers and can contribute to difficulties with their disposal.

Third, some conventional rigid containers for fluent products can be difficult to decorate. The sizes, shapes, (e.g. curved surfaces) and/or materials of some rigid containers, make it difficult to print directly on their outside surfaces. Labeling requires additional materials and processing, and limits the size and shape of the decoration. Overwrapping provides larger decoration areas, but also requires additional materials and processing, often at significant expense.

Fourth, some conventional rigid containers for fluent products can be prone to certain kinds of damage. If a rigid container is pushed against a rough surface, then the container can become scuffed, which may obscure printing on the container. If a rigid container is pressed against a hard object, then the container can become dented, which may look unsightly. And if a rigid container is dropped, then the container can rupture, which may cause its fluent product to be lost.

Fifth, some fluent products in conventional rigid containers can be difficult to dispense. When an end user squeezes a rigid container to dispense its fluent product, the end user must overcome the resistance of the rigid sides, to deform the container. Some users may lack the hand strength to easily overcome that resistance; these users may dispense less than their desired amount of fluent product. Other users may need to apply so much of their hand strength, that they cannot easily control how much they deform the container; these users may dispense more than their desired amount of fluent product.

SUMMARY OF THE INVENTION

The present disclosure describes various embodiments of containers made from flexible material. Because these containers are made from flexible material, these containers can be less expensive to make, can use less material, and can be easier to decorate, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to print and/or decorate, because they are made from flexible materials, and flexible materials can be printed and/or decorated as conformable webs, before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands. Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed and put into use, as intended, without failure.

In accordance with an embodiment of the disclosure, a flexible material for a flexible container can include a first laminate and a second laminate joined to at least a portion of the first laminate by at least one seal. The first laminate can include a first gas barrier layer disposed between first and second sealable layers, wherein the first and second sealable layers define opposed exterior layers of the first laminate. The second laminate can include a third sealable layer defining an exterior layer of the second laminate, and a second gas barrier layer. The at least one seal joins a portion of the third sealable layer to at least a portion of the second sealable layer. The at least one seal has a seal strength of about 20 N/m to about 10,000 N/m, the layers of the first laminate having a lamination strength between each adjacent layer of about 2 N/m to about 10,000 N/m, and the layers of the second laminate have lamination strength between each adjacent layer of about 2 N/m to about 10,000 N/m.

In accordance with another embodiment of the disclosure, a flexible material for a flexible container can include a first laminate and a second laminate joined to at least a portion of the first laminate by at least one seal. The first laminate can include a first gas barrier layer disposed between first and second sealable layers, wherein the first and second sealable layers define opposed exterior layers of the first laminate. The second laminate can include a third sealable layer defining an exterior layer of the second laminate, and a second gas barrier layer. The at least one seal joins a portion of the third sealable layer to at least a portion of the second sealable layer. The flexible material has a thermal conductivity of about 0.02 W/m·K to about 300 W/m·K measured at 300 K, and the first, second, and third sealable layers each have a melting temperature of about 65° C. to about 350° C.

In accordance with yet another embodiment of the disclosure, a flexible material for a flexible container can include a first laminate and a second laminate joined to at least a portion of the first laminate by at least one seal. The first laminate can include a first gas barrier layer disposed between first and second sealable layers, wherein the first and second sealable layers define opposed exterior layer of the first laminate. The second laminate can include a third sealable layer defining an exterior layer of the second laminate, and a second gas barrier layer. The at least one seal joins a portion of the third sealable layer to at least a portion of the second sealable layer to define at least one boundary of the structural support volume, the structural support volume being disposed between the first and second laminates, and in at least a structural support volume forming region of the flexible material, the flexible material has a gas transmission rate of about 0.05 cc/m$^2$·day·atm to about 18 cc/m$^2$·day·atm.

In accordance with another embodiment of the disclosure a flexible material for a flexible container can include a first laminate and a second laminate joined to at least a portion of the first laminate by at least one first seal. The first laminate can include a first gas barrier layer disposed between first and second sealable layers, wherein the first and second sealable layers define opposed exterior layers of the first laminate. The second laminate can include a third sealable layer defining an exterior layer of the second laminate, and a second gas barrier layer. The at least one first seal joins a portion of the third sealable layer to at least a portion of the second sealable layer. The second laminate has a construction different than the first laminate, and the at least one first seal joins a portion of the third sealable layer to at least a portion of the second sealable layer to define at least one boundary of the structural support volume, the structural support volume being disposed between the first and second laminates. The second laminate can include, for example, only one sealable layer as an exterior layer.

In accordance with another embodiment, a container can include a flexible material. The flexible material can include a first laminate and a second laminate. The first laminate can include a first gas barrier layer disposed between first and second sealable layers, wherein the first and second sealable layers define opposed exterior layers of the first laminate. The second laminate can include a third sealable layer defining an exterior layer of the second laminate, and a second gas barrier layer. The container further includes at least one first seal joining a portion of the third sealable layer to at least a portion of the second sealable layer and defining at least one boundary of the structural support volume. The structural support volume is disposed between the first and second laminates. The container can further include at least one second seal joining a portion of the first sealable layer in a first region of the flexible material to a portion of the first sealable layer in a second region of the flexible material, the at least one second seal defining at least one additional boundary of the structure support volume and at least partially bounding a product volume. The product volume is provided between the first sealable layer in the first region and the first sealable layer in the second region.

BRIEF DESCRIPTION OF THE DRAWINGS

FIG. 4A illustrates a top view of a stand up flexible container having a structural support frame that has an overall shape like a trigonal prism.

FIG. 4B illustrates a front view of the container of FIG. 4A.

FIG. 4C illustrates a side view of the container of FIG. 4A.

FIG. 4D illustrates an isometric view of the container of FIG. 4A.

FIG. 5A illustrates a top view of a stand up flexible container having a structural support frame that has an overall shape like a tetragonal prism.

FIG. 5B illustrates a front view of the container of FIG. 5A.

FIG. 5C illustrates a side view of the container of FIG. 5A.

FIG. 5D illustrates an isometric view of the container of FIG. 5A.

FIG. 6A illustrates a top view of a stand up flexible container having a structural support frame that has an overall shape like a pentagonal prism.

FIG. 6B illustrates a front view of the container of FIG. 6A.

FIG. 6C illustrates a side view of the container of FIG. 6A.

FIG. 6D illustrates an isometric view of the container of FIG. 6A.

FIG. 8A illustrates a top view of a stand up flexible container having a structural support frame that has an overall shape like a cylinder.

FIG. 8B illustrates a front view of the container of FIG. 8A.

FIG. 8C illustrates a side view of the container of FIG. 8A.

FIG. 8D illustrates an isometric view of the container of FIG. 8A.

FIG. 9A illustrates a top view of an embodiment of a self-supporting flexible container, having an overall shape like a square.

FIG. 9B illustrates an end view of the flexible container of FIG. 9A.

FIG. 11A illustrates a top view of an embodiment of a self-supporting flexible container, having an overall shape like a circle.

FIG. 11B illustrates an end view of the flexible container of FIG. 11A.

FIG. 13A illustrates an isometric view of straw dispenser.

FIG. 13B illustrates an isometric view of straw dispenser with a lid.

FIG. 13C illustrates an isometric view of flip up straw dispenser.

FIG. 13D illustrates an isometric view of straw dispenser with bite valve.

FIG. 14A illustrates an isometric view of pump type dispenser.

FIG. 14B illustrates an isometric view of pump spray type dispenser.

FIG. 14C illustrates an isometric view of trigger spray type dispenser.

DETAILED DESCRIPTION

Figure 1A:
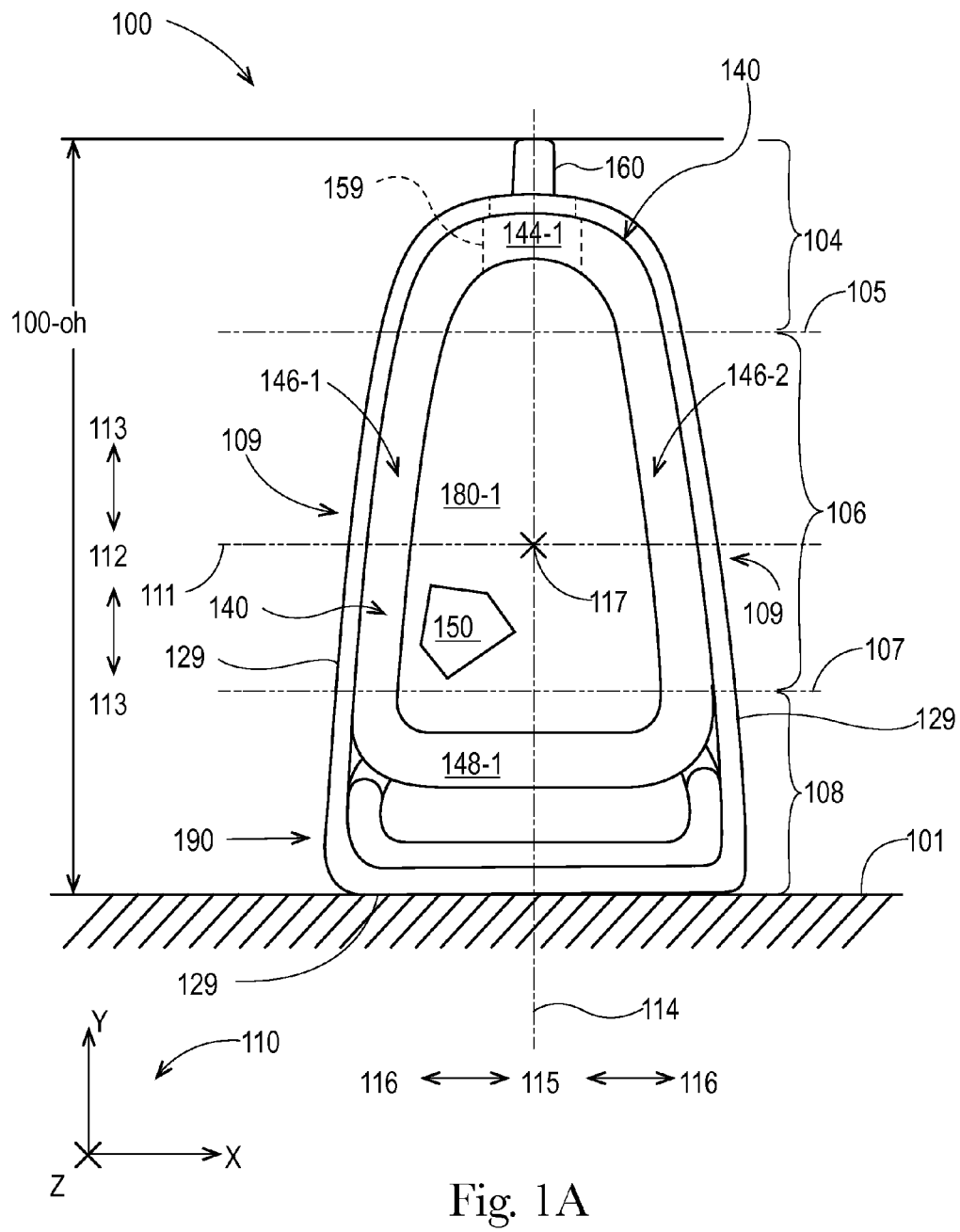
FIG. 1A illustrates a front view of an embodiment of a stand up flexible container.

The present disclosure describes various embodiments of containers made from flexible material. Because these containers are made from flexible material, these containers can be less expensive to make, can use less material, and can be easier to decorate, when compared with conventional rigid containers. First, these containers can be less expensive to make, because the conversion of flexible materials (from sheet form to finished goods) generally requires less energy and complexity, than formation of rigid materials (from bulk form to finished goods). Second, these containers can use less material, because they are configured with novel support structures that do not require the use of the thick solid walls used in conventional rigid containers. Third, these flexible containers can be easier to decorate, because their flexible materials can be easily printed before they are formed into containers. Fourth, these flexible containers can be less prone to scuffing, denting, and rupture, because flexible materials allow their outer surfaces to deform when contacting surfaces and objects, and then to bounce back. Fifth, fluent products in these flexible containers can be more readily and carefully dispensed, because the sides of flexible containers can be more easily and controllably squeezed by human hands.

Even though the containers of the present disclosure are made from flexible material, they can be configured with sufficient structural integrity, such that they can receive, contain, and dispense fluent product(s), as intended, without failure. Also, these containers can be configured with sufficient structural integrity, such that they can withstand external forces and environmental conditions from handling, without failure. Further, these containers can be configured with structures that allow them to be displayed for sale and put into use, as intended, without failure.

As used herein, the term "about" modifies a particular value, by referring to a range equal to the particular value, plus or minus twenty percent (+/−20%). For any of the embodiments of flexible containers, disclosed herein, any disclosure of a particular value, can, in various alternate embodiments, also be understood as a disclosure of a range equal to about that particular value (i.e. +/−20%).

As used herein, the term "ambient conditions" refers to a temperature within the range of 15-35 degrees Celsius and a relative humidity within the range of 35-75%.

As used herein, the term "approximately" modifies a particular value, by referring to a range equal to the particular value, plus or minus fifteen percent (+/−15%). For any of the embodiments of flexible containers, disclosed herein, any disclosure of a particular value, can, in various alternate embodiments, also be understood as a disclosure of a range equal to approximately that particular value (i.e. +/−15%).

As used herein, when referring to a sheet of material, the term "basis weight" refers to a measure of mass per area, in units of grams per square meter (gsm). For any of the embodiments of flexible containers, disclosed herein, in various embodiments, any of the flexible materials can be configured to have a basis weight of 10-1000 gsm, or any integer value for gsm from 10-1000, or within any range formed by any of these values, such as 20-800 gsm, 30-600 gsm, 40-400 gsm, or 50-200, etc.

As used herein, the term "biocontent" refers to an amount of carbon from a renewable resource in a material as a percent of the mass of the total organic carbon in the material, as determined by ASTM D6866-10, method B; any carbon from inorganic sources such as calcium carbonate is not included in determining the bio-based content of the material. In various embodiments, materials comprising biocontent can be suitable for use as flexible materials, for example, as described in published US patent application 2012288693, which is hereby incorporated by reference.

As used herein, when referring to a flexible container, the term "bottom" refers to the portion of the container that is located in the lowermost 30% of the overall height of the container, that is, from 0-30% of the overall height of the container. As used herein, the term bottom can be further limited by modifying the term bottom with a particular percentage value, which is less than 30%. For any of the embodiments of flexible containers, disclosed herein, a reference to the bottom of the container can, in various alternate embodiments, refer to the bottom 25% (i.e. from 0-25% of the overall height), the bottom 20% (i.e. from 0-20% of the overall height), the bottom 15% (i.e. from 0-15% of the overall height), the bottom 10% (i.e. from 0-10% of the overall height), or the bottom 5% (i.e. from 0-5% of the overall height), or any integer value for percentage between 0% and 30%.

As used herein, the term "branding" refers to a visual element intended to distinguish a product from other products. Examples of branding include one or more of any of the following: trademarks, trade dress, logos, icons, and the like. For any of the embodiments of flexible containers, disclosed herein, in various embodiments, any surface of the flexible container can include one or more brandings of any size, shape, or configuration, disclosed herein or known in the art, in any combination.

As used herein, the term "character" refers to a visual element intended to convey information. Examples of characters include one or more of any of the following: letters, numbers, symbols, and the like. For any of the embodiments of flexible containers, disclosed herein, in various embodiments, any surface of the flexible container can include one or more characters of any size, shape, or configuration, disclosed herein or known in the art, in any combination.

As used herein, the term "closed" refers to a state of a product volume, wherein fluent products within the product volume are prevented from escaping the product volume (e.g. by one or more materials that form a barrier, and by a cap), but the product volume is not necessarily hermetically sealed. For example, a closed container can include a vent, which allows a head space in the container to be in fluid communication with air in the environment outside of the container.

As used herein, the term "directly connected" refers to a configuration wherein elements are attached to each other without any intermediate elements therebetween, except for any means of attachment (e.g. adhesive).

As used herein, when referring to a flexible container, the term "dispenser" refers to a structure configured to dispense fluent product(s) from a product volume and/or from a mixing volume to the environment outside of the container. For any of the flexible containers disclosed herein, any dispenser can be configured in any way disclosed herein or known in the art, including any suitable size, shape, and flow rate. For example, a dispenser can be a push-pull type dispenser, a dispenser with a flip-top cap, a dispenser with a screw-on cap, a rotatable type dispenser, dispenser with a cap, a pump type dispenser, a pump spray type dispenser, a trigger spray type dispenser, a straw dispenser, a flip up straw dispenser, a straw dispenser with bite valve, a dosing dispenser, etc. A dispenser can be a parallel dispenser, providing multiple flow channels in fluid communication with multiple product volumes, wherein those flow channels remain separate until the point of dispensing, thus allowing fluent products from multiple product volumes to be dispensed as separate fluent products, dispensed together at the same time. A dispenser can be a mixing dispenser, providing one or more flow channels in fluid communication with multiple product volumes, with multiple flow channels combined before the point of dispensing, thus allowing fluent products from multiple product volumes to be dispensed as the fluent products mixed together. As another example, a dispenser can be formed by a frangible opening. As further examples, a dispenser can utilize one or more valves and/or dispensing mechanisms disclosed in the art, such as those disclosed in: published US patent application 2003/0096068, entitled "One-way valve for inflatable package"; U.S. Pat. No. 4,988,016 entitled "Self-sealing container"; and U.S. Pat. No. 7,207,717, entitled "Package having a fluid actuated closure"; each of which is hereby incorporated by reference. Still further, any of the dispensers disclosed herein, may be incorporated into a flexible container either directly, or in combination with one or more other materials or structures (such as a fitment), or in any way known in the art. In some alternate embodiments, dispensers disclosed herein can be configured for both dispensing and filling, to allow filling of product volume(s) through one or more dispensers. In other alternate embodiments, a product volume can include one or more filling structure(s) (e.g. for adding water to a mixing volume) in addition to or instead of one or more dispenser(s). Any location for a dispenser, disclosed herein can alternatively be used as a location for a filling structure.

As used herein, when referring to a flexible container, the term "disposable" refers to a container which, after dispensing a product to an end user, is not configured to be refilled with an additional amount of the product, but is configured to be disposed of (i.e. as waste, compost, and/or recyclable material). Part, parts, or all of any of the embodiments of flexible containers, disclosed herein, can be configured to be disposable.

As used herein, when referring to a flexible container, the term "durable" refers to a container that is reusable more than non-durable containers.

As used herein, when referring to a flexible container, the term "effective base contact area" refers to a particular area defined by a portion of the bottom of the container, when the container (with all of its product volume(s) filled 100% with water) is standing upright and its bottom is resting on a horizontal support surface. The effective base contact area lies in a plane defined by the horizontal support surface. The effective base contact area is a continuous area bounded on all sides by an outer periphery.

The outer periphery is formed from an actual contact area and from a series of projected areas from defined cross-sections taken at the bottom of the container. The actual contact area is the one or more portions of the bottom of the container that contact the horizontal support surface, when the effective base contact area is defined. The effective base contact area includes all of the actual contact area. However, in some embodiments, the effective base contact area may extend beyond the actual contact area.

The series of projected area are formed from five horizontal cross-sections, taken at the bottom of the flexible container. These cross-sections are taken at 1%, 2%, 3%, 4%, and 5% of the overall height. The outer extent of each of these cross-sections is projected vertically downward onto the horizontal support surface to form five (overlapping) projected areas, which, together with the actual contact area, form a single combined area. This is not a summing up of the values for these areas, but is the formation of a single combined area that includes all of these (projected and actual) areas, overlapping each other, wherein any overlapping portion makes only one contribution to the single combined area.

The outer periphery of the effective base contact area is formed as described below. In the following description, the terms convex, protruding, concave, and recessed are understood from the perspective of points outside of the combined area. The outer periphery is formed by a combination of the outer extent of the combined area and any chords, which are straight line segments constructed as described below.

For each continuous portion of the combined area that has an outer perimeter with a shape that is concave or recessed, a chord is constructed across that portion. This chord is the shortest straight line segment that can be drawn tangent to the combined area on both sides of the concave/recessed portion.

For a combined area that is discontinuous (formed by two or more separate portions), one or more chords are constructed around the outer perimeter of the combined area, across the one or more discontinuities (open spaces disposed between the portions). These chords are straight lines segments drawn tangent to the outermost separate portions of the combined area. These chords are drawn to create the largest possible effective base contact area.

Thus, the outer periphery is formed by a combination of the outer extent of the combined area and any chords, constructed as described above, which all together enclose the effective base area. Any chords that are bounded by the combined area and/or one or more other chords, are not part of the outer periphery and should be ignored.

Any of the embodiments of flexible containers, disclosed herein, can be configured to have an effective base contact area from 1 to 50,000 square centimeters ($cm^2$), or any integer value for $cm^2$ between 1 and 50,000 $cm^2$, or within any range formed by any of the preceding values, such as: from 2 to 25,000 $cm^2$, 3 to 10,000 $cm^2$, 4 to 5,000 $cm^2$, 5 to 2,500 $cm^2$, from 10 to 1,000 $cm^2$, from 20 to 500 $cm^2$, from 30 to 300 $cm^2$, from 40 to 200 $cm^2$, or from 50 to 100 $cm^2$, etc.

As used herein, when referring to a flexible container, the term "expanded" refers to the state of one or more flexible materials that are configured to be formed into a structural support volume, after the structural support volume is made rigid by one or more expansion materials. An expanded structural support volume has an overall width that is significantly greater than the combined thickness of its one or more flexible materials, before the structural support volume is filled with the one or more expansion materials. Examples of expansion materials include liquids (e.g. water), gases (e.g. compressed air), fluent products, foams (that can expand after being added into a structural support volume), co-reactive materials (that produce gas), or phase change materials (that can be added in solid or liquid form, but which turn into a gas; for example, liquid nitrogen or dry ice), or other suitable materials known in the art, or combinations of any of these (e.g. fluent product and liquid nitrogen). In various embodiments, expansion materials can be added at atmospheric pressure, or added under pressure greater than atmospheric pressure, or added to provide a material change that will increase pressure to something above atmospheric pressure. For any of the embodiments of flexible containers, disclosed herein, its one or more flexible materials can be expanded at various points in time, with respect to its manufacture, sale, and use, including, for example: before or after its product volume(s) are filled with fluent product(s), before or after the flexible container is shipped to a seller, and before or after the flexible container is purchased by an end user.

As used herein, when referring to a product volume of a flexible container, the term "filled" refers to the state when the product volume contains an amount of fluent product(s) that is equal to a full capacity for the product volume, with an allowance for head space, under ambient conditions. As used herein, the term filled can be modified by using the term filled with a particular percentage value, wherein 100% filled represents the maximum capacity of the product volume.

As used herein, the term "flat" refers to a surface that is without significant projections or depressions.

As used herein, the term "flexible container" refers to a container configured to have a product volume, wherein one or more flexible materials form 50-100% of the overall surface area of the one or more materials that define the three-dimensional space of the product volume. For any of the embodiments of flexible containers, disclosed herein, in various embodiments, the flexible container can be configured to have a product volume, wherein one or more flexible materials form a particular percentage of the overall area of the one or more materials that define the three-dimensional space, and the particular percentage is any integer value for percentage between 50% and 100%, or within any range formed by any of these values, such as: 60-100%, or 70-100%, or 80-100%, or 90-100%, etc. One kind of flexible container is a film-based container, which is a flexible container made from one or more flexible materials, which include a film.

For any of the embodiments of flexible containers, disclosed herein, in various embodiments, the middle of the flexible container (apart from any fluent product) can be configured to have an overall middle mass, wherein one or more flexible materials form a particular percentage of the overall middle mass, and the particular percentage is any integer value for percentage between 50% and 100%, or within any range formed by any of the preceding values, such as: 60-100%, or 70-100%, or 80-100%, or 90-100%, etc.

For any of the embodiments of flexible containers, disclosed herein, in various embodiments, the entire flexible container (apart from any fluent product) can be configured to have an overall mass, wherein one or more flexible materials form a particular percentage of the overall mass, and the particular percentage is any integer value for percentage between 50% and 100%, or within any range formed by any of the preceding values, such as: 60-100%, or 70-100%, or 80-100%, or 90-100%, etc.

As used herein, when referring to a flexible container, the term "flexible material" refers to a thin, easily deformable, sheet-like material, having a flexibility factor within the range of 1,000-2,500,000 N/m. For any of the embodiments of flexible containers, disclosed herein, in various embodiments, any of the flexible materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art. In various embodiments, part, parts, or all of a flexible material can be coated or uncoated, treated or untreated, processed or unprocessed, in any manner known in the art. In various embodiments, parts, parts, or about all, or approximately all, or substantially all, or nearly all, or all of a flexible material can made of sustainable, bio-sourced, recycled, recyclable, and/or biodegradable material. Part, parts, or about all, or approximately all, or substantially all, or nearly all, or all of any of the flexible materials described herein can be partially or completely translucent, partially or completely transparent, or partially or completely opaque. The flexible materials used to make the containers disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

As used herein, when referring to a flexible container, the term "flexibility factor" refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

As used herein, when referring to a flexible container, the term "fluent product" refers to one or more liquids and/or pourable solids, and combinations thereof. Examples of fluent products include one or more of any of the following: bites, bits, creams, chips, chunks, crumbs, crystals, emulsions, flakes, gels, grains, granules, jellies, kibbles, liquid solutions, liquid suspensions, lotions, nuggets, ointments, particles, particulates, pastes, pieces, pills, powders, salves, shreds, sprinkles, and the like, either individually or in any combination. Throughout the present disclosure the terms "fluent product" and "flowable product" are used interchangeably and are intended to have the same meaning. Any of the product volumes disclosed herein can be configured to include one or more of any fluent product disclosed herein, or known in the art, in any combination.

As used herein, when referring to a flexible container, the term "formed" refers to the state of one or more materials that are configured to be formed into a product volume, after the product volume is provided with its defined three-dimensional space.

As used herein, the term "gas barrier layer" refers to a layer of a laminate of a flexible material, the gas barrier layer being a material or coated material that resists the permeation of gas through the layer. The gas barrier layer imparts at least partial resistance to the permeation of gas through the flexible material. The flexible material can include one or more gas barrier layers. The gas barrier layer can have a gas transmission rate, for example, of about 0.01 $cc/m^2 \cdot day \cdot atm$ to about 10,000 $cc/m^2 \cdot day \cdot atm$, about 0.01 $cc/m^2 \cdot day \cdot atm$ to about 3000 $cc/m^2 \cdot day \cdot atm$, about 0.01 $cc/m^2 \cdot day \cdot atm$ to about 20 cc/m²·day·atm, about 0.05 cc/m²·day·atm to about 18 cc/m²·day·atm, about 0.05 cc/m²·day·atm to about 3 cc/m²·day·atm, about 0.05 cc/m²·day·atm to about 1 cc/m²·day·atm, about 25 cc/m²·day·atm to about 100 cc/m²·day·atm, about 50 cc/m²·day·atm to about 500 cc/m²·day·atm, about 1000 cc/m²·day·atm to about 5000 cc/m²·day·atm, about 5000 cc/m²·day·atm to about 10,000 cc/m²·day·atm. Other suitable gas transmission rates include, for example, about 0.01, 0.05, 0.1, 0.5, 1, 5, 10, 15, 20, 25, 30, 35, 40, 45, 50, 75, 100, 150, 200, 250, 300, 350, 400, 450, 500, 600, 700, 800, 900, 1000, 2000, 3000, 4000, 5000, 6000, 7000, 8000, 9000, and 10000 cc/m²·day·atm, and any range formed by a combination of these values. For example, the gas barrier layer can have the foregoing gas transmission rates for Nitrogen. Unless otherwise specified, the gas transmission rate is measured by ASTM D 1434-82 at 50% relative humidity and 25° C. using Procedure V with partial pressures of 1 atm of high purity test gas on the high pressure side and 1 atm of clean atmospheric air on the low pressure side.

An exemplary gas barrier layer is ethylene vinyl alcohol. The gas transmission rate of EVOH can be tailored by varying the thickness and mol % of ethylene content in the layer. The EVOH gas barrier layer can include from about 24 mol % to about 48 mol % ethylene, with the lower content of ethylene resulting in a gas barrier layer having a lower gas transmission rate. Additionally, the gas transmission rate of the gas barrier layer can be reduced by providing a thicker layer. For example, the gas transmission rate of a gas barrier layer of EVOH can be tailored by changing the mol % of ethylene in the barrier material and/or thickness of the gas barrier layer. In general, an increase in the mol % of EVOH will increase the gas transmission rate, with increase thickness of the gas barrier layer will decrease the gas transmission rate. For example, a flexible material having a gas transmission rate for Nitrogen of about 0.05 cc/m²·day·atm, can include a gas barrier layer formed of EVOH having 32 mol % ethylene and/or the gas barrier can have a thickness of about 9 microns or greater. For example, a flexible material having an increased gas transmission rate for Nitrogen, such as a rate of about 18 cc/m²·day·atm, the ethylene content can be increased to greater than 32 mol % and/or a thickness of less than about 9 microns. Other suitable gas barrier layer materials can include, for example, nylons, polyamides, Nylon 6, polyamide 6, Nylon MXD6, PVOH, PVC, PVDC, PCTFE, sol-gel materials, liquid crystal polymers, coated substrates, PAN3, oriented PA 6, PGA, PHA, PLA, cellulosic esters, TPS, PBS, vacuum metal or metal oxide coated flexible materials (e.g. Al, SiOx, AlOx), nanoclay coated flexible materials, foil, and blends, combinations, laminates, microlayered, nanolayered, and coextrusions thereof. These materials can be bio-based, petro-based, and/or recycled or reground materials.

As used herein, the term "graphic" refers to a visual element intended to provide a decoration or to communicate information. Examples of graphics include one or more of any of the following: colors, patterns, designs, images, and the like. For any of the embodiments of flexible containers, disclosed herein, in various embodiments, any surface of the flexible container can include one or more graphics of any size, shape, or configuration, disclosed herein or known in the art, in any combination.

As used herein, when referring to a flexible container, the term "height area ratio" refers to a ratio for the container, with units of per centimeter (cm⁻¹), which is equal to the value for the overall height of the container (with all of its product volume(s) filled 100% with water, and with overall height measured in centimeters) divided by the value for the effective base contact area of the container (with all of its product volume(s) filled 100% with water, and with effective base contact area measured in square centimeters). For any of the embodiments of flexible containers, disclosed herein, in various embodiments, any of the flexible containers, can be configured to have a height area ratio from 0.3 to 3.0 per centimeter, or any value in increments of 0.05 cm⁻¹ between 0.3 and 3.0 per centimeter, or within any range formed by any of the preceding values, such as: from 0.35 to 2.0 cm⁻¹, from 0.4 to 1.5 cm⁻¹, from 0.4 to 1.2 cm⁻¹, or from 0.45 to 0.9 cm⁻¹, etc.

As used herein, the term "indicia" refers to one or more of characters, graphics, branding, or other visual elements, in any combination. For any of the embodiments of flexible containers, disclosed herein, in various embodiments, any surface of the flexible container can include one or more indicia of any size, shape, or configuration, disclosed herein or known in the art, in any combination.

As used herein, the term "indirectly connected" refers to a configuration wherein elements are attached to each other with one or more intermediate elements therebetween.

As used herein, the term "joined" refers to a configuration wherein elements are either directly connected or indirectly connected.

As used herein, the term "lamination strength" refers to the strength of the joining connection between adjacent layers of a laminate. The laminates in accordance with the disclosure can have a lamination strength between each of the layers of the laminate of about 2 N/m to about 10,000 N/m, about 4 N/m to about 9000 N/m, about 17 N/m to about 3150 N/m, and about 34 N/m to about 2450 N/m. Other suitable lamination strengths include about 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 125, 150, 175, 200, 225, 250, 275, 300, 350, 400, 450, 500, 550, 600, 650, 700, 750, 800, 850, 900, 1000, 1250, 1500, 2000, 2500, 3000, 3500, 4000, 4500, 5000, 5500, 6000, 6500, 7000, 7500, 8000, 8500, 9000, and 10000 N/m, and any range formed by a combination of these values. Unless otherwise specified, lamination strengths disclosed herein are measured by ASTM F904-98 using a draw rate of 280 mm/min and with an unseparated portion of the sample left lose to move freely. The lamination strength can be tailored by selecting the layers in direct contact including use of tie layers and adhesives. For example, where a laminate having a lower lamination strength in the above-described range is suitable for a given application, the laminate can be formed without tie layers and/or with tie layers between some or all of the layers of the laminate and/or with very thin tie layers of about 1 micron or less. High lamination strengths can be achieved by directly connecting layers that are chemically similar or have co-reactivity. For example, Nylon and EVOH have strong reactivity and can generally be coextruded to produce a high lamination strength without the need for added tie or adhesive layers. Polyethylene layers have chemical similarity with other polyethylene containing layers and in some embodiments can be directly connected without the need of a tie or adhesive layer to provide sufficient laminate strength (i.e., in a range of 2 N/m to 10,000 N/m).

The lamination strength of the laminate can be increased by using a tie or adhesive layer. The lamination strength can be tailored by selection of the type of tie layer as well as the thickness of the tie layer. For example, a tie layer consisting of an adhesive with a water-based adhesive chemistry and/or thickness of less than 2 microns can be used where lamination strengths at a low end of the above-described range is desired. Where higher lamination strengths are desired, the tie layer can have an increased thickness, for example, about 2 microns to about 5 microns, with solvent based two part adhesives can be used. Additionally, the tie layer can include polymer ties layers. Tie layers having higher anhydride content, for example, above 150 ppm, in the polymeric layer can also be used to increase lamination strength between two layers of a laminate. Flexible containers having larger-sized structural support volumes may require a flexible material having laminates with higher laminate strength to avoid delamination of the flexible material when formed into a flexible container with expanded structural support volumes.

Exemplary tie layers include, but are not limited to, ethylene acrylates with either acid or maleic anhydride modification, EVA with or without maleic anhydride (MAH) modification, LDPE with maleic anhydride modification, LLDPE with maleic anhydride modification, HDPE with maleic anhydride modification, polypropylene with maleic anhydride modification, ethylene acrylic acid, ionomers, terpolymers, adhesives including solvent, solvent-less, water-based, and two part adhesives, and blends, combinations, laminates, microlayered, nanolayered, and coextrusions thereof. These materials can be bio-based, petro-based, and/or recycled or reground materials.

As used herein, the term "lateral" refers to a direction, orientation, or measurement that is parallel to a lateral centerline of a container, when the container is standing upright on a horizontal support surface, as described herein. A lateral orientation may also be referred to a "horizontal" orientation, and a lateral measurement may also be referred to as a "width."

As used herein, the term "like-numbered" refers to similar alphanumeric labels for corresponding elements, as described below. Like-numbered elements have labels with the same last two digits; for example, one element with a label ending in the digits 20 and another element with a label ending in the digits 20 are like-numbered. Like-numbered elements can have labels with a differing first digit, wherein that first digit matches the number for its figure; as an example, an element of FIG. 3 labeled 320 and an element of FIG. 4 labeled 420 are like-numbered. Like-numbered elements can have labels with a suffix (i.e. the portion of the label following the dash symbol) that is the same or possibly different (e.g. corresponding with a particular embodiment); for example, a first embodiment of an element in FIG. 3A labeled 320-*a* and a second embodiment of an element in FIG. 3B labeled 320-*b*, are like numbered.

As used herein, the term "liquid barrier layer" refers to a layer of a laminate of a flexible material, wherein the liquid barrier layer is a (coated or uncoated) material that is configured to provide reduced permeation of moisture and/or moisture vapor, and when present in the laminate provides the primary contribution for reduced permeation of moisture and/or moisture vapor to the laminate. In some embodiments, the liquid barrier layer can be substantially impermeable to liquids. The liquid barrier layer can have a moisture vapor transmission rate of about 0.05 $g/m^2 \cdot day$ to about 12 $g/m^2 \cdot day$, about 0.07 $g/m^2 \cdot day$ to about 6 $g/m^2 \cdot day$, or about 0.1 $g/m^2 \cdot day$ to about 4 $g/m^2 \cdot day$. Other suitable moisture vapor transmission rates include, for example, about 0.05, 0.06, 0.07, 0.08, 0.09, 0.1, 0.2, 0.3, 0.4, 0.5, 0.6, 0.7, 0.8, 0.9, 1, 2, 3, 4, 5, or 6 $g/m^2 \cdot day$, any range formed by a combination of these values. The liquid barrier layer can include a material or coating selected from the group consisting of metal foils, vacuum metal or metal oxide coated substrates, (e.g. Al, SiOx, AlOx) Biaxially oriented polypropylene (BOPP), HDPE, cyclic copolymers olefins, PP, LDPE, LLDPE, ionomer, PET and blends, combinations, laminates, microlayered, nanolayered, and coextrusions thereof. These materials can be bio-based, petro-based, and/or recycled or reground materials.

As used herein, the term "longitudinal" refers to a direction, orientation, or measurement that is parallel to a longitudinal centerline of a container, when the container is standing upright on a horizontal support surface, as described herein. A longitudinal orientation may also be referred to a "vertical" orientation. When expressed in relation to a horizontal support surface for a container, a longitudinal measurement may also be referred to as a "height", measured above the horizontal support surface.

As used herein, when referring to a flexible container, the term "middle" refers to the portion of the container that is located in between the top of the container and the bottom of the container. As used herein, the term middle can be modified by describing the term middle with reference to a particular percentage value for the top and/or a particular percentage value for the bottom. For any of the embodiments of flexible containers, disclosed herein, a reference to the middle of the container can, in various alternate embodiments, refer to the portion of the container that is located between any particular percentage value for the top, disclosed herein, and/or any particular percentage value for the bottom, disclosed herein, in any combination.

As used herein, the term "mixing volume" refers to a type product volume that is configured to receive one or more fluent product(s) from one or more product volumes and/or from the environment outside of the container.

As used herein, when referring to a product volume, the term "multiple dose" refers to a product volume that is sized to contain a particular amount of product that is about equal to two or more units of typical consumption, application, or use by an end user. Any of the embodiments of flexible containers, disclosed herein, can be configured to have one or more multiple dose product volumes. A container with only one product volume, which is a multiple dose product volume, is referred to herein as a "multiple dose container."

As used herein, the term "nearly" modifies a particular value, by referring to a range equal to the particular value, plus or minus five percent (+/−5%). For any of the embodiments of flexible containers, disclosed herein, any disclosure of a particular value, can, in various alternate embodiments, also be understood as a disclosure of a range equal to approximately that particular value (i.e. +/−5%).

As used herein, when referring to a flexible container, the term "non-durable" refers to a container that is temporarily reusable, or disposable, or single use.

As used herein, when referring to a flexible container, the term "overall height" refers to a distance that is measured while the container is standing upright on a horizontal support surface, the distance measured vertically from the upper side of the support surface to a point on the top of the container, which is farthest away from the upper side of the support surface. Any of the embodiments of flexible containers, disclosed herein, can be configured to have an overall height from 2.0 cm to 100.0 cm, or any value in increments of 0.1 cm between 2.0 and 100.0 cm, or within any range formed by any of the preceding values, such as: from 4.0 to 90.0 cm, from 5.0 to 80.0 cm, from 6.0 to 70.0 cm, from 7.0 to 60.0 cm, from 8.0 to 50.0 cm, from 9.0 to 40.0 cm, or from 10.0 to 30.0, etc.

As used herein, when referring to a sheet of flexible material, the term "overall thickness" refers to a linear dimension measured perpendicular to the outer major surfaces of the sheet, when the sheet is lying flat. For any of the embodiments of flexible containers, disclosed herein, in various embodiments, any of the flexible materials can be configured to have an overall thickness 5-500 micrometers (μm), or any integer value for micrometers from 5-500, or within any range formed by any of these values, such as 10-500 μm, 20-400 μm, 30-300 μm, 40-200 μm, or 50-100 μm, etc.

As used herein, the term "product volume" refers to an enclosable three-dimensional space that is configured to receive and directly contain one or more fluent product(s), wherein that space is defined by one or more materials that form a barrier that prevents the fluent product(s) from escaping the product volume. By directly containing the one or more fluent products, the fluent products come into contact with the materials that form the enclosable three-dimensional space; there is no intermediate material or container, which prevents such contact. Throughout the present disclosure the terms "product volume" and "product receiving volume" are used interchangeably and are intended to have the same meaning. Any of the embodiments of flexible containers, disclosed herein, can be configured to have any number of product volumes including one product volume, two product volumes, three product volumes, four product volumes, five product volumes, six product volumes, or even more product volumes. In some embodiments, one or more product volumes can be enclosed within another product volume. Any of the product volumes disclosed herein can have a product volume of any size, including from 0.001 liters to 100.0 liters, or any value in increments of 0.001 liters between 0.001 liters and 3.0 liters, or any value in increments of 0.01 liters between 3.0 liters and 10.0 liters, or any value in increments of 1.0 liters between 10.0 liters and 100.0 liters, or within any range formed by any of the preceding values, such as: from 0.001 to 2.2 liters, 0.01 to 2.0 liters, 0.05 to 1.8 liters, 0.1 to 1.6 liters, 0.15 to 1.4 liters, 0.2 to 1.2 liters, 0.25 to 1.0 liters, etc. A product volume can have any shape in any orientation. A product volume can be included in a container that has a structural support frame, and a product volume can be included in a container that does not have a structural support frame.

As used herein, the term "print layer" refers to a layer of a laminate of a flexible material, wherein the print layer is a material having at least one major surface that is configured to receive and retain an ink, including a material that is treated in at least a portion in order to have a sufficient surface energy to receive and retain an ink. For example, a material can be treated by corona treatment, plasma treatment, and/or oxidation via flame. Exemplary print layer materials include, but are not limited to, papers, oriented and un-oriented polyesters, PET, co-polyesters, PETG, PEF, PBT, PLA, Nylons or Polyamides, cellulosic or cellulosic esters, PHA, PVC, ionomers, such as sodium ionomer or a zinc ionomer, thermoplastic starch, polyolefins including, cyclic polyolefins, LLDPE and PP, LDPE, HDPE, MDPE, manufactured using Ziegler-Natta catalysts, Chromium catalysts, metallocene based catalysts, single site catalysts and other types of catalysts as homopolymers or copolymers. The materials listed above can be bio-based, petro-based and recycled/reground. These materials could also be combinations, blends, coextrusions, microlayer/nanolayer systems and laminates of the above-materials.

As used herein, the term "reinforcing layer" refers to a layer of a laminate of a flexible material, wherein the reinforcing layer is a material is configured to provide creep resistance, and when present in the laminate is the primary contributor providing creep resistance to the laminate. The reinforcing layer can further provide puncture resistance and ruggedness, and when present in the laminate is the primary contributor providing puncture resistance and ruggedness to the laminate. Examples of reinforcing layer materials include nylons, polyesters, polyethylene terephthalate (PET), polyethylene, oriented polyethylene, polypropylene, oriented polypropylene, polyamides, co-polyesters, PEF, PETG, cyclic polyolefins, PBT, PLA, ionomer, such as a sodium ionomer or zinc ionomer, cellulosic or cellulosic esters, PHA, PVC, thermoplastic starch, polyolefins such as HDPE, POM, PPS, liquid crystalline layers, PEK, PEEK, and homopolymer, copolymer, blends, combinations, laminates, microlayered, nanolayered, and coextrusions thereof. The reinforcing layer can be bio-based, petro-based, and/or recycled or reground materials.

As used herein, when referring to a flexible container, the term "resting on a horizontal support surface" refers to the container resting directly on the horizontal support surface, without other support.

As used herein, the term "sealable layer" refers to a layer of a laminate of a flexible material, wherein the sealable layer is a material that is configured to be sealed to itself or another sealable layer using any kind of sealing method known in the art, including, for example, heat sealing (e.g. conductive sealing, impulse sealing, ultrasonic sealing, etc.), welding, crimping, bonding, and the like, and combinations of any of these. Exemplary sealable layers include, but are not limited, low density polyethylene (LDPE), linear low density polyethylene (LLDPE), LLDPE copolymers with any one or more of butene, hexene and octene, metallocene LLDPE (mPE) or metallocene plastomers, metallocene elastomers, high density polyethylene (HDPE), rubber modified LDPE, rubber modified LLDPE, acid copolymers, polysytyrene, cyclic polyolefins, ethylene vinyl acetate (EVA), ethylene acrylic acid (EAA), ionomers, terpolymers, Barex, polypropylene, bimodal resins, any of which may be from either homopolymers or copolymers, and blends, combinations, laminates, microlayered, nanolayered, and coextrusions thereof. Polyolefins could be manufactured using Ziegler-Natta catalysts, Chromium catalysts, metallocene based catalysts, single site catalysts and other types of catalysts. The materials listed could be bio-based, petro-based and recycled/reground. Resins could be foamed.

As used herein, the term "sealed," when referring to a product volume, refers to a state of the product volume wherein fluent products within the product volume are prevented from escaping the product volume (e.g. by one or more materials that form a barrier, and by a seal), and the product volume is hermetically sealed.

As used herein, the term "seal strength" refers to the strength of the seal between adjacent laminates, between adjacent major surfaces of a flexible material, or between two or more adjacent flexible materials formed using any kind of sealing method known in the art, including, for example, heat sealing (e.g. conductive sealing, impulse sealing, ultrasonic sealing, etc.), welding, crimping, bonding, and the like, and combinations of any of these. The seal strength between first and second laminates of a flexible material and/or a seal joining a sealable layer to itself in accordance with embodiments of the disclosure can be about 20 N/m to about 10,000 N/m, about 85 N/m to about 3500 N/m, and about 300 N/m to about 1250 N/m. Other suitable seal strengths include about 20, 25, 35, 45, 55, 65, 75, 85, 95, 100, 125, 150, 175, 200, 225, 250, 275, 300, 350, 400, 450, 500, 550, 600, 650, 700, 750, 800, 850, 900, 1000, 1250, 1500, 2000, 2500, 3000, 3500, 4000, 4500, 5000, 5500, 6000, 6500, 7000, 7500, 8000, 8500, 9000, and 10000 N/m, and any range formed by a combination of these values. Unless otherwise specified seal strengths disclosed herein are measured by ASTM F 88/F 88M-09 with technique B (supported at 90 degrees) run at 200 mm/min in a tensile testing machine with specimens cut to 25.4 mm width. Samples may be joined together in a configuration as indicated as a fin seal or hot wire seal and sized accordingly. The seal strength should be taken from the initial plateau of force measured as the seal peel initiation begins. Seal widths are 10 mm and seals are produced at the conditions of temperature, pressure, and dwell time that provide maximum peel force for a particular method of sealing the two materials together as is known in the art. In one example, a pressure of about 2.5 bar, a dwell time of about 0.5 seconds and a temperature of 85-135° C. can be used to maximize a seal created by heat sealing two sealable materials together. Sealable layers having high content of LLDPE (Zeigler-Natta), for example, at least 90 wt %, can form seals having high seal strengths, for example, at the upper end of the above-described range for seal strength. Other possible sealant layers include metallocene LLDPE (mLLDPE), Barex, Ionomers, HDPE, which generally have lower seal strengths as compared to LLDPE. The seal strength can be tailored by selection of the sealable layers and/or a content of LLDPE in the sealable layers.

As used herein, when referring to a flexible container, the term "self-supporting" refers to a container that includes a product volume and a structural support frame, wherein, when the container is resting on a horizontal support surface, in at least one orientation, the structural support frame is configured to prevent the container from collapsing and to give the container an overall height that is significantly greater than the combined thickness of the materials that form the container, even when the product volume is unfilled. Any of the embodiments of flexible containers, disclosed herein, can be configured to be self-supporting.

As used herein, when referring to a flexible container, the term "single use" refers to a closed container which, after being opened by an end user, is not configured to be reclosed. Any of the embodiments of flexible containers, disclosed herein, can be configured to be single use.

As used herein, when referring to a product volume, the term "single dose" refers to a product volume that is sized to contain a particular amount of product that is about equal to one unit of typical consumption, application, or use by an end user. Any of the embodiments of flexible containers, disclosed herein, can be configured to have one or more single dose product volumes. A container with only one product volume, which is a single dose product volume, is referred to herein as a "single dose container."

As used herein, when referring to a flexible container, the terms "stand up," "stands up," "standing up", "stand upright", "stands upright", and "standing upright" refer to a particular orientation of a self-supporting flexible container, when the container is resting on a horizontal support surface. This standing upright orientation can be determined from the structural features of the container and/or indicia on the container. In a first determining test, if the flexible container has a clearly defined base structure that is configured to be used on the bottom of the container, then the container is determined to be standing upright when this base structure is resting on the horizontal support surface. If the first test cannot determine the standing upright orientation, then, in a second determining test, the container is determined to be standing upright when the container is oriented to rest on the horizontal support surface such that the indicia on the flexible container are best positioned in an upright orientation. If the second test cannot determine the standing upright orientation, then, in a third determining test, the container is determined to be standing upright when the container is oriented to rest on the horizontal support surface such that the container has the largest overall height. If the third test cannot determine the standing upright orientation, then, in a fourth determining test, the container is determined to be standing upright when the container is oriented to rest on the horizontal support surface such that the container has the largest height area ratio. If the fourth test cannot determine the standing upright orientation, then, any orientation used in the fourth determining test can be considered to be a standing upright orientation.

As used herein, when referring to a flexible container, the term "stand up container" refers to a self-supporting container, wherein, when the container (with all of its product volume(s) filled 100% with water) is standing up, the container has a height area ratio from 0.4 to 1.5 $cm^{-1}$. Any of the embodiments of flexible containers, disclosed herein, can be configured to be stand up containers.

As used herein, when referring to a flexible container, the term "structural support frame" refers to a rigid structure formed of one or more structural support members, joined together, around one or more sizable empty spaces and/or one or more nonstructural panels, and generally used as a major support for the product volume(s) in the flexible container and in making the container self-supporting and/or standing upright. In each of the embodiments disclosed herein, when a flexible container includes a structural support frame and one or more product volumes, the structural support frame is considered to be supporting the product volumes of the container, unless otherwise indicated.

As used herein, when referring to a flexible container, the term "structural support member" refers to a rigid, physical structure, which includes one or more expanded structural support volumes, and which is configured to be used in a structural support frame, to carry one or more loads (from the flexible container) across a span. A structure that does not include at least one expanded structural support volume, is not considered to be a structural support member, as used herein.

A structural support member has two defined ends, a middle between the two ends, and an overall length from its one end to its other end. A structural support member can have one or more cross-sectional areas, each of which has an overall width that is less than its overall length.

A structural support member can be configured in various forms. A structural support member can include one, two, three, four, five, six or more structural support volumes, arranged in various ways. For example, a structural support member can be formed by a single structural support volume. As another example, a structural support member can be formed by a plurality of structural support volumes, disposed end to end, in series, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other. As a further example, a structural support member can be formed by a plurality of support volumes disposed side by side, in parallel, wherein, in various embodiments, part, parts, or about all, or approximately all, or substantially all, or nearly all, or all of some or all of the structural support volumes can be partly or fully in contact with each other, partly or fully directly connected to each other, and/or partly or fully joined to each other.

In some embodiments, a structural support member can include a number of different kinds of elements. For example, a structural support member can include one or more structural support volumes along with one or more mechanical reinforcing elements (e.g. braces, collars, connectors, joints, ribs, etc.), which can be made from one or more rigid (e.g. solid) materials.

Structural support members can have various shapes and sizes. Part, parts, or about all, or approximately all, or substantially all, or nearly all, or all of a structural support member can be straight, curved, angled, segmented, or other shapes, or combinations of any of these shapes. Part, parts, or about all, or approximately all, or substantially all, or nearly all, or all of a structural support member can have any suitable cross-sectional shape, such as circular, oval, square, triangular, star-shaped, or modified versions of these shapes, or other shapes, or combinations of any of these shapes. A structural support member can have an overall shape that is tubular, or convex, or concave, along part, parts, or about all, or approximately all, or substantially all, or nearly all, or all of a length. A structural support member can have any suitable cross-sectional area, any suitable overall width, and any suitable overall length. A structural support member can be substantially uniform along part, parts, or about all, or approximately all, or substantially all, or nearly all, or all of its length, or can vary, in any way described herein, along part, parts, or about all, or approximately all, or substantially all, or nearly all, or all of its length. For example, a cross-sectional area of a structural support member can increase or decrease along part, parts, or all of its length. Part, parts, or all of any of the embodiments of structural support members of the present disclosure, can be configured according to any embodiment disclosed herein, including any workable combination of structures, features, materials, and/or connections from any number of any of the embodiments disclosed herein.

As used herein, when referring to a flexible container, the term "structural support volume" refers to a fillable space made from one or more flexible materials, wherein the space is configured to be at least partially filled with one or more expansion materials, which create tension in the one or more flexible materials, and form an expanded structural support volume. One or more expanded structural support volumes can be configured to be included in a structural support member. A structural support volume is distinct from structures configured in other ways, such as: structures without a fillable space (e.g. an open space), structures made from inflexible (e.g. solid) materials, structures with spaces that are not configured to be filled with an expansion material (e.g. an unattached area between adjacent layers in a multi-layer panel), and structures with flexible materials that are not configured to be expanded by an expansion material (e.g. a space in a structure that is configured to be a non-structural panel). Throughout the present disclosure the terms "structural support volume" and "expandable chamber" are used interchangeably and are intended to have the same meaning.

In some embodiments, a structural support frame can include a plurality of structural support volumes, wherein some of or all of the structural support volumes are in fluid communication with each other. In other embodiments, a structural support frame can include a plurality of structural support volumes, wherein some of or none of the structural support volumes are in fluid communication with each other.

Any of the structural support frames of the present disclosure can be configured to have any kind of fluid communication disclosed herein.

As used herein, the term "substantially" modifies a particular value, by referring to a range equal to the particular value, plus or minus ten percent (+/−10%). For any of the embodiments of flexible containers, disclosed herein, any disclosure of a particular value, can, in various alternate embodiments, also be understood as a disclosure of a range equal to approximately that particular value (i.e. +/−10%).

As used herein, when referring to a flexible container, the term "temporarily reusable" refers to a container which, after dispensing a product to an end user, is configured to be refilled with an additional amount of a product, up to ten times, before the container experiences a failure that renders it unsuitable for receiving, containing, or dispensing the product. As used herein, the term temporarily reusable can be further limited by modifying the number of times that the container can be refilled before the container experiences such a failure. For any of the embodiments of flexible containers, disclosed herein, a reference to temporarily reusable can, in various alternate embodiments, refer to temporarily reusable by refilling up to eight times before failure, by refilling up to six times before failure, by refilling up to four times before failure, or by refilling up to two times before failure, or any integer value for refills between one and ten times before failure. Any of the embodiments of flexible containers, disclosed herein, can be configured to be temporarily reusable, for the number of refills disclosed herein.

As used herein, the term "thickness" refers to a measurement that is parallel to a third centerline of a container, when the container is standing upright on a horizontal support surface, as described herein. A thickness may also be referred to as a "depth."

As used herein, when referring to a flexible container, the term "top" refers to the portion of the container that is located in the uppermost 20% of the overall height of the container, that is, from 80-100% of the overall height of the container. As used herein, the term top can be further limited by modifying the term top with a particular percentage value, which is less than 20%. For any of the embodiments of flexible containers, disclosed herein, a reference to the top of the container can, in various alternate embodiments, refer to the top 15% (i.e. from 85-100% of the overall height), the top 10% (i.e. from 90-100% of the overall height), or the top 5% (i.e. from 95-100% of the overall height), or any integer value for percentage between 0% and 20%.

As used herein, when referring to a flexible container, the term "unexpanded" refers to the state of one or more materials that are configured to be formed into a structural support volume, before the structural support volume is made rigid by an expansion material.

As used herein, when referring to a product volume of a flexible container, the term "unfilled" refers to the state of the product volume when it does not contain a fluent product.

As used herein, when referring to a flexible container, the term "unformed" refers to the state of one or more materials that are configured to be formed into a product volume, before the product volume is provided with its defined three-dimensional space. For example, an article of manufacture could be a container blank with an unformed product volume, wherein sheets of flexible material, with portions joined together, are laying flat against each other.

Flexible containers, as described herein, may be used across a variety of industries for a variety of products. For example, flexible containers, as described herein, may be used across the consumer products industry, including the following products: soft surface cleaners, hard surface cleaners, glass cleaners, ceramic tile cleaners, toilet bowl cleaners, wood cleaners, multi-surface cleaners, surface disinfectants, dishwashing compositions, laundry detergents, fabric conditioners, fabric dyes, surface protectants, surface disinfectants, cosmetics, facial powders, body powders, hair treatment products (e.g. mousse, hair spray, styling gels), shampoo, hair conditioner (leave-in or rinse-out), cream rinse, hair dye, hair coloring product, hair shine product, hair serum, hair anti-frizz product, hair split-end repair products, permanent waving solution, antidandruff formulation, bath gels, shower gels, body washes, facial cleaners, skin care products (e.g. sunscreen, sun block lotions, lip balm, skin conditioner, cold creams, moisturizers), body sprays, soaps, body scrubs, exfoliants, astringent, scrubbing lotions, depilatories, antiperspirant compositions, deodorants, shaving products, pre-shaving products, after shaving products, toothpaste, mouthwash, etc. As further examples, flexible containers, as described herein, may be used across other industries, including foods, beverages, pharmaceuticals, commercial products, industrial products, medical, etc.

FIGS. 1A-1D illustrates various views of an embodiment of a stand up flexible container 100. FIG. 1A illustrates a front view of the container 100. The container 100 is standing upright on a horizontal support surface 101.

In FIG. 1A, a coordinate system 110, provides lines of reference for referring to directions in the figure. The coordinate system 110 is a three-dimensional Cartesian coordinate system with an X-axis, a Y-axis, and a Z-axis, wherein each axis is perpendicular to the other axes, and any two of the axes define a plane. The X-axis and the Z-axis are parallel with the horizontal support surface 101 and the Y-axis is perpendicular to the horizontal support surface 101.

FIG. 1A also includes other lines of reference, for referring to directions and locations with respect to the container 100. A lateral centerline 111 runs parallel to the X-axis. An XY plane at the lateral centerline 111 separates the container 100 into a front half and a back half. An XZ plane at the lateral centerline 111 separates the container 100 into an upper half and a lower half. A longitudinal centerline 114 runs parallel to the Y-axis. A YZ plane at the longitudinal centerline 114 separates the container 100 into a left half and a right half. A third centerline 117 runs parallel to the Z-axis. The lateral centerline 111, the longitudinal centerline 114, and the third centerline 117 all intersect at a center of the container 100.

A disposition with respect to the lateral centerline 111 defines what is longitudinally inboard 112 and longitudinally outboard 113. When a first location is nearer to the lateral centerline 111 than a second location, the first location is considered to be disposed longitudinally inboard 112 to the second location. And, the second location is considered to be disposed longitudinally outboard 113 from the first location. The term lateral refers to a direction, orientation, or measurement that is parallel to the lateral centerline 111. A lateral orientation may also be referred to a horizontal orientation, and a lateral measurement may also be referred to as a width.

A disposition with respect to the longitudinal centerline 114 defines what is laterally inboard 115 and laterally outboard 116. When a first location is nearer to the longitudinal centerline 114 than a second location, the first location is considered to be disposed laterally inboard 115 to the second location. And, the second location is considered to be disposed laterally outboard 116 from the first location. The term longitudinal refers to a direction, orientation, or measurement that is parallel to the longitudinal centerline 114. A longitudinal orientation may also be referred to a vertical orientation.

A longitudinal direction, orientation, or measurement may also be expressed in relation to a horizontal support surface for the container 100. When a first location is nearer to the support surface than a second location, the first location can be considered to be disposed lower than, below, beneath, or under the second location. And, the second location can be considered to be disposed higher than, above, or upward from the first location. A longitudinal measurement may also be referred to as a height, measured above the horizontal support surface 100.

A measurement that is made parallel to the third centerline 117 is referred to a thickness or depth. A disposition in the direction of the third centerline 117 and toward a front 102-1 of the container is referred to as forward 118 or in front of. A disposition in the direction of the third centerline 117 and toward a back 102-2 of the container is referred to as backward 119 or behind.

These terms for direction, orientation, measurement, and disposition, as described above, are used for all of the embodiments of the present disclosure, whether or not a support surface, reference line, or coordinate system is shown in a figure.

The container 100 includes a top 104, a middle 106, and a bottom 108, the front 102-1, the back 102-2, and left and right sides 109. The top 104 is separated from the middle 106 by a reference plane 105, which is parallel to the XZ plane. The middle 106 is separated from the bottom 108 by a reference plane 107, which is also parallel to the XZ plane. The container 100 has an overall height of 100-oh. In the embodiment of FIG. 1A, the front 102-1 and the back 102-2 of the container are joined together at a seal 129, which extends around the outer periphery of the container 100, across the top 104, down the side 109, and then, at the bottom of each side 109, splits outward to follow the front and back portions of the base 190, around their outer extents.

The container 100 includes a structural support frame 140, a product volume 150, a dispenser 160, panels 180-1 and 180-2, and a base structure 190. A portion of panel 180-1 is illustrated as broken away, in order to show the product volume 150. The product volume 150 is configured to contain one or more fluent products. The dispenser 160 allows the container 100 to dispense these fluent product(s) from the product volume 150 through a flow channel 159 then through the dispenser 160, to the environment outside of the container 100. In the embodiment of FIGS. 1A-1D, the dispenser 160 is disposed in the center of the uppermost part of the top 104, however, in various alternate embodiments, the dispenser 160 can be disposed anywhere else on the top 140, middle 106, or bottom 108, including anywhere on either of the sides 109, on either of the panels 180-1 and 180-2, and on any part of the base 190 of the container 100. The structural support frame 140 supports the mass of fluent product(s) in the product volume 150, and makes the container 100 stand upright. The panels 180-1 and 180-2 are relatively flat surfaces, overlaying the product volume 150, and are suitable for displaying any kind of indicia. However, in various embodiments, part, parts, or about all, or approximately all, or substantially all, or nearly all, or all of either or both of the panels 180-1 and 180-2 can include one or more curved surfaces. The base structure 190 supports the structural support frame 140 and provides stability to the container 100 as it stands upright.

The structural support frame 140 is formed by a plurality of structural support members. The structural support frame 140 includes top structural support members 144-1 and 144-2, middle structural support members 146-1, 146-2, 146-3, and 146-4, as well as bottom structural support members 148-1 and 148-2.

The top structural support members 144-1 and 144-2 are disposed on the upper part of the top 104 of the container 100, with the top structural support member 144-1 disposed in the front 102-1 and the top structural support member 144-2 disposed in the back 102-2, behind the top structural support member 144-1. The top structural support members 144-1 and 144-2 are adjacent to each other and can be in contact with each other along the laterally outboard portions of their lengths. In various embodiments, the top structural support members 144-1 and 144-2 can be in contact with each other at one or more relatively smaller locations and/or at one or more relatively larger locations, along part, or parts, or about all, or approximately all, or substantially all, or nearly all, or all of their overall lengths, so long as there is a flow channel 159 between the top structural support members 144-1 and 144-2, which allows the container 100 to dispense fluent product(s) from the product volume 150 through the flow channel 159 then through the dispenser 160. The top structural support members 144-1 and 144-2 are not directly connected to each other. However, in various alternate embodiments, the top structural support members 144-1 and 144-2 can be directly connected and/or joined together along part, or parts, or about all, or approximately all, or substantially all, or nearly all, or all of their overall lengths.

The top structural support members 144-1 and 144-2 are disposed substantially above the product volume 150. Overall, each of the top structural support members 144-1 and 144-2 is oriented about horizontally, but with its ends curved slightly downward. And, overall each of the top structural support members 144-1 and 144-2 has a cross-sectional area that is substantially uniform along its length; however the cross-sectional area at their ends are slightly larger than the cross-sectional area in their middles.

The middle structural support members 146-1, 146-2, 146-3, and 146-4 are disposed on the left and right sides 109, from the top 104, through the middle 106, to the bottom 108. The middle structural support member 146-1 is disposed in the front 102-1, on the left side 109; the middle structural support member 146-4 is disposed in the back 102-2, on the left side 109, behind the middle structural support member 146-1. The middle structural support members 146-1 and 146-4 are adjacent to each other and can be in contact with each other along substantially all of their lengths. In various embodiments, the middle structural support members 146-1 and 146-4 can be in contact with each other at one or more relatively smaller locations and/or at one or more relatively larger locations, along part, or parts, or about all, or approximately all, or substantially all, or nearly all, or all of their overall lengths. The middle structural support members 146-1 and 146-4 are not directly connected to each other. However, in various alternate embodiments, the middle structural support members 146-1 and 146-4 can be directly connected and/or joined together along part, or parts, or about all, or approximately all, or substantially all, or nearly all, or all of their overall lengths.

The middle structural support member 146-2 is disposed in the front 102-1, on the right side 109; the middle structural support member 146-3 is disposed in the back 102-2, on the right side 109, behind the middle structural support member 146-2. The middle structural support members 146-2 and 146-3 are adjacent to each other and can be in contact with each other along substantially all of their lengths. In various embodiments, the middle structural support members 146-2 and 146-3 can be in contact with each other at one or more relatively smaller locations and/or at one or more relatively larger locations, along part, or parts, or about all, or approximately all, or substantially all, or nearly all, or all of their overall lengths. The middle structural support members 146-2 and 146-3 are not directly connected to each other. However, in various alternate embodiments, the middle structural support members 146-2 and 146-3 can be directly connected and/or joined together along part, or parts, or about all, or approximately all, or substantially all, or nearly all, or all of their overall lengths.

The middle structural support members 146-1, 146-2, 146-3, and 146-4 are disposed substantially laterally outboard from the product volume 150. Overall, each of the middle structural support members 146-1, 146-2, 146-3, and 146-4 is oriented about vertically, but angled slightly, with its upper end laterally inboard to its lower end. And, overall each of the middle structural support members 146-1, 146-2, 146-3, and 146-4 has a cross-sectional area that changes along its length, increasing in size from its upper end to its lower end.

The bottom structural support members 148-1 and 148-2 are disposed on the bottom 108 of the container 100, with the bottom structural support member 148-1 disposed in the front 102-1 and the bottom structural support member 148-2 disposed in the back 102-2, behind the top structural support member 148-1. The bottom structural support members 148-1 and 148-2 are adjacent to each other and can be in contact with each other along substantially all of their lengths. In various embodiments, the bottom structural support members 148-1 and 148-2 can be in contact with each other at one or more relatively smaller locations and/or at one or more relatively larger locations, along part, or parts, or about all, or approximately all, or substantially all, or nearly all, or all of their overall lengths. The bottom structural support members 148-1 and 148-2 are not directly connected to each other. However, in various alternate embodiments, the bottom structural support members 148-1 and 148-2 can be directly connected and/or joined together along part, or parts, or about all, or approximately all, or substantially all, or nearly all, or all of their overall lengths.

The bottom structural support members 148-1 and 148-2 are disposed substantially below the product volume 150, but substantially above the base structure 190. Overall, each of the bottom structural support members 148-1 and 148-2 is oriented about horizontally, but with its ends curved slightly upward. And, overall each of the bottom structural support members 148-1 and 148-2 has a cross-sectional area that is substantially uniform along its length.

In the front portion of the structural support frame 140, the left end of the top structural support member 144-1 is joined to the upper end of the middle structural support member 146-1; the lower end of the middle structural support member 146-1 is joined to the left end of the bottom structural support member 148-1; the right end of the bottom structural support member 148-1 is joined to the lower end of the middle structural support member 146-2; and the upper end of the middle structural support member 146-2 is joined to the right end of the top structural support member 144-1. Similarly, in the back portion of the structural support frame 140, the left end of the top structural support member 144-2 is joined to the upper end of the middle structural support member 146-4; the lower end of the middle structural support member 146-4 is joined to the left end of the bottom structural support member 148-2; the right end of the bottom structural support member 148-2 is joined to the lower end of the middle structural support member 146-3; and the upper end of the middle structural support member 146-3 is joined to the right end of the top structural support member 144-2. In the structural support frame 140, the ends of the structural support members, which are joined together, are directly connected, all around the periphery of their walls. However, in various alternative embodiments, any of the structural support members 144-1, 144-2, 146-1, 146-2, 146-3, 146-4, 148-1, and 148-2 can be joined together in any way described herein or known in the art.

In alternative embodiments of the structural support frame 140, adjacent structural support members can be combined into a single structural support member, wherein the combined structural support member can effectively substitute for the adjacent structural support members, as their functions and connections are described herein. In other alternative embodiments of the structural support frame 140, one or more additional structural support members can be added to the structural support members in the structural support frame 140, wherein the expanded structural support frame can effectively substitute for the structural support frame 140, as its functions and connections are described herein. Also, in some alternative embodiments, a flexible container may not include a base structure.

Figure 1B:
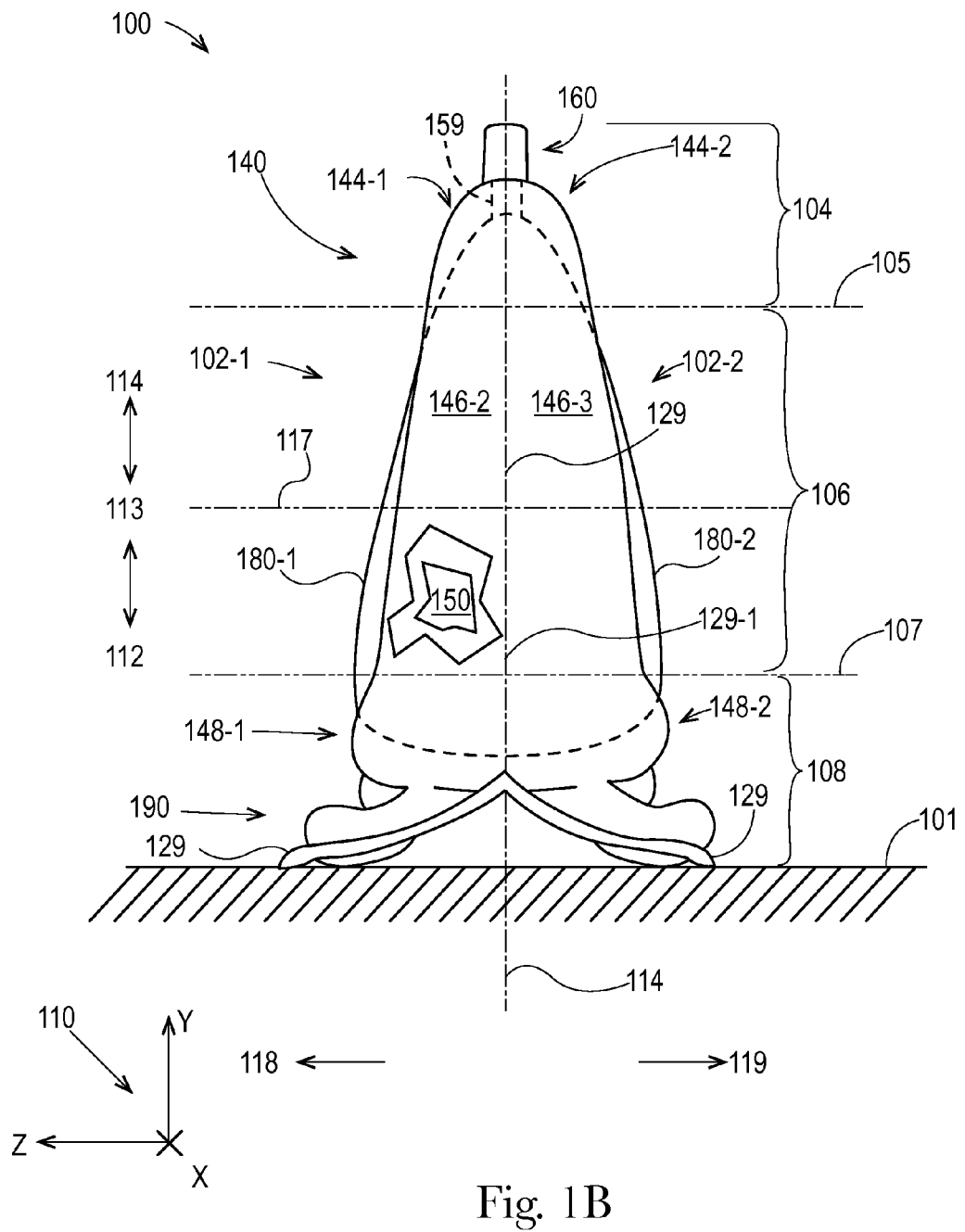
FIG. 1B illustrates a side view of the stand up flexible container of FIG. 1A.

FIG. 1B illustrates a side view of the stand up flexible container 100 of FIG. 1A.

Figure 1C:
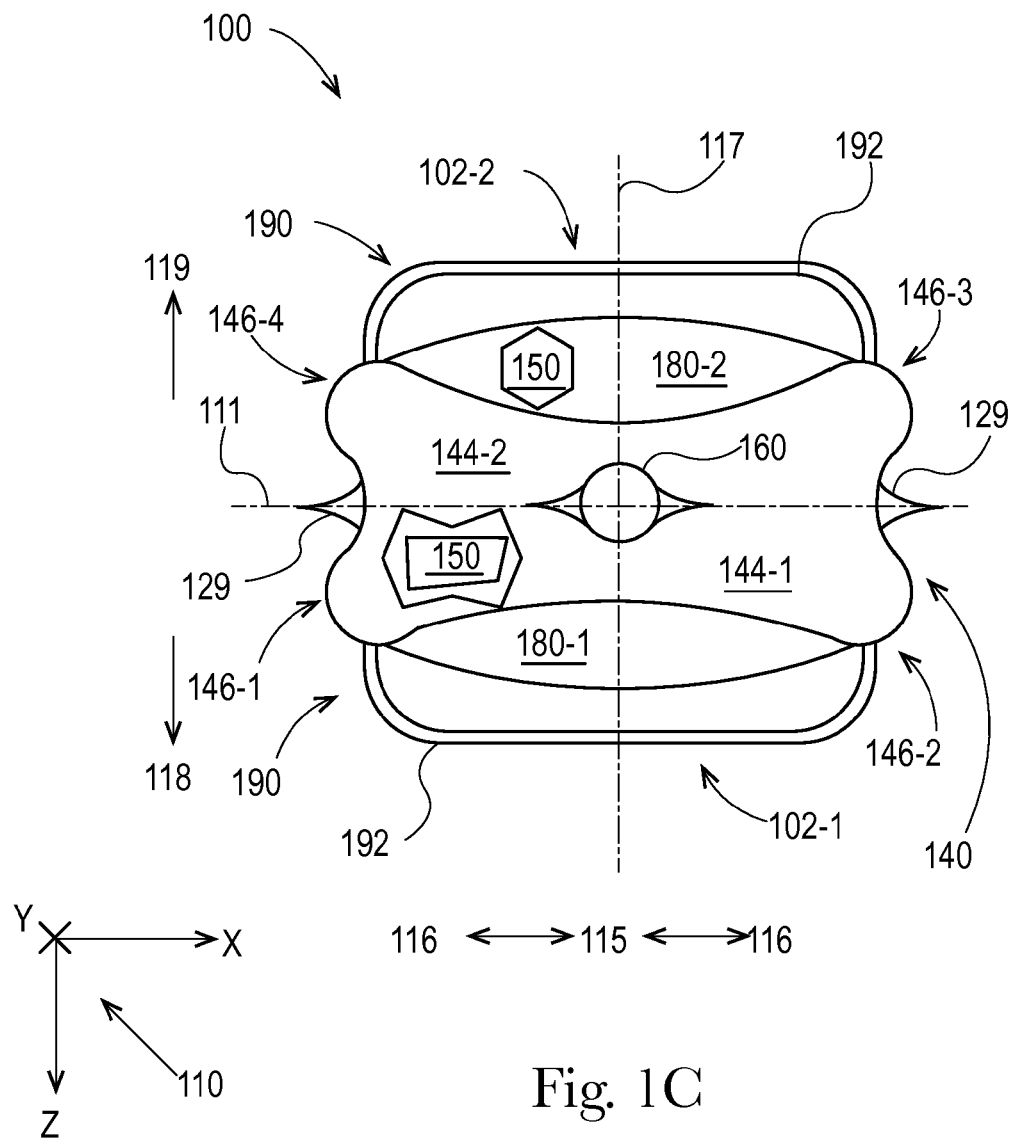
FIG. 1C illustrates a top view of the stand up flexible container of FIG. 1A.

FIG. 1C illustrates a top view of the stand up flexible container 100 of FIG. 1A.

Figure 1D:
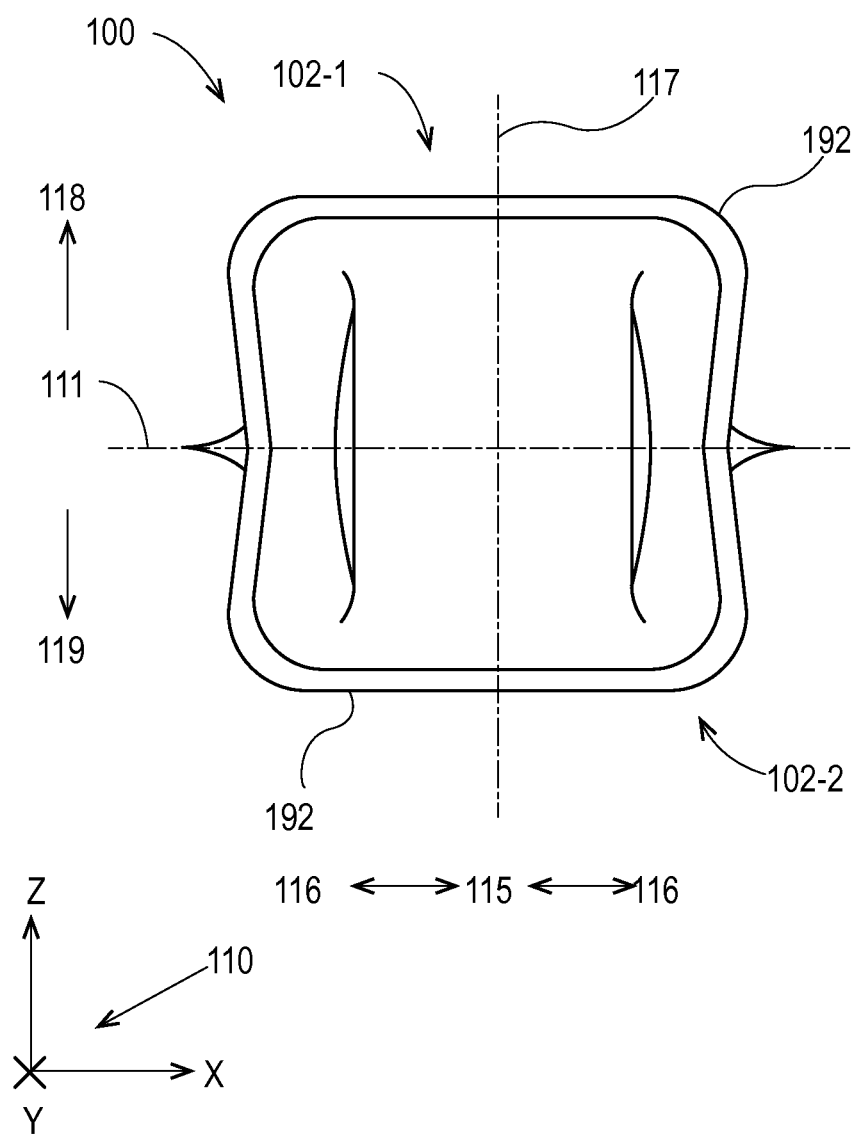
FIG. 1D illustrates a bottom view of the stand up flexible container of FIG. 1A.

FIG. 1D illustrates a bottom view of the stand up flexible container 100 of FIG. 1A.

FIGS. 2A-8D illustrate embodiments of stand up flexible containers having various overall shapes. Any of the embodiments of FIGS. 2A-8D can be configured according to any of the embodiments disclosed herein, including the embodiments of FIGS. 1A-1D. Any of the elements (e.g. structural support frames, structural support members, panels, dispensers, etc.) of the embodiments of FIGS. 2A-8D, can be configured according to any of the embodiments disclosed herein. While each of the embodiments of FIGS. 2A-8D illustrates a container with one dispenser, in various embodiments, each container can include multiple dispensers, according to any embodiment described herein. FIGS. 2A-8D illustrate exemplary additional/alternate locations for dispenser with phantom line outlines. Part, parts, or about all, or approximately all, or substantially all, or nearly all, or all of each of the panels in the embodiments of FIGS. 2A-8D is suitable to display any kind of indicia. Each of the side panels in the embodiments of FIGS. 2A-8D is configured to be a nonstructural panel, overlaying product volume(s) disposed within the flexible container, however, in various embodiments, one or more of any kind of decorative or structural element (such as a rib, protruding from an outer surface) can be joined to part, parts, or about all, or approximately all, or substantially all, or nearly all, or all of any of these side panels. For clarity, not all structural details of these flexible containers are shown in FIGS. 2A-8D, however any of the embodiments of FIGS. 2A-8D can be configured to include any structure or feature for flexible containers, disclosed herein. For example, any of the embodiments of FIGS. 2A-8D can be configured to include any kind of base structure disclosed herein.

Figure 2B:
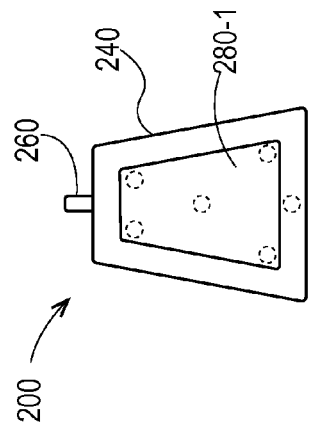
FIG. 2B illustrates a front view of the container of FIG. 2A.
Figure 2A:
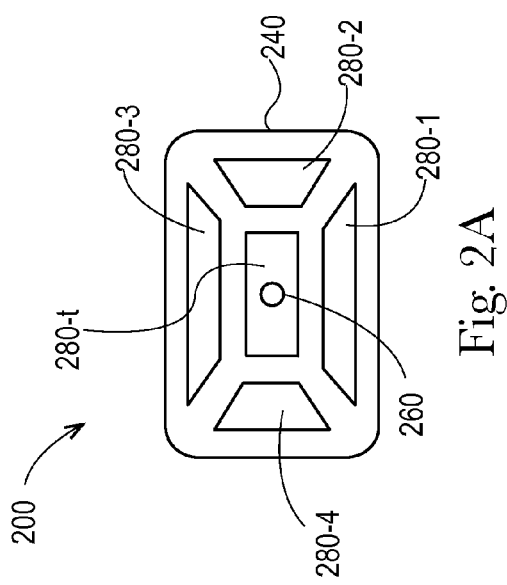
FIG. 2A illustrates a top view of a stand up flexible container having a structural support frame that has an overall shape like a frustum.
Figure 2D:
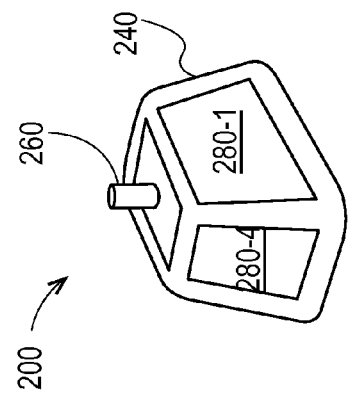
FIG. 2D illustrates an isometric view of the container of FIG. 2A.
Figure 2C:
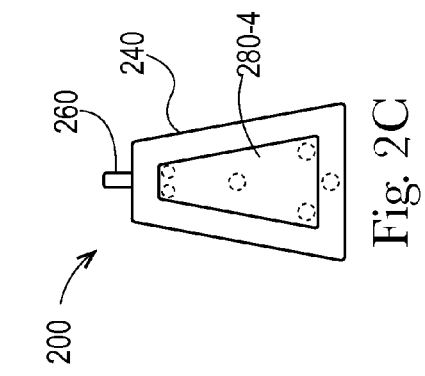
FIG. 2C illustrates a side view of the container of FIG. 2A.

FIG. 2A illustrates a front view of a stand up flexible container 200 having a structural support frame 240 that has an overall shape like a frustum. In the embodiment of FIG. 2A, the frustum shape is based on a four-sided pyramid, however, in various embodiments, the frustum shape can be based on a pyramid with a different number of sides, or the frustum shape can be based on a cone. The support frame 240 is formed by structural support members disposed along the edges of the frustum shape and joined together at their ends. The structural support members define a rectangular shaped top panel 280-*t*, trapezoidal shaped side panels 280-1, 280-2, 280-3, and 280-4, and a rectangular shaped bottom panel (not shown). Each of the side panels 280-1, 280-2, 280-3, and 280-4 is about flat, however in various embodiments, part, parts, or about all, or approximately all, or substantially all, or nearly all, or all of any of the side panels can be approximately flat, substantially flat, nearly flat, or completely flat. The container 200 includes a dispenser 260, which is configured to dispense one or more fluent products from one or more product volumes disposed within the container 200. In the embodiment of FIG. 2A, the dispenser 260 is disposed in the center of the top panel 280-*t*, however, in various alternate embodiments, the dispenser 260 can be disposed anywhere else on the top, sides, or bottom, of the container 200, according to any embodiment described or illustrated herein. FIG. 2B illustrates a front view of the container 200 of FIG. 2A, including exemplary additional/alternate locations for a dispenser, any of which can also apply to the back of the container. FIG. 2C illustrates a side view of the container 200 of FIG. 2A, including exemplary additional/alternate locations for a dispenser (shown as phantom lines), any of which can apply to either side of the container. FIG. 2D illustrates an isometric view of the container 200 of FIG. 2A.

Figure 3B:
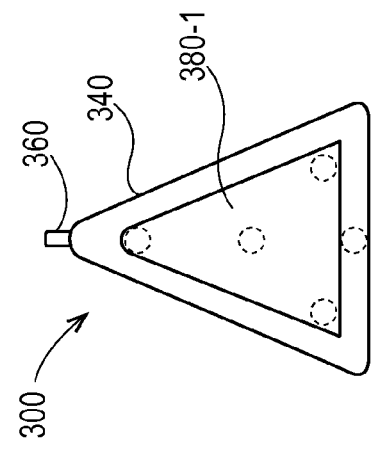
FIG. 3B illustrates a front view of the container of FIG. 3A.
Figure 3D:
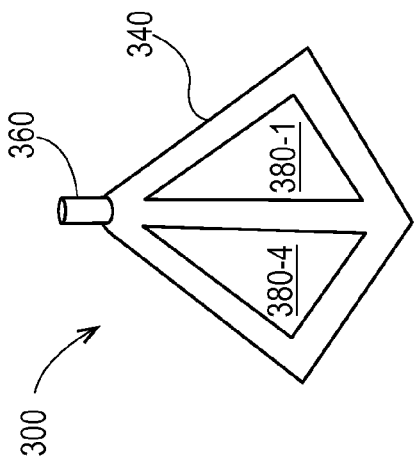
FIG. 3D illustrates an isometric view of the container of FIG. 3A.
Figure 3A:
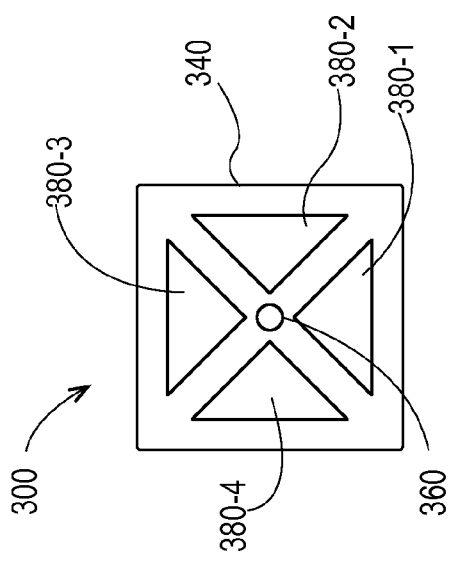
FIG. 3A illustrates a top view of a stand up flexible container having a structural support frame that has an overall shape like a pyramid.
Figure 3C:
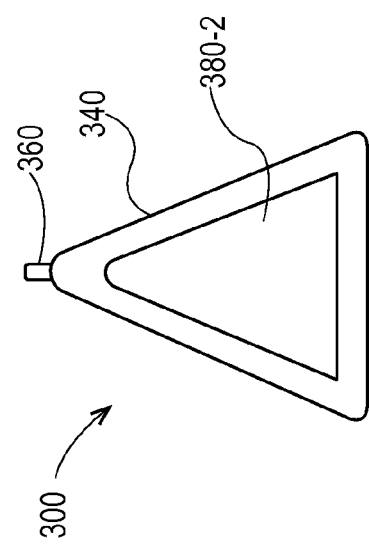
FIG. 3C illustrates a side view of the container of FIG. 3A.

FIG. 3A illustrates a front view of a stand up flexible container 300 having a structural support frame 340 that has an overall shape like a pyramid. In the embodiment of FIG. 3A, the pyramid shape is based on a four-sided pyramid, however, in various embodiments, the pyramid shape can be based on a pyramid with a different number of sides. The support frame 340 is formed by structural support members disposed along the edges of the pyramid shape and joined together at their ends. The structural support members define triangular shaped side panels 380-1, 380-2, 380-3, and 380-4, and a square shaped bottom panel (not shown). Each of the side panels 380-1, 380-2, 380-3, and 380-4 is about flat, however in various embodiments, part, parts, or about all, or approximately all, or substantially all, or nearly all, or all of any of the side panels can be approximately flat, substantially flat, nearly flat, or completely flat. The container 300 includes a dispenser 360, which is configured to dispense one or more fluent products from one or more product volumes disposed within the container 300. In the embodiment of FIG. 3A, the dispenser 360 is disposed at the apex of the pyramid shape, however, in various alternate embodiments, the dispenser 360 can be disposed anywhere else on the top, sides, or bottom, of the container 300. FIG. 3B illustrates a front view of the container 300 of FIG. 3A, including exemplary additional/alternate locations for a dispenser (shown as phantom lines), any of which can also apply to any side of the container. FIG. 3C illustrates a side view of the container 300 of FIG. 3A. FIG. 3D illustrates an isometric view of the container 300 of FIG. 3A.

FIG. 4A illustrates a front view of a stand up flexible container 400 having a structural support frame 440 that has an overall shape like a trigonal prism. In the embodiment of FIG. 4A, the prism shape is based on a triangle. The support frame 440 is formed by structural support members disposed along the edges of the prism shape and joined together at their ends. The structural support members define a triangular shaped top panel 480-*t*, rectangular shaped side panels 480-1, 480-2, and 480-3, and a triangular shaped bottom panel (not shown). Each of the side panels 480-1, 480-2, and 480-3 is about flat, however in various embodiments, part, parts, or about all, or approximately all, or substantially all, or nearly all, or all of the side panels can be approximately flat, substantially flat, nearly flat, or completely flat. The container 400 includes a dispenser 460, which is configured to dispense one or more fluent products from one or more product volumes disposed within the container 400. In the embodiment of FIG. 4A, the dispenser 460 is disposed in the center of the top panel 480-*t*, however, in various alternate embodiments, the dispenser 460 can be disposed anywhere else on the top, sides, or bottom, of the container 400. FIG. 4B illustrates a front view of the container 400 of FIG. 4A, including exemplary additional/alternate locations for a dispenser (shown as phantom lines), any of which can also apply to any side of the container 400. FIG. 4C illustrates a side view of the container 400 of FIG. 4A. FIG. 4D illustrates an isometric view of the container 400 of FIG. 4A.

FIG. 5A illustrates a front view of a stand up flexible container 500 having a structural support frame 540 that has an overall shape like a tetragonal prism. In the embodiment of FIG. 5A, the prism shape is based on a square. The support frame 540 is formed by structural support members disposed along the edges of the prism shape and joined together at their ends. The structural support members define a square shaped top panel 580-*t*, rectangular shaped side panels 580-1, 580-2, 580-3, and 580-4, and a square shaped bottom panel (not shown). Each of the side panels 580-1, 580-2, 580-3, and 580-4 is about flat, however in various embodiments, part, parts, or about all, or approximately all, or substantially all, or nearly all, or all of any of the side panels can be approximately flat, substantially flat, nearly flat, or completely flat. The container 500 includes a dispenser 560, which is configured to dispense one or more fluent products from one or more product volumes disposed within the container 500. In the embodiment of FIG. 5A, the dispenser 560 is disposed in the center of the top panel 580-*t*, however, in various alternate embodiments, the dispenser 560 can be disposed anywhere else on the top, sides, or bottom, of the container 500. FIG. 5B illustrates a front view of the container 500 of FIG. 5A, including exemplary additional/alternate locations for a dispenser (shown as phantom lines), any of which can also apply to any side of the container 500. FIG. 5C illustrates a side view of the container 500 of FIG. 5A. FIG. 5D illustrates an isometric view of the container 500 of FIG. 5A.

FIG. 6A illustrates a front view of a stand up flexible container 600 having a structural support frame 640 that has an overall shape like a pentagonal prism. In the embodiment of FIG. 6A, the prism shape is based on a pentagon. The support frame 640 is formed by structural support members disposed along the edges of the prism shape and joined together at their ends. The structural support members define a pentagon shaped top panel 680-*t*, rectangular shaped side panels 680-1, 680-2, 680-3, 680-4, and 680-5, and a pentagon shaped bottom panel (not shown). Each of the side panels 680-1, 680-2, 680-3, 680-4, and 680-5 is about flat, however in various embodiments, part, parts, or about all, or approximately all, or substantially all, or nearly all, or all of any of the side panels can be approximately flat, substantially flat, nearly flat, or completely flat. The container 600 includes a dispenser 660, which is configured to dispense one or more fluent products from one or more product volumes disposed within the container 600. In the embodiment of FIG. 6A, the dispenser 660 is disposed in the center of the top panel 680-*t*, however, in various alternate embodiments, the dispenser 660 can be disposed anywhere else on the top, sides, or bottom, of the container 600. FIG. 6B illustrates a front view of the container 600 of FIG. 6A, including exemplary additional/alternate locations for a dispenser (shown as phantom lines), any of which can also apply to any side of the container 600. FIG. 6C illustrates a side view of the container 600 of FIG. 6A. FIG. 6D illustrates an isometric view of the container 600 of FIG. 6A.

Figure 7A:
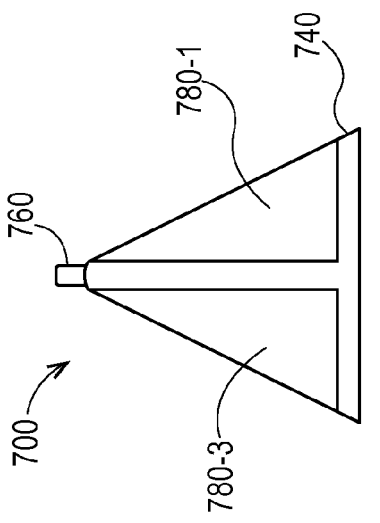
FIG. 7A illustrates a top view of a stand up flexible container having a structural support frame that has an overall shape like a cone.
Figure 7B:
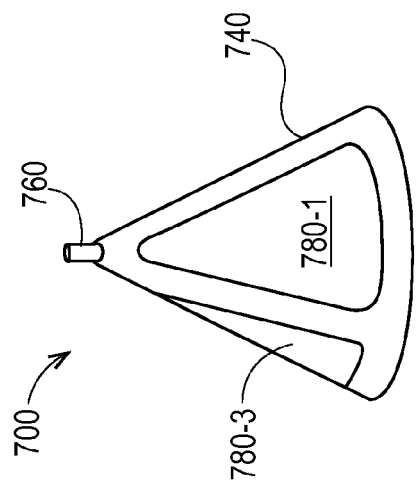
FIG. 7B illustrates a front view of the container of FIG. 7A.
Figure 7C:
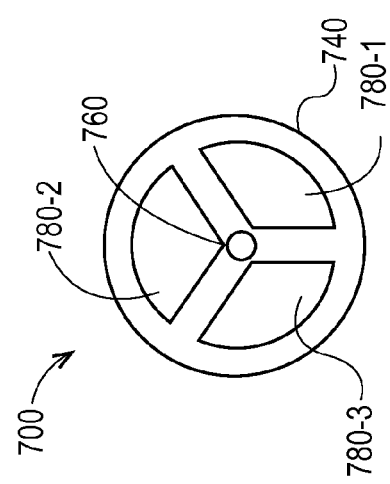
FIG. 7C illustrates a side view of the container of FIG. 7A.
Figure 7D:
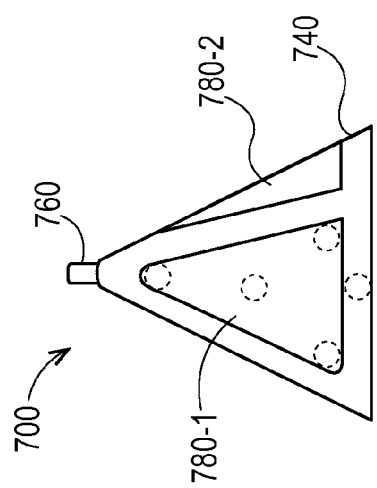
FIG. 7D illustrates an isometric view of the container of FIG. 7A.

FIG. 7A illustrates a front view of a stand up flexible container 700 having a structural support frame 740 that has an overall shape like a cone. The support frame 740 is formed by curved structural support members disposed around the base of the cone and by straight structural support members extending linearly from the base to the apex, wherein the structural support members are joined together at their ends. The structural support members define curved somewhat triangular shaped side panels 780-1, 780-2, and 780-3, and a circular shaped bottom panel (not shown). Each of the side panels 780-1, 780-2, and 780-3, is curved, however in various embodiments, part, parts, or about all, or approximately all, or substantially all, or nearly all, or all of any of the side panels can be approximately flat, substantially flat, nearly flat, or completely flat. The container 700 includes a dispenser 760, which is configured to dispense one or more fluent products from one or more product volumes disposed within the container 700. In the embodiment of FIG. 7A, the dispenser 760 is disposed at the apex of the conical shape, however, in various alternate embodiments, the dispenser 760 can be disposed anywhere else on the top, sides, or bottom, of the container 700. FIG. 7B illustrates a front view of the container 700 of FIG. 7A. FIG. 7C illustrates a side view of the container 700 of FIG. 7A, including exemplary additional/alternate locations for a dispenser (shown as phantom lines), any of which can also apply to any side panel of the container 700. FIG. 7D illustrates an isometric view of the container 700 of FIG. 7A.

FIG. 8A illustrates a front view of a stand up flexible container 800 having a structural support frame 840 that has an overall shape like a cylinder. The support frame 840 is formed by curved structural support members disposed around the top and bottom of the cylinder and by straight structural support members extending linearly from the top to the bottom, wherein the structural support members are joined together at their ends. The structural support members define a circular shaped top panel 880-*t*, curved somewhat rectangular shaped side panels 880-1, 880-2, 880-3, and 880-4, and a circular shaped bottom panel (not shown). Each of the side panels 880-1, 880-2, 880-3, and 880-4, is curved, however in various embodiments, part, parts, or about all, or approximately all, or substantially all, or nearly all, or all of any of the side panels can be approximately flat, substantially flat, nearly flat, or completely flat. The container 800 includes a dispenser 860, which is configured to dispense one or more fluent products from one or more product volumes disposed within the container 800. In the embodiment of FIG. 8A, the dispenser 860 is disposed in the center of the top panel 880-*t*, however, in various alternate embodiments, the dispenser 860 can be disposed anywhere else on the top, sides, or bottom, of the container 800. FIG. 8B illustrates a front view of the container 800 of FIG. 8A, including exemplary additional/alternate locations for a dispenser (shown as phantom lines), any of which can also apply to any side panel of the container 800. FIG. 8C illustrates a side view of the container 800 of FIG. 8A. FIG. 8D illustrates an isometric view of the container 800 of FIG. 8A.

In additional embodiments, any stand up flexible container with a structural support frame, as disclosed herein, can be configured to have an overall shape that corresponds with any other known three-dimensional shape, including any kind of polyhedron, any kind of prismatoid, and any kind of prism (including right prisms and uniform prisms).

FIG. 9A illustrates a top view of an embodiment of a self-supporting flexible container 900, having an overall shape like a square. FIG. 9B illustrates an end view of the flexible container 900 of FIG. 9A. The container 900 is resting on a horizontal support surface 901.

In FIG. 9B, a coordinate system 910, provides lines of reference for referring to directions in the figure. The coordinate system 910 is a three-dimensional Cartesian coordinate system, with an X-axis, a Y-axis, and a Z-axis. The X-axis and the Z-axis are parallel with the horizontal support surface 901 and the Y-axis is perpendicular to the horizontal support surface 901.

FIG. 9A also includes other lines of reference, for referring to directions and locations with respect to the container 100. A lateral centerline 911 runs parallel to the X-axis. An XY plane at the lateral centerline 911 separates the container 100 into a front half and a back half. An XZ plane at the lateral centerline 911 separates the container 100 into an upper half and a lower half. A longitudinal centerline 914 runs parallel to the Y-axis. A YZ plane at the longitudinal centerline 914 separates the container 900 into a left half and a right half. A third centerline 917 runs parallel to the Z-axis. The lateral centerline 911, the longitudinal centerline 914, and the third centerline 917 all intersect at a center of the container 900. These terms for direction, orientation, measurement, and disposition, in the embodiment of FIGS. 9A-9B are the same as the like-numbered terms in the embodiment of FIGS. 1A-1D.

The container 900 includes a top 904, a middle 906, and a bottom 908, the front 902-1, the back 902-2, and left and right sides 909. In the embodiment of FIGS. 9A-9B, the upper half and the lower half of the container are joined together at a seal 929, which extends around the outer periphery of the container 900. The bottom of the container 900 is configured in the same way as the top of the container 900.

The container 900 includes a structural support frame 940, a product volume 950, a dispenser 960, a top panel 980-t and a bottom panel (not shown). A portion of the top panel 980-t is illustrated as broken away, in order to show the product volume 950. The product volume 950 is configured to contain one or more fluent products. The dispenser 960 allows the container 900 to dispense these fluent product(s) from the product volume 950 through a flow channel 959 then through the dispenser 960, to the environment outside of the container 900. The structural support frame 940 supports the mass of fluent product(s) in the product volume 950. The top panel 980-t and the bottom panel are relatively flat surfaces, overlaying the product volume 950, and are suitable for displaying any kind of indicia.

The structural support frame 940 is formed by a plurality of structural support members. The structural support frame 940 includes front structural support members 943-1 and 943-2, intermediate structural support members 945-1, 945-2, 945-3, and 945-4, as well as back structural support members 947-1 and 947-2. Overall, each of the structural support members in the container 900 is oriented horizontally. And, each of the structural support members in the container 900 has a cross-sectional area that is substantially uniform along its length, although in various embodiments, this cross-sectional area can vary.

Upper structural support members 943-1, 945-1, 945-2, and 947-1 are disposed in an upper part of the middle 906 and in the top 904, while lower structural support members 943-2, 945-4, 945-3, and 947-2 are disposed in a lower part of the middle 906 and in the bottom 908. The upper structural support members 943-1, 945-1, 945-2, and 947-1 are disposed above and adjacent to the lower structural support members 943-2, 945-4, 945-3, and 947-2, respectively.

In various embodiments, adjacent upper and lower structural support members can be in contact with each other at one or more relatively smaller locations and/or at one or more relatively larger locations, along part, or parts, or about all, or approximately all, or substantially all, or nearly all, or all of their overall lengths, so long as there is a gap in the contact for the flow channel 959, between the structural support members 943-1 and 943-2. In the embodiment of FIGS. 9A-9B, the upper and lower structural support members are not directly connected to each other. However, in various alternate embodiments, adjacent upper and lower structural support members can be directly connected and/or joined together along part, or parts, or about all, or approximately all, or substantially all, or nearly all, or all of their overall lengths.

The ends of structural support members 943-1, 945-2, 947-1, and 945-1 are joined together to form a top square that is outward from and surrounding the product volume 950, and the ends of structural support members 943-2, 945-3, 947-2, and 945-4 are also joined together to form a bottom square that is outward from and surrounding the product volume 950. In the structural support frame 940, the ends of the structural support members, which are joined together, are directly connected, all around the periphery of their walls. However, in various alternative embodiments, any of the structural support members of the embodiment of FIGS. 9A-9B can be joined together in any way described herein or known in the art.

In alternative embodiments of the structural support frame 940, adjacent structural support members can be combined into a single structural support member, wherein the combined structural support member can effectively substitute for the adjacent structural support members, as their functions and connections are described herein. In other alternative embodiments of the structural support frame 940, one or more additional structural support members can be added to the structural support members in the structural support frame 940, wherein the expanded structural support frame can effectively substitute for the structural support frame 940, as its functions and connections are described herein.

FIGS. 10A-11B illustrate embodiments of self-supporting flexible containers (that are not stand up containers) having various overall shapes. Any of the embodiments of FIGS. 10A-11B can be configured according to any of the embodiments disclosed herein, including the embodiments of FIGS. 9A-9B. Any of the elements (e.g. structural support frames, structural support members, panels, dispensers, etc.) of the embodiments of FIGS. 10A-11B, can be configured according to any of the embodiments disclosed herein. While each of the embodiments of FIGS. 10A-11B illustrates a container with one dispenser, in various embodiments, each container can include multiple dispensers, according to any embodiment described herein. Part, parts, or about all, or approximately all, or substantially all, or nearly all, or all of each of the panels in the embodiments of FIGS. 10A-11B is suitable to display any kind of indicia. Each of the top and bottom panels in the embodiments of FIGS. 10A-11B is configured to be a nonstructural panel, overlaying product volume(s) disposed within the flexible container, however, in various embodiments, one or more of any kind of decorative or structural element (such as a rib, protruding from an outer surface) can be joined to part, parts, or about all, or approximately all, or substantially all, or nearly all, or all of any of these panels. For clarity, not all structural details of these flexible containers are shown in FIGS. 10A-11B, however any of the embodiments of FIGS. 10A-11B can be configured to include any structure or feature for flexible containers, disclosed herein.

Figure 10B:
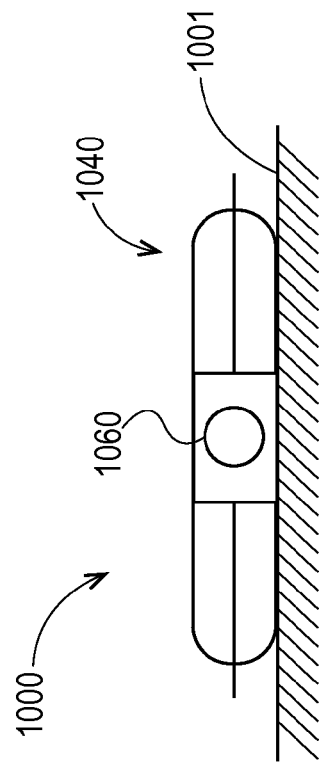
FIG. 10B illustrates an end view of the flexible container of FIG. 10A.
Figure 10A:
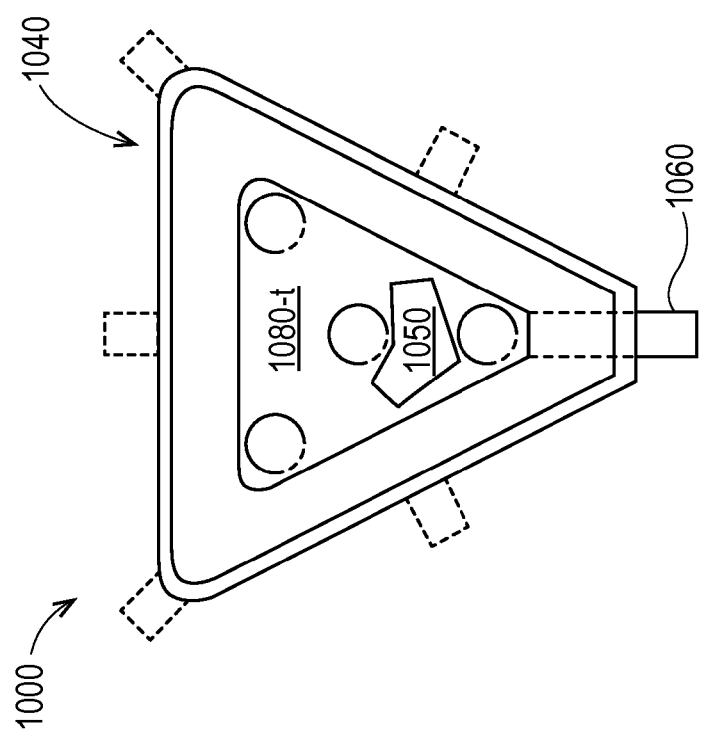
FIG. 10A illustrates a top view of an embodiment of a self-supporting flexible container, having an overall shape like a triangle.

FIG. 10A illustrates a top view of an embodiment of a self-supporting flexible container 1000 (that is not a stand up flexible container) having a product volume 1050 and an overall shape like a triangle. However, in various embodiments, a self-supporting flexible container can have an overall shape like a polygon having any number of sides. The support frame 1040 is formed by structural support members disposed along the edges of the triangular shape and joined together at their ends. The structural support members define a triangular shaped top panel 1080-*t*, and a triangular shaped bottom panel (not shown). The top panel 1080-*t* and the bottom panel are about flat, however in various embodiments, part, parts, or about all, or approximately all, or substantially all, or nearly all, or all of any of the side panels can be approximately flat, substantially flat, nearly flat, or completely flat. The container 1000 includes a dispenser 1060, which is configured to dispense one or more fluent products from one or more product volumes disposed within the container 1000. In the embodiment of FIG. 10A, the dispenser 1060 is disposed in the center of the front, however, in various alternate embodiments, the dispenser 1060 can be disposed anywhere else on the top, sides, or bottom, of the container 1000. FIG. 10A includes exemplary additional/alternate locations for a dispenser (shown as phantom lines). FIG. 10B illustrates an end view of the flexible container 1000 of FIG. 10B, resting on a horizontal support surface 1001.

FIG. 11A illustrates a top view of an embodiment of a self-supporting flexible container 1100 (that is not a stand up flexible container) having a product volume 1150 and an overall shape like a circle. The support frame 1140 is formed by structural support members disposed around the circumference of the circular shape and joined together at their ends. The structural support members define a circular shaped top panel 1180-*t*, and a circular shaped bottom panel (not shown). The top panel 1180-*t* and the bottom panel are about flat, however in various embodiments, part, parts, or about all, or approximately all, or substantially all, or nearly all, or all of any of the side panels can be approximately flat, substantially flat, nearly flat, or completely flat. The container 1100 includes a dispenser 1160, which is configured to dispense one or more fluent products from one or more product volumes disposed within the container 1100. In the embodiment of FIG. 11A, the dispenser 1160 is disposed in the center of the front, however, in various alternate embodiments, the dispenser 1160 can be disposed anywhere else on the top, sides, or bottom, of the container 1100. FIG. 11A includes exemplary additional/alternate locations for a dispenser (shown as phantom lines). FIG. 11B illustrates an end view of the flexible container 1100 of FIG. 10B, resting on a horizontal support surface 1101.

In additional embodiments, any self-supporting container with a structural support frame, as disclosed herein, can be configured to have an overall shape that corresponds with any other known three-dimensional shape. For example, any self-supporting container with a structural support frame, as disclosed herein, can be configured to have an overall shape (when observed from a top view) that corresponds with a rectangle, a polygon (having any number of sides), an oval, an ellipse, a star, or any other shape, or combinations of any of these.

Figure 12A:
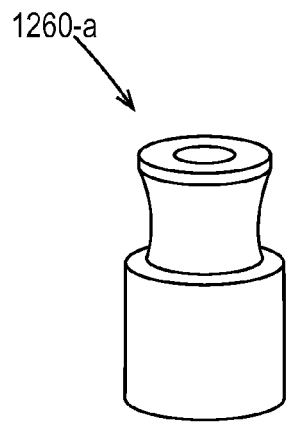
FIG. 12A illustrates an isometric view of push-pull type dispenser.
Figure 12B:
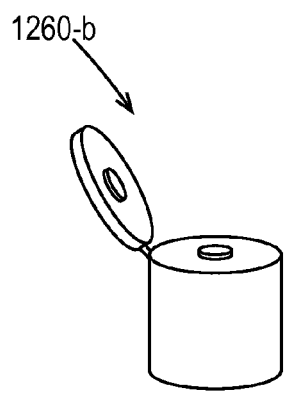
FIG. 12B illustrates an isometric view of dispenser with a flip-top cap.
Figure 12C:
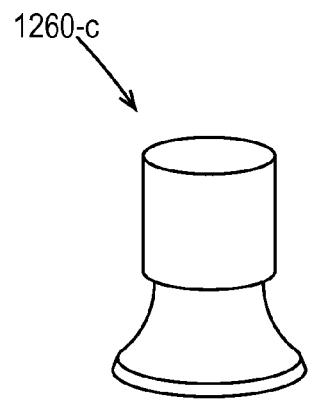
FIG. 12C illustrates an isometric view of dispenser with a screw-on cap.
Figure 12D:
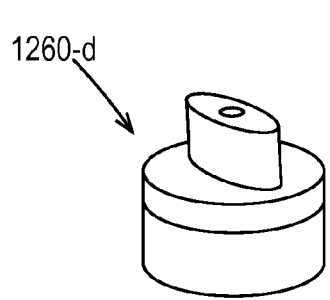
FIG. 12D illustrates an isometric view of rotatable type dispenser.
Figure 12E:
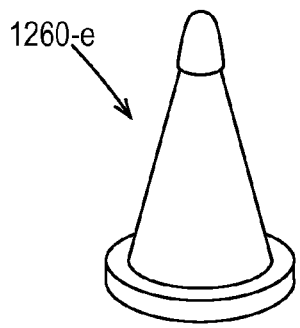
FIG. 12E illustrates an isometric view of nozzle type dispenser with a cap.

FIGS. 12A-14C illustrate various exemplary dispensers, which can be used with the flexible containers disclosed herein. FIG. 12A illustrates an isometric view of push-pull type dispenser 1260-*a*. FIG. 12B illustrates an isometric view of dispenser with a flip-top cap 1260-*b*. FIG. 12C illustrates an isometric view of dispenser with a screw-on cap 1260-*c*. FIG. 12D illustrates an isometric view of rotatable type dispenser 1260-*d*. FIG. 12E illustrates an isometric view of nozzle type dispenser with a cap 1260-*d*. FIG. 13A illustrates an isometric view of straw dispenser 1360-*a*. FIG. 13B illustrates an isometric view of straw dispenser with a lid 1360-*b*. FIG. 13C illustrates an isometric view of flip up straw dispenser 1360-*c*. FIG. 13D illustrates an isometric view of straw dispenser with bite valve 1360-*d*. FIG. 14A illustrates an isometric view of pump type dispenser 1460-*a*, which can, in various embodiments be a foaming pump type dispenser. FIG. 14B illustrates an isometric view of pump spray type dispenser 1460-*b*. FIG. 14C illustrates an isometric view of trigger spray type dispenser 1460-*c*.

Figure 15A:
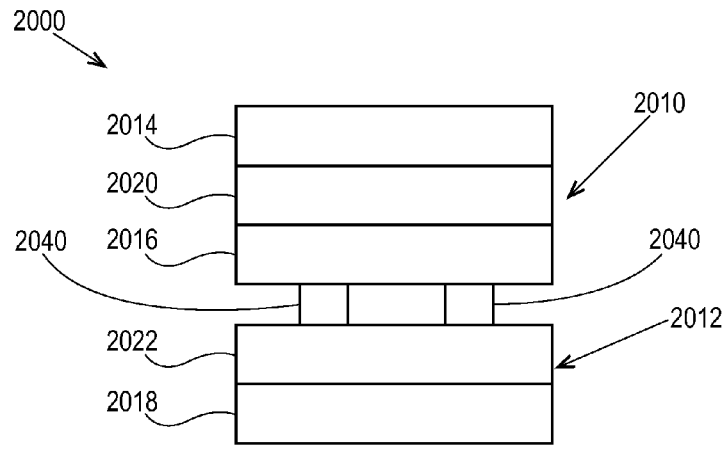
FIG. 15A illustrates a schematic of a flexible material having first and second laminates.
Figure 20:
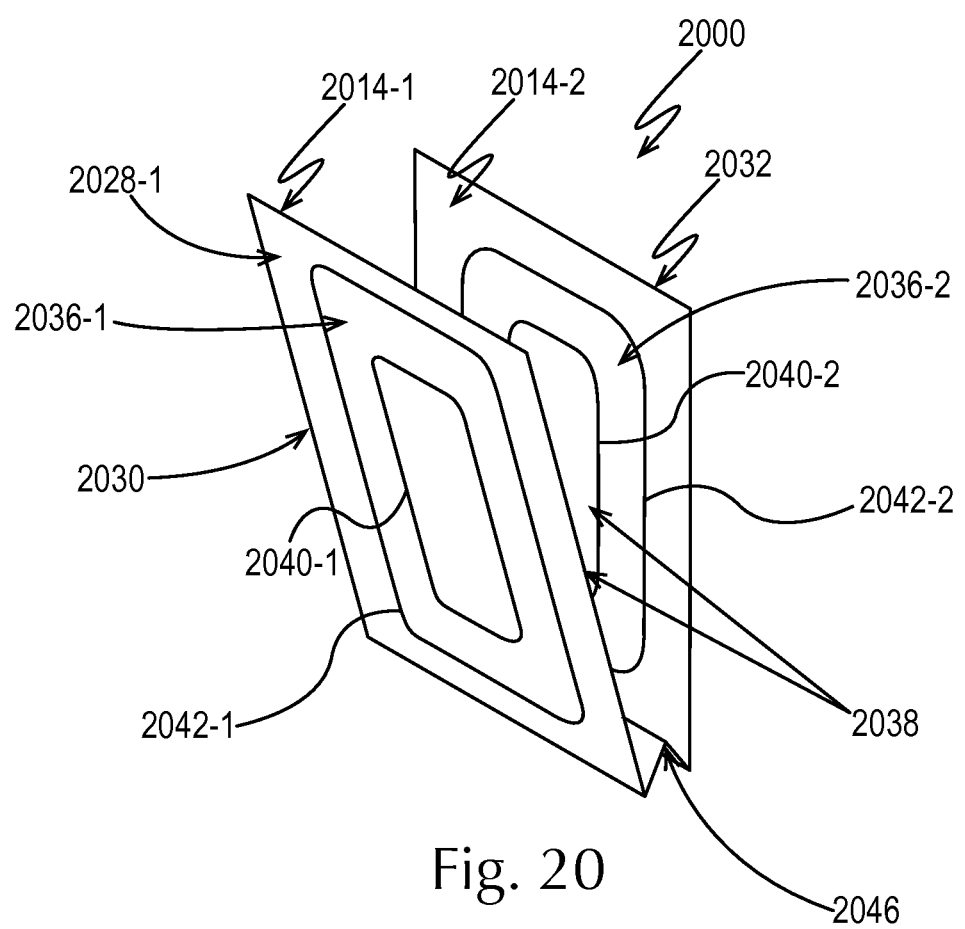
FIG. 20 illustrates a perspective view of a flexible material folded to form a container blank.
Figure 21:
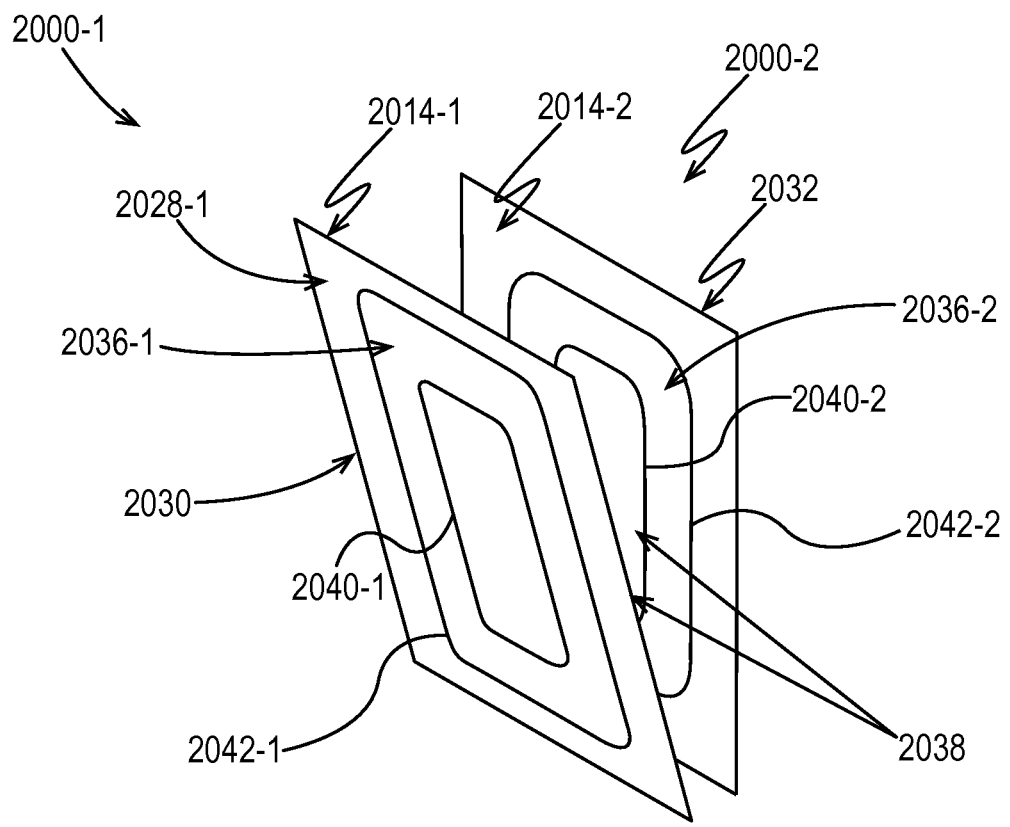
FIG. 21 illustrates a perspective view of two flexible materials joined to form a container blank.

Referring to FIG. 15A, a flexible material 2000 for a flexible container can include first and second laminates 2010, 2012, with at least a portion of the second laminate 2012 being joined to at least a portion of the first laminate 2010 by at least one seal 2040. As described above, a flexible container can include a structural support volume and a product volume. As illustrated in FIGS. 20 and 21, the flexible material 2000 for a flexible container includes a structural support volume forming region 2036 corresponding to the portion of the material for forming the structural support volume of the container and a product volume forming region 2038 corresponding to the portion of the material forming the product volume of the container. As described in detail below, the structural support volume is provided between the first and second laminate 2010, 2012, while the product volume is provided between faces of a sealable layer 2014-1, 2014-2 of the flexible material 2000 (as shown in FIG. 20) or between sealable layers 2014-1, 20142 of two flexible material sheets 2000-1, 2000-2 each having first and second laminates (as shown in FIG. 21). In an embodiment, the flexible material 2000 includes the first and second laminates 2010, 2012 only in the structural support volume forming region. In such embodiments, the flexible material 2000 can include a flexible sheet material, for example, a single layer, a single laminate, in the product volume forming region, which is different that the flexible material in the structural support volume region. For example, the flexible sheet material of the product volume forming region may include only non-sealable layers. In other embodiments, the flexible material 2000 includes the first and second laminates 2010, 2012 in both the structural support volume forming region and the product volume forming region.

Referring again to FIG. 15A, the first laminate 2010 can include a first gas barrier layer 2020 disposed between and directly or indirectly connected to first and second sealant layers 2014 and 2016. The first and second sealant layers define opposed exterior layers of the first laminate 2010.

Figure 15B:
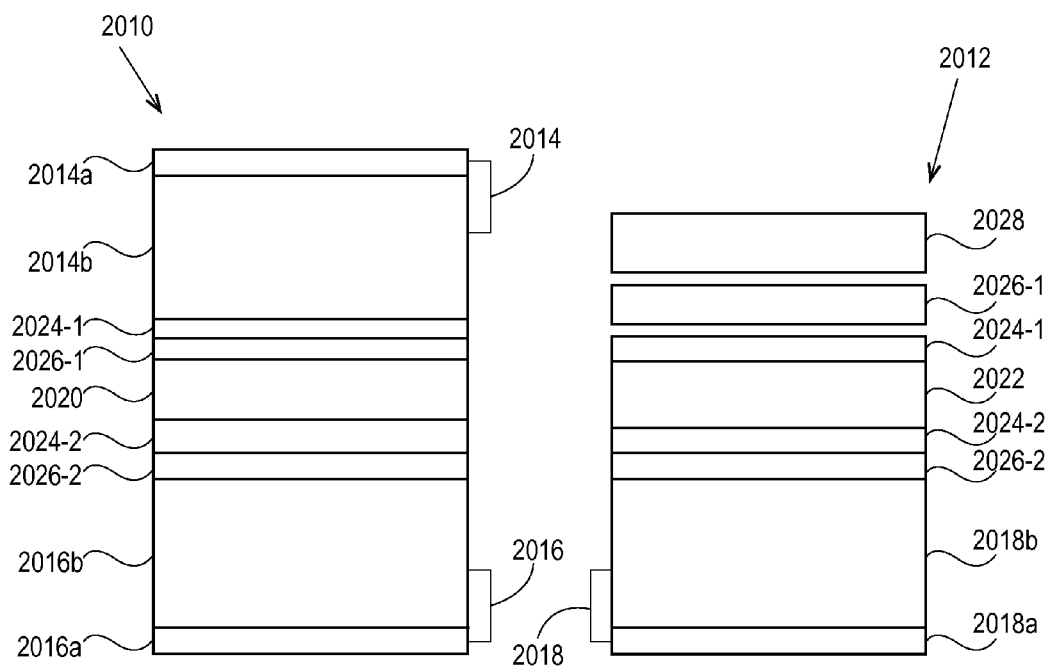
FIG. 15B illustrates a schematic of first and second laminates of a flexible material.

The second laminate 2012 can include a second gas barrier layer 2022 directly or indirectly connected to a third sealant layer 2018. The third sealant layer defines an exterior layer of the second laminate 2012. In various embodiments, the second laminate 2012 only includes a single sealable layer as an exterior layer. For example, as illustrated in FIG. 15B, the second laminate 2012 can include the third sealable layer 2018 as one exterior layer and a print layer or other non-sealable layer as the opposed exterior layer. In such embodiments, the second laminate 2012 can include one or more additional sealant layers disposed in the interior of the second laminate 2012 such that the one or more additional sealant layers are not an exterior layer.

Referring again to FIG. 15B, the first and second laminates 2010, 2012 can further include one or more additional layers such as additional sealant layers, additional gas barrier layers, reinforcing layers, tie layers, print layers, liquid barrier layers or coatings, and combinations thereof. For example, in one embodiment, the second laminate 2012 can include a print layer 2028 defining an exterior layer of the second laminate 2012, opposite the third sealant layer 2018. In another embodiment, one or both of the first and second laminates 2010, 2012 include one or more reinforcing layers 2024 and/or tie layers 2026. Any of the layers of the laminates can be provided either as a single layer or as a multi-structure layer having the same or different compositions in the individual layers of the multi-structure layer, including, for example, nano- and micro-layered structures. The multi-structure layer also need not have the layers performing the same function in direct contact, other layers can be interposed between layers of the multi-structure layer. For example, a reinforcing layer and a gas barrier layer can be provided as a multi-layer structure having the reinforcing layers interchangeable layered with the gas barrier layers.

In various embodiments, the first and/or second laminate 2010, 2012 can include a liquid barrier layer disposed within the laminate such that the liquid barrier layer is not an exterior layer of the laminate. The first and/or second laminate 2010, 2012 can additionally or alternatively include a liquid barrier coating disposed on one or more of the layers.

In various embodiments, the first and second laminates 2010, 2012 can be of a different construction. For example, the first and second laminates can have a different number of layers and/or different types of layers. For example, in one embodiment the first laminate 2010 includes sealable layers as the opposed exterior layers of the laminate, while the second laminate 2012 includes a sealable layer as only one exterior layer and a non-sealable layer, such as a print layer, as the opposed exterior layer. In another example, the first laminate can comprise a liquid barrier layer to retain moisture in a fluent product while the second laminate has no liquid barrier layer.

The flexible materials 2000 in accordance with embodiments of the disclosure have a seal strength and a lamination strength that allow the flexible material 2000 and seals to be maintained without separation or delamination when the structural support volume of the flexible container is expanded. As described above, for example, the layers of the first and second laminates 2010, 2012, can be arranged to have chemically similar or reactive layers in direct contact, and/or can include tie or adhesive layers, with selection of the composition of the tie or adhesive layer, such that the lamination strength between each of the layers of the laminate is about 2 N/m to about 10,000 N/m. Other suitable lamination strengths are disclosed above. For example, the sealable layers are selected such that the seal between the second sealable layer 2016 and the third sealable layer 2018 has a seal strength of about 20 N/m to about 10,000 N/m. Other suitable seal strengths are disclosed above.

In various embodiments, the flexible material 2000 has a thermal conductivity of about 0.02 W/m·K to about 300 W/m·K measured at 300 K and the first, second, and third sealable layers 2014, 2016, 2018 have a melting point of about 90° C. to about 350° C., about 0.05 W/m·K to about 6 W/m·K measured at 300 K and the first, second, and third sealable layers 2014, 2016, 2018 have a melting point of about 100° C. to about 260° C., or about 0.1 W/m·K to about 1 W/m·K measured at 300 K and the first, second, and third sealable layers 2014, 2016, 2018 have a melting point of about 110° C. to about 200° C.

In various embodiments, the flexible material 2000 has a gas transmission rate in at least the structural support volume forming region of about 0.05 cc/m$^2$·day·atm to about 18 cc/m$^2$·day·atm, about 0.05 cc/m$^2$·day·atm to about 3 cc/m$^2$·day·atm, or about 0.05 cc/m$^2$·day·atm to about 1 cc/m$^2$·day·atm. Other suitable gas transmission rates include about 0.05, 0.1, 0.5, 1, 2, 3, 4, 5, 6, 7, 8, 9, 10, 11, 12, 13, 14, 15, 16, 17, or 18 cc/m$^2$·day·atm any range formed by a combination of these values.

The flexible materials 2000 of the disclosure when formed into a flexible container are stable and able to withstand various stresses during their distribution through the supply chain and into consumer's homes. The flexible materials 2000 of the disclosure are capable of withstanding variations in temperature from about 0° C. to about 35° C. The flexible containers remain stable against pressure variations due to shipment through different altitudes. At sea level, atmospheric pressures are approximately 101325 Pa. At the highest shipment point in the US, atmospheric pressure is approximately 65000 Pa. The differential pressure experienced by the flexible containers during shipment can lead to stresses on the container and on the flexible material 2000. The flexible materials of the disclosure advantageously resist deformation under an applied load. For example, the flexible materials can exhibit a creep of 0% to 70% over a period of 1 month, or 0% to about 20% over a period of 1.5 years, or about 0% to about 8% over a period of 3 years, as measured using ASTM 2990-09 in which samples are cut into 25.4 mm width strips, about 200 mm long, and a 50.8 mm gate length, and a stress of 5 MPa is applied in about 1 sec and maintained at the stress at 23° C. for a specified time. The extension of the sample is monitored by grip displacement.

Referring again to FIG. 15B, in one embodiment, the first laminate 2010 includes a first sealable layer 2014 connected to a first reinforcing layer 2024-1 by a first tie layer 2026-1, a first gas barrier layer 2020 directly connected to the first reinforcing layer 2024-1, a second reinforcing layer 2024-2 directly connected to the first gas barrier layer 2020, and connected to a second sealable layer 2016 by a second tie layer 2026-1. The first and second sealable layers 2014, 2016 can include multiple layers of sealable material. For example, the first and second sealable layers can each include a first sealable material 2014a, 2016a, such as mLLDPE layered on a second sealable material 2014b, 2016b, such as a blend of LLDPE and LDPE. The first and second tie layers 2026-1, 2026-2 can be MA-LDPE. The first and second reinforcing layers 2016-1, 2016-2 can be nylon. The first gas barrier layer 2020 can be EVOH.

The second laminate 2012 can include, in an embodiment, a third sealant layer 2018 connected to a first reinforcing layer 2024-1 by a first tie layer 2026-1, a second gas barrier layer 2022 directly connected to and between first and second reinforcing layers 2024-1, 2024-2, and a second tie layer or adhesive layer 2026-2 connecting a print layer 2028 to the second reinforcing layer 2024-2. The third sealable layer 2018 can include a first sealable material 2018*a* such as mLLDPE, layered on a second sealable material 2018*b*, such as a blend of LLDPE and LDPE. The second gas barrier layer 2022 can be EVOH. The first and second reinforcing layers 2024-1, 2024-2 can be nylon.

The first laminate 2010 can be joined to the second laminate 2012 by at least one seal 2040. For example, the at least one seal can join the first sealable layer 2014 or the second sealable layer 2016 of the first laminate 2010 the third sealable layer 2018 of the second laminate 2012. For ease of reference throughout the disclosure, reference will be made to joining of the second sealable layer 2016 to the third sealable layer 2018, with the first sealable layer 2014 defining an exterior layer of the flexible material 2000. It should be understood that either of the first sealable layer 2014 or the second sealable layer 2016 can be joined to the third sealable layer 2018 by the at least one seal with the other one of the first sealable 2014 or the second sealable 2016 layer defining the exterior layer of the flexible material 2000.

Figure 16:
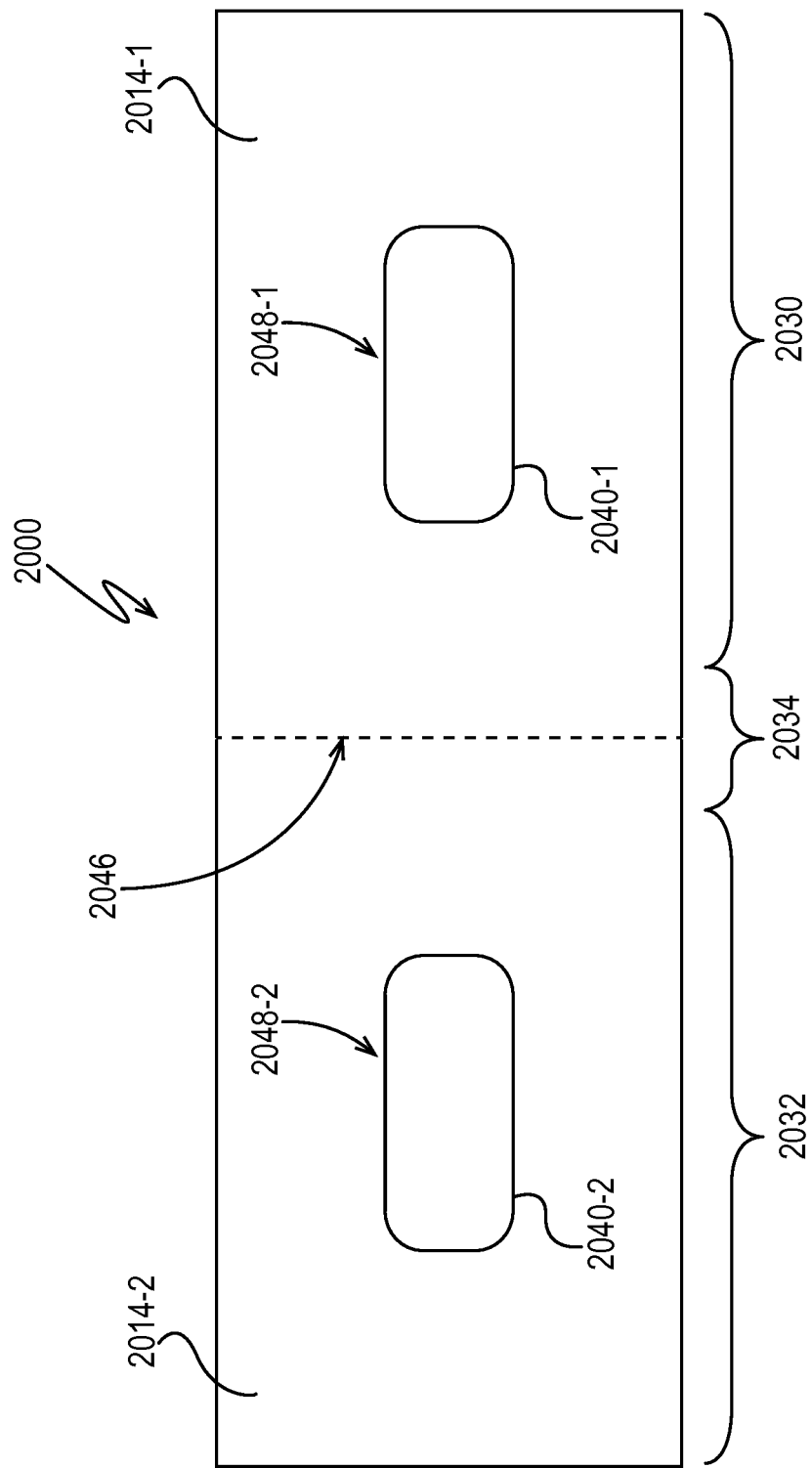
FIG. 16 illustrates a schematic of a flexible material having first and second regions each with first seals.

Referring to FIG. 16, the flexible material 2000 can include at least one first seal 2040 that joins a portion of the first laminate 2010 to a portion of the second laminate 2012. The at least one first seal 2040 can define at least one boundary 2048 of the structural support volume of the flexible container formed from the flexible material 2000. The at least one first seal 2040 joins a portion of the first sealable layer 2014 of the first laminate 2010 to a portion of the third sealable layer 2018 of the second laminate 2012. For example, the at least one first seal 2040 at least partially defines an inner boundary of a structural support volume from the perspective of the container center. The structural support volume is provided between the first and second laminates 2010, 2012.

As illustrated in FIG. 16, the flexible material 2000 can include a first region 2030, a second region 2032, and a fold region 2034. The first and second regions 2030, 2032 can each include at least one first seal 2040-1, 2040-2 defining at least partially at least one boundary 2048-1, 2048-2 of a structural support volume to be formed in the first and second regions 2030, 2032. One or more first seals 2040 can be formed to define a boundary 2048 of a structural support volume. For example, in some embodiments, such as illustrated in FIG. 1, the multiple structural support volumes can be included in the flexible container. In such embodiments, multiple first seals 2040 can be formed in the flexible material 2000, each defining at least one boundary 2048 of one of the structural support volumes. In various embodiments, the flexible material 2000 can include first and second regions 2030, 2032 with a structural support volume being provided in only one of the first or second regions 2030, 2032.

FIG. 16 illustrates an embodiment in which the at least one first seal 2040 is provided in the first and second regions 2030, 2032 as mirror images and are aligned when the flexible material 2000 is folded along a line 2046 in the fold region 2034. In alternative embodiments, the first seals 2040-1, 2040-2 of the first and second regions 2030, 2032 can be arranged such that they at least partially overlap, but are not necessarily mirror images and/or not necessarily completely aligned when the flexible material 2000 is folded along a line 2046.

Figure 17:
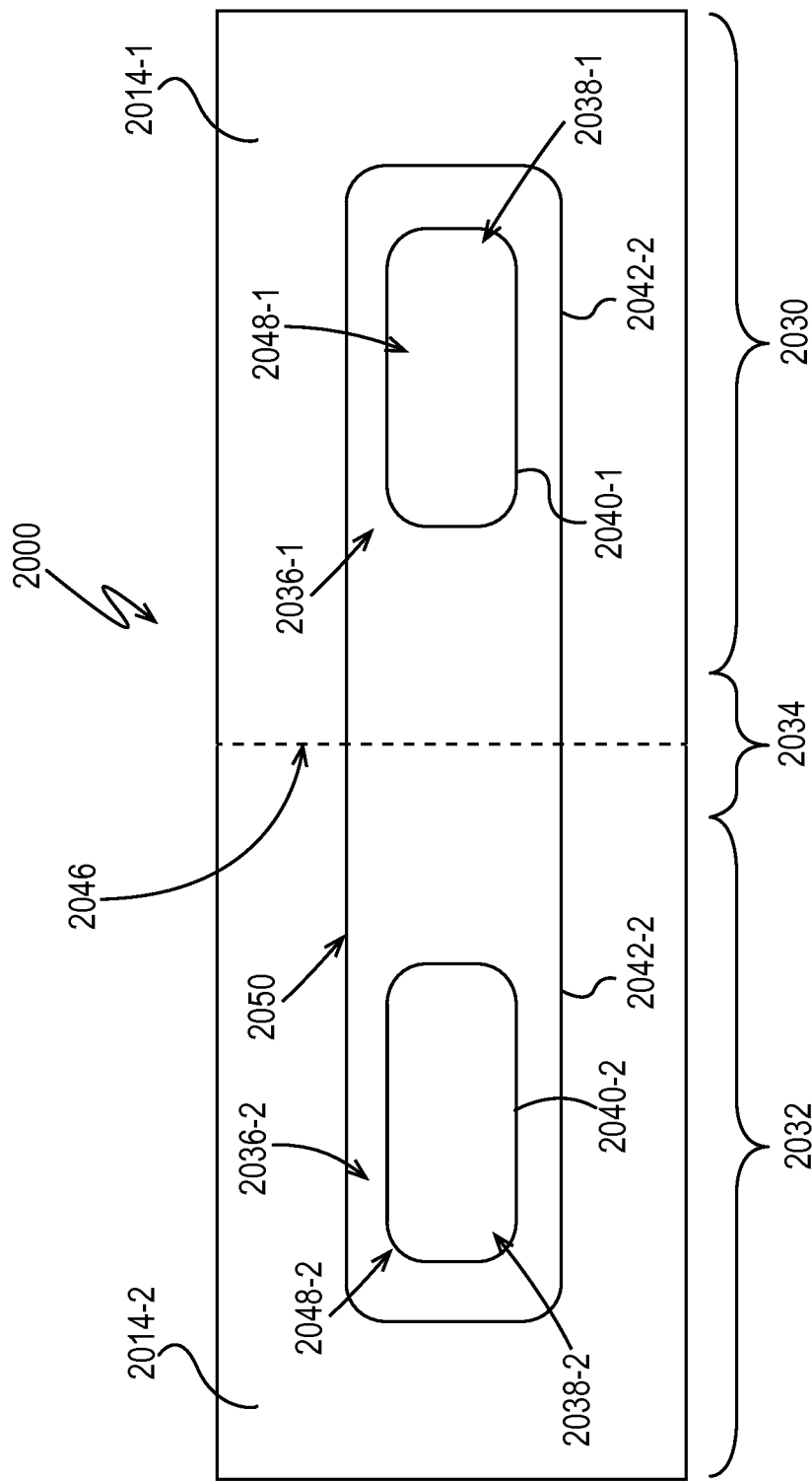
FIG. 17 illustrates a schematic of a flexible material having first and second regions with a second seal extending between the first and second regions.

Referring to FIG. 17, in yet another embodiment, at least one second seal 2042 can extend between the first and second regions 2030, 2032 to define at least one additional boundary 2050 of the structural support volume in both the first and second regions 2030, 2032. While FIG. 17 illustrates an embodiment in which the at least one second seal 2042 is symmetrical across a line 2046 between the first and second regions 2030, 2032, it is contemplated that the portion of the second seal 2042 in the first region 2030 can be non-symmetrical with the portion of the second seal 2042 in the second region 2032. The second seal 2042 in the first region 2030 at least partially overlaps with a portion of the second seal 2042 in the second region 2032 when the flexible material 2000 is folded about a line 2046.

Figure 18:
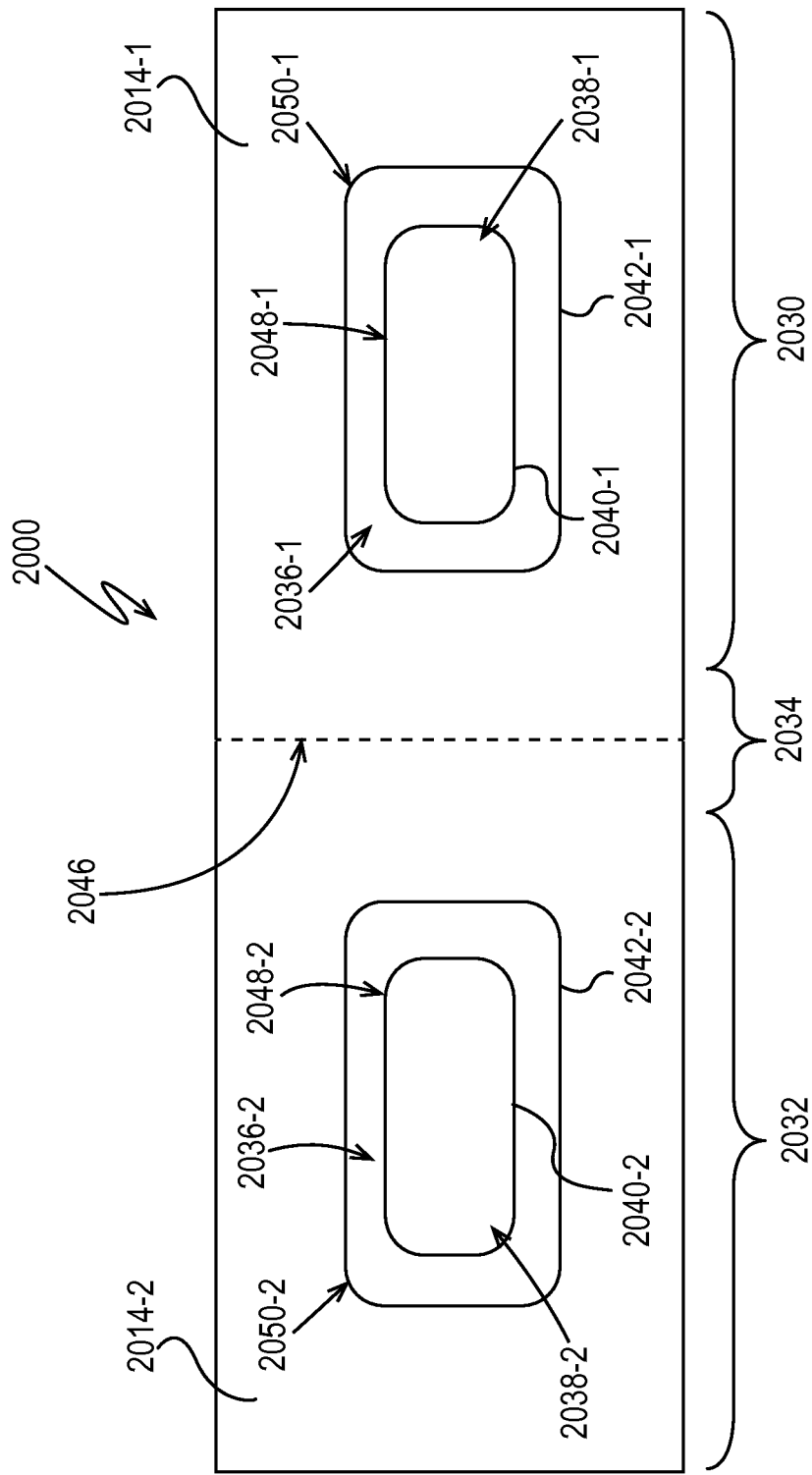
FIG. 18 illustrates a schematic of a flexible material having first and second regions, each with first and second seals.

Referring to FIG. 18, in some embodiments, the flexible material 2000 can further include at least one second seal 2042 that joins a portion of the first sealable layer 2014 to a portion of the third sealable layer 2018 and defines at least one additional boundary 2050 of the structural support volume. For example, the at least one second seal 2042 can define an outer boundary of the structural support volume, while the at least one first seal 2040 can define an inner boundary of the structural support volume, from the perspective of the container center. As described above with respect to the at least one first seal, the flexible material 2000 can include at least one second seal 2042-1, 2042-2 disposed in each of first and second regions 2030, 2032 of the flexible material 2000, as illustrated in FIG. 18. FIG. 18 illustrates an embodiment in which the second seals 2042-1, 2042-2 in the first and second regions 2030, 2032 are mirror images and are aligned to completely overlap when the flexible material 2000 is folded along a line 2046

In various embodiments, a container blank can be formed from the flexible material 2000 having at least one first seal 2040 and optionally at least on second seal 2042 formed in the flexible sheet. In one embodiment, the container blank is formed from a single sheet of flexible material 2000. For example, referring to FIG. 20, the flexible material 2000 can include first and second regions 2030, 2032 with at least one first seal 2040 formed in first and second regions 2030, 2032. The flexible material 2000 can be folded long a line 2046, or multiple lines as illustrated in FIG. 20, such that the first sealable layer 2014 of the first region 2030 is brought into contact with the first sealable layer 2014 of the second region 2032. At least one third seal (not shown) can be formed in the flexible sheet joining the first sealable layer 2014 of the first region 2030 to the first sealable layer 2014 of the second region 2032 to define at least one boundary 2052 of the product volume.

Figure 19A:
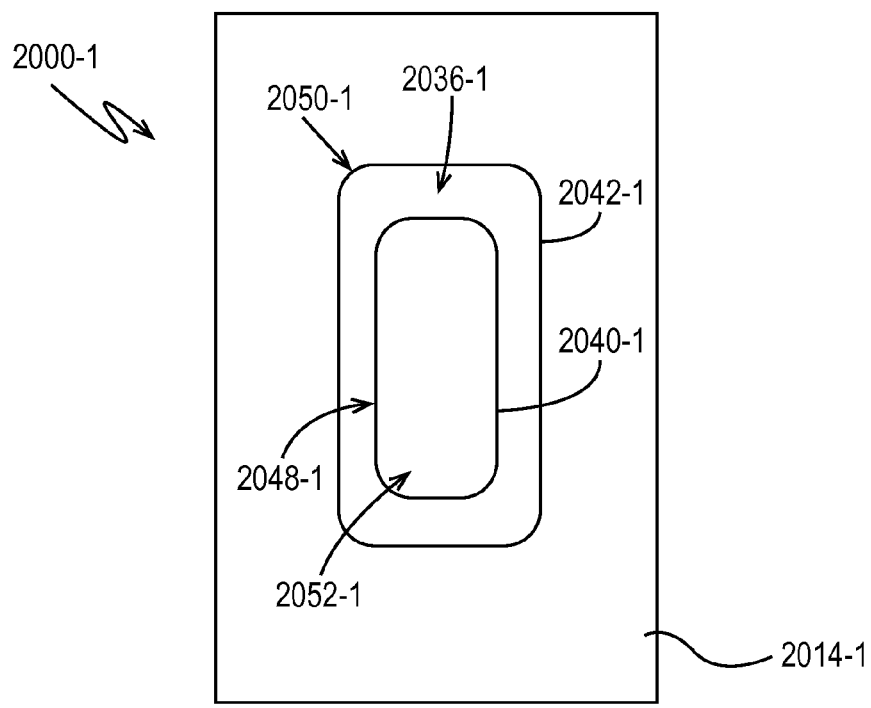
FIG. 19A illustrates a schematic of a first flexible material sheet, having first and second laminates and first and second seals.
Figure 19B:
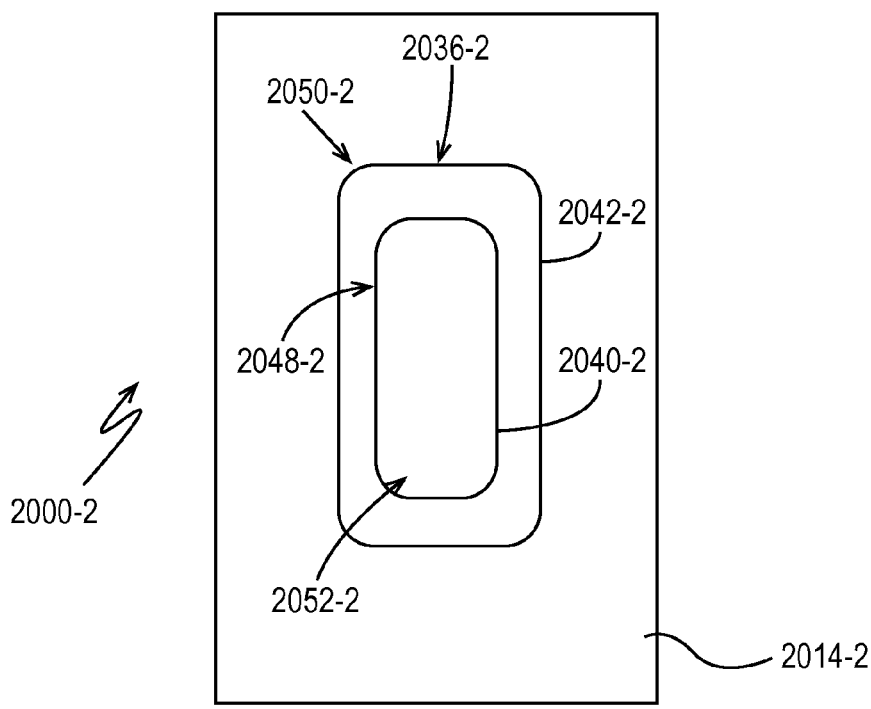
FIG. 19B illustrates a schematic of a second flexible material sheet, having first and second laminates and first and second seals.

Referring to FIG. 21, the container blank can be formed from two or more sheets of flexible material 2000-1, 2000-2. FIG. 19A illustrates first flexible material sheet 2000-1 and FIG. 19B illustrates second flexible material sheet 2000-2. For example, the container blank can be formed by bring the first sealable layer 2014-1 of the first flexible material 2000-1 into contact with the first sealable layer 2014-2 of the second flexible material 2000-1 with the at least one third seal joining the first sealable layer 2014-1 of the first flexible material 2000 to the first sealable layer 2014-2 of the second flexible material 2000-2. One or more additional sheets of flexible material 2000 or other film materials can be further included in forming the container blank, for example, such as forming a gusset region. As described, above, the flexible material sheets 2000-1 and 2000-2 can each further include at least one second seal 2042-1, 2042-2, defining at least one additional boundary 2050-1, 2050-2 of the structure supporting volume in each of the first and second flexible material sheets 2000-1, 2000-2.

In some embodiments, for example, where the flexible material(s) 2000 have only the a first seal 2040 defining at least one boundary 2048 of the structural support volume (as shown in FIG. 16), the at least one third seal 2044 can also define at least one additional boundary 2050 of the structural support volume as well as at least one boundary of the product volume. In other embodiments, for example, where the flexible material 2000 has first and second seals 2040, 2042 (as shown in FIG. 18), the at least one third seal 2044 can be formed over at least a part of the at least one second seal 2042 to define the at least one boundary of the product volume. In some embodiments, the at least one third seal 2044 can completely overlap with the at least one second seal 2042. In some embodiments, the at least one third seal 2044 does not overlap with the first or second seals 2040, 2042.

In any of the foregoing embodiments, the first, second, and/or third seals can be formed to have a small opening or gap to allow for the structural support volumes and/or the product volume to be filled with the desired expansion material (in the structural support volume) or product (in the product volume). One or more additional seals can be formed after filling the respective volumes of the container during formation of the container.

As described above, the flexible container includes a structural support volume that in some embodiments may be expanded and may be pressurized with a gas. The flexible material 2000 in accordance with embodiments of the disclosure can provide a gas barrier in at least the structural support volume to ensure that sufficient pressurization is maintained in the structural support volume over the shelf-life of the flexible container. For example, a container can have a structural support volume pressurized to a gauge pressure of about 41,300 Pa to about 55,140 Pa, and the flexible material 2000 in at least the structural support volume can provide a sufficient barrier to gas transmission such that the structural support volume losses less than about 6890 Pa to about 20,678 Pa in about one month, in about six months, in about one year, or in about two years.

To further improve the structural properties of the flexible material 2000, the flexible container can be treated to cross-link one or more layer of the laminates of the flexible material 2000. For example, the flexible container can be exposed to electron beam radiation to cross-link one or more layers of the laminates.

EXAMPLES

In the following examples, creep was measured in accordance with ASTM 2990-09. Samples are cut into 25.4 mm width strips, about 200 mm long, and a 50.8 mm gate length used. A stress of 5 MPa in about 1 sec was applied and the stress was maintained at 23° C. for a specified time. The extension of the sample was monitored by grip displacement.

The tensile properties of the material were measured in accordance with ASTM D882-12 using a 25.4 mm wide film, a gauge length of 50 mm, and a crosshead speed of 5 mm/min.

Mocon oxygen transmission rate was measured using MOCON equipment in accordance with ASTM F2622-08.

The composition and thickness of the layers of the laminates were measured by FTIR, temperature rising elution fractionation (TREF), and SEM analysis.

Example 1

A first laminate having layers ordered as shown below was formed. The total film thickness was about 90 microns. The PE layers were a blend of 90% LLDPE(ZN) with 10% LDPE as determined by temperature rising elution fractionation (TREF).

| Composition and Order of the Layers | Thickness of the Layer (micron) | Function |
| --- | --- | --- |
| PE | 18 | Sealable layer |
| Tie layer | <2 | Tie layer |
| Nylon | ~3 | Reinforcing layer |
| EVOH | 6 | Gas barrier |
| Nylon | ~3 | Reinforcing layer |
| EVA | 22 | Tie layer |
| Nylon | ~3 | Reinforcing layer |
| EVOH | 6 | Gas barrier |
| Nylon | ~3 | Reinforcing layer |
| Tie layer | <2 | Tie layer |
| PE | 18 | Sealable layer |

The first laminate had the following properties:

| | |
| --- | --- |
| Creep: 5 MPa; 23 C. | 0.4% change @ 4 hours |
| Tensile Properties | Modulus: 870 MPa |
| | % strain at yield: 2.5% |
| | Stress at yield: 20 MPa |
| OTR MOCON | 0.0104 cc/100 in² · day |

Example 2

A first laminate having layers ordered as shown below was formed. The total film thickness was about 92 microns. The PE layers were 100% LLDPE(ZN) as determined by temperature rising elution fractionation (TREF).

| Composition and Order of the Layers | Thickness of the Layer | Function |
| --- | --- | --- |
| PE | 42 μm | Sealant layer |
| Tie Layer | <2 μm | Tie layer |
| Nylon 6 | 18 μm | Gas barrier/Reinforcing layer |
| Tie Layer | <2 μm | Tie layer |
| PE | 28 μm | Sealant layer |

The first laminate had the following properties:

| | |
| --- | --- |
| Creep: 5 MPa; 23 C. | 1.9% change @ 4 hours |
| Tensile Properties | Modulus: 480 MPa |
| | % Strain at yield: 3% |
| | Stress at yield: 13.5 MPa |

Example 3

A first laminate having layers ordered as shown below was formed. The total film thickness was about 80 microns. The PE layers were mostly LDPE with a small amount of LLDPE(ZN) as determined by temperature rising elution fractionation (TREF).

| Composition and Order of the Layers | Thickness of the Layer | Function |
| --- | --- | --- |
| PE | 32 μm | Sealable layer |
| Tie Layer | <2 μm | Tie layer |
| EVOH | 12 μm | Gas Barrier |
| Tie Layer | <2 μm | Tie Layer |
| PE | 32 μm | Sealable Layer |

The first laminate had the following properties:

| | |
|---|---|
| Creep Resistance: 5 MPa; 23 C. | 0.7% change @ 4 hours |
| Tensile Properties | Modulus: 708 MPa |
| | % strain at yield: 2.5% |
| | Stress at yield: 15 MPa |

Example 4

A second laminate having layers ordered as shown below was formed. The total film thickness was about 66 microns.

| Composition and Order of the Layers | Thickness of the Layer | Function |
|---|---|---|
| PET | 9 μm | Print layer |
| Adhesive | ~3 μm | Adhesive/Tie layer |
| vm-BOPP | 18 μm | Gas and water barrier |
| Adhesive | ~3 μm | Adhesive/Tie layer |
| LLDPE/LDPE Blend | 38 μm | Sealable Layer |

The first laminate had the following properties:

| | |
|---|---|
| Creep: 5 MPa; 23 C. | 0.4% change @ 4 hours |
| Tensile Properties | Modulus: 1208 MPa |
| | % strain at yield: 2.5% |
| | Stress at yield: 25 MPa |

Example 5

A first laminate having layers ordered as shown below was formed. The total film thickness was about 91.4 microns. The composition and thickness of the adhesive can be adjusted to achieve the desired lamination strength.

| Composition and Order of the Layers | Thickness of the Layer | Function |
|---|---|---|
| LLDPE/LDPE Blend | 38 μm | Sealable layer |
| Adhesive | ~3 μm | Tie layer |
| vm-Biaxially oriented Nylon (BON) | 18 μm | Gas barrier |
| Adhesive | ~3 μm | Tie layer |
| LLDPE/LDPE Blend | 38 μm | Sealable Layer |

The first laminate had the following properties:

| | |
|---|---|
| Creep: 5 MPa; 23 C. | 1.3% change @ 4 hours |
| Tensile Properties | Modulus: 712 MPa |
| | % strain at yield: 3% |
| | Stress at yield: 15 MPa |

Example 6

A second laminate having layers ordered as shown below was formed. The total film thickness was about 91.4 microns. The composition and thickness of the adhesive can be adjusted to achieve the desired lamination strength. The print layer and the sealable layers were confirmed by TREF to have mostly LLDPE (ZN) with a small amount of LDPE. The print layer was rendered printable by corona treating the layer. The corona treatment also degrades the sealable of the layer such that the second laminate of this example would be considered to have only a single sealable layer.

| Composition and Order of the Layers | Thickness of the Layer | Function |
|---|---|---|
| LLDPE (ZN)/LDPE Sealant (corona treated) | 32.85 μm | Print layer |
| Tie layer | ~3 μm | Tie layer |
| Nylon | 8.34 μm | Reinforcing layer |
| EVOH | 40.03 μm | Gas barrier layer |
| Nylon | 8.85 μm | Reinforcing layer |
| Tie layer | ~3 μm | Tie layer |
| metallocene LLDPE (ZN)/LDPE | 43 μm | Sealable Layer |

Example 7

A second laminate having layers ordered as shown below was formed. The total film thickness was about 66 microns. The composition and thickness of the adhesive can be adjusted to achieve the desired lamination strength.

| Composition and Order of the Layers | Thickness of the Layer | Function |
|---|---|---|
| PET | 9 μm | Print layer |
| Adhesive | ~3 μm | Tie layer |
| vm-BOPP | 15 μm | Gas barrier layer and liquid barrier layer |
| Adhesive | ~3 μm | Tie layer |
| LLDPE/LDPE Blend | 38 μm | Sealable Layer |

The second laminate had the following properties:

| | |
|---|---|
| Creep: 5 MPa; 23 C. | 0% change @ 4 hours |
| Tensile Properties | Modulus: 1330 MPa |
| | % strain at yield: 3% |
| | Stress at yield: 25 MPa |

Example 8

A first laminate having layers ordered as shown below has a total laminate thickness of about 115 microns.

| Composition and Order of the Layers | Thickness of the Layer | Function |
|---|---|---|
| mLLDPE | 3 μm | Sealable layer |
| LLDPE/LDPE Blend | 35 μm | Sealable layer |
| MA-LDPE | 4 μm | Tie layer |
| Nylon | 8 μm | Reinforcing layer |
| EVOH | 15 μm | Gas barrier layer |
| Nylon | 8 μm | Reinforcing layer |
| MA-LDPE | 4 μm | Tie Layer |
| LLDPE/LDPE Blend | 35 μm | Sealable layer |
| mLLDPE | 3 μm | Sealable layer |

The second laminate having layers ordered as shown below has a total laminate thickness of about 126 microns.

| Composition and Order of the Layers | Thickness of the Layer | Function |
|---|---|---|
| BOPP | 20 μm | Print Layer |
| Ink | ~2 μm | Ink |
| Adhesive | ~3 μm | Tie layer |

| Composition and Order of the Layers | Thickness of the Layer | Function |
| --- | --- | --- |
| LLDPE/LDPE Blend | 25 μm | Sealable layer |
| MA-LDPE | ~4 μm | Tie layer |
| Nylon | 8 μm | Reinforcing layer |
| EVOH | 15 μm | Gas barrier layer |
| Nylon | 8 μm | Reinforcing layer |
| MA-LDPE | ~4 μm | Tie Layer |
| LLDPE/LDPE Blend | 35 μm | Sealable layer |
| mLLDPE | 3 μm | Sealable layer |

Part, parts, or all of any of the embodiments disclosed herein can be combined with part, parts, or all of other embodiments known in the art of flexible containers, including those described below.

Embodiments of the present disclosure can use any and all embodiments of materials, structures, and/or features for flexible containers, as well as any and all methods of making and/or using such flexible containers, as disclosed in the following U.S. provisional patent applications: (1) application 61/643,813 filed May 7, 2012, entitled "Film Based Containers" (applicant's case 12464P); (2) application 61/643,823 filed May 7, 2012, entitled "Film Based Containers" (applicant's case 12465P); (3) application 61/676,042 filed Jul. 26, 2012, entitled "Film Based Container Having a Decoration Panel" (applicant's case 12559P); (4) application 61/727,961 filed Nov. 19, 2012, entitled "Containers Made from Flexible Material" (applicant's case 12559P2); (5) application 61/680,045 filed Aug. 6, 2012, entitled "Methods of Making Film Based Containers" (applicant's case 12579P); and (6) application 61/780,039 filed Mar. 13, 2013, entitled "Flexible Containers with Multiple Product Volumes" (applicant's case 12785P); and each of which is hereby incorporated by reference.

Part, parts, or all of any of the embodiments disclosed herein also can be combined with part, parts, or all of other embodiments known in the art of containers for fluent products, so long as those embodiments can be applied to flexible containers, as disclosed herein. For example, in various embodiments, a flexible container can include a vertically oriented transparent strip, disposed on a portion of the container that overlays the product volume, and configured to show the level of the fluent product in the product volume.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or patent publication, is hereby incorporated herein by reference in its entirety unless expressly excluded or otherwise limited. The citation of any document is not an admission that it is prior art with respect to any document disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A flexible material for a flexible container comprising a structural support volume and a product volume, the flexible material comprising:
    a first laminate comprising, in order:
        a first sealable layer, which is linear low-density polyethylene, and which defines an exterior layer of the first laminate;
        a first tie layer;
        a first reinforcing layer, which is nylon;
        a first gas barrier layer, which is ethyl vinyl alcohol;
        a second reinforcing layer, which is nylon;
        a second tie layer; and
        a second sealable layer, which is linear low-density polyethylene, and which defines an exterior layer of the first laminate; and
    a second laminate comprising, in order:
        a third sealable layer, which defines an exterior layer of the second laminate;
        a second gas barrier layer, which is ethyl vinyl alcohol;
        a print layer, which has a surface that includes ink, and which defines an exterior layer of the second laminate;
    wherein:
    at least a portion of the third sealable layer joins to at least a portion of the second sealable layer such that the joined portions form at least one seal that defines at least one boundary of the structural support volume, which is disposed between the first and second laminates, and
    in at least a structural support volume forming region of the flexible material, the flexible material has a gas transmission rate of about 0.05 cc/m$^2$·day·atm to about 18 cc/m$^2$·day·atm.

2. The flexible material of claim 1, wherein in at least the structural support volume forming region of the flexible material, the flexible material has a gas transmission rate of about 0.05 cc/m$^2$·day·atm to about 3 cc/m$^2$·day·atm.

3. The flexible material of claim 1, wherein in at least the structural support volume forming region of the flexible material, the flexible material has a gas transmission rate of about 0.05 cc/m$^2$·day·atm to about 1 cc/m$^2$·day·atm.

4. The flexible material of claim 1, wherein the flexible material has a gas transmission rate of about 0.05 cc/m$^2$·day·atm to about 18 cc/m$^2$·day·atm.

5. The flexible material of claim 1, wherein the flexible material has a moisture vapor transmission rate of about 0.05 g/m$^2$·day to about 12 g/m$^2$·day.

6. The flexible material of claim 1, wherein the flexible material has a moisture vapor transmission rate of about 0.07 g/m$^2$·day to about 6 g/m$^2$·day.

7. The flexible material of claim 1, wherein the structural support volume forming region is configured to be formed into a structural support volume, which when pressurized to a gauge pressure of about 41,300 Pa to about 55,140 Pa, the structural support volume loses about 6890 Pa to about 20,678 Pa in about one month.

8. The flexible material of claim 1, wherein the structural support volume forming region is configured to be formed into a structure support volume, which when pressurized to a gauge pressure of about 41,300 Pa to about 55,140 Pa, the structural support volume loses less than about 6890 Pa in about six months.

9. The flexible material of claim 1, wherein the structural support volume forming region is configured to be formed into a structure support volume, which when pressurized to a gauge pressure of about 41,300 Pa to about 55,140 Pa, the structural support volume loses less than about 6890 Pa in about one year.

10. The flexible material of claim 1, wherein the structural support volume forming region is configured to be formed into a structure support volume, which when pressurized to a gauge pressure of about 41,300 Pa to about 55,140 Pa, the structural support volume loses less than about 6890 Pa in about two years.

11. The flexible material of claim 1, wherein the seal is a first seal, and at least one second seal joins at least a portion of the third sealable layer to at least a portion of the second sealable layer, to define at least one additional boundary of the structural support volume.

12. The flexible material of claim 11, wherein the structural support volume is bounded between the first seal and the second seal.

13. The flexible material of claim 1, wherein the first laminate comprises a liquid impermeable coating disposed on one or more layers of the first laminate such that the liquid impermeable coating is not on an exterior surface of the first laminate.

14. The flexible material of claim 1, wherein the second laminate comprises a liquid impermeable coating disposed on one or more layers of the second laminate such that the liquid impermeable coating is not on an exterior surface of the second laminate.

15. The flexible material of claim 1, wherein, in the first laminate:
the first sealable layer is a metallocene linear low-density polyethylene; and
the second sealable layer is a metallocene linear low-density polyethylene.

16. The flexible material of claim 1, wherein, in the first laminate:
the first tie layer is low-density polyethylene with maleic anhydride modification; and
the second tie layer is low-density polyethylene with maleic anhydride modification.

17. The flexible material of claim 1, wherein, in the first laminate:
the first reinforcing layer is directly connected to the first gas barrier layer; and
the first gas barrier layer is directly connected to the second reinforcing layer.

18. The flexible material of claim 1, wherein the second laminate comprises, in order:
the third sealable layer;
a third tie layer;
a third reinforcing layer;
the second gas barrier layer;
a fourth reinforcing layer;
a fourth tie layer;
the fourth sealable layer;
an adhesive;
the ink; and
the print layer.

19. The flexible material of claim 1, wherein the print layer is polyethylene terephthalate.

* * * * *